Figure 1:
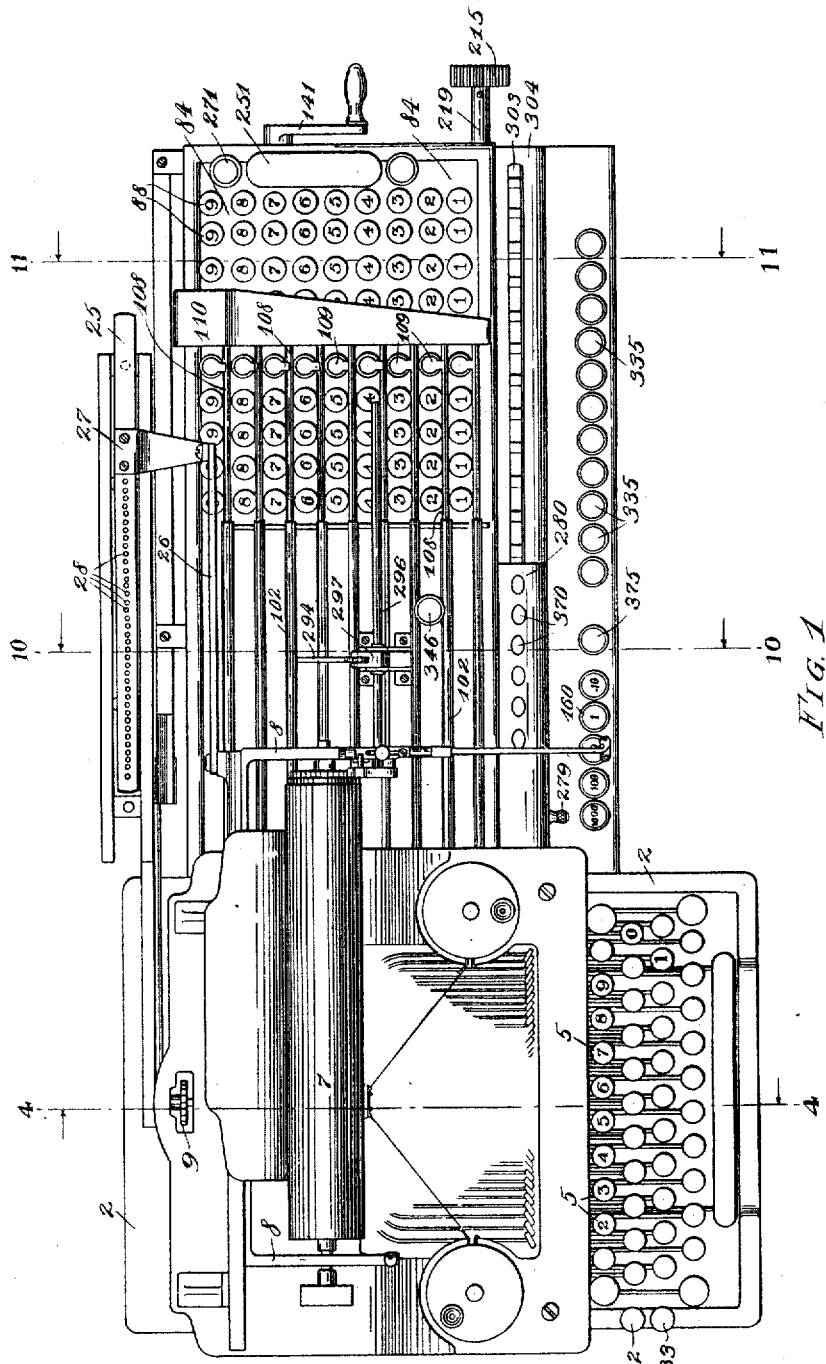

A. S. DENNIS.
COMBINED TYPE WRITING AND COMPUTING MACHINE.
APPLICATION FILED JAN. 13, 1909.

949,979.

Patented Feb. 22, 1910.
13 SHEETS—SHEET 1.

WITNESSES:
Brennan B. West
W. R. McGarrell

INVENTOR,
Adolphus S. Dennis
BY Baker, Foute & Hull
ATTYS.

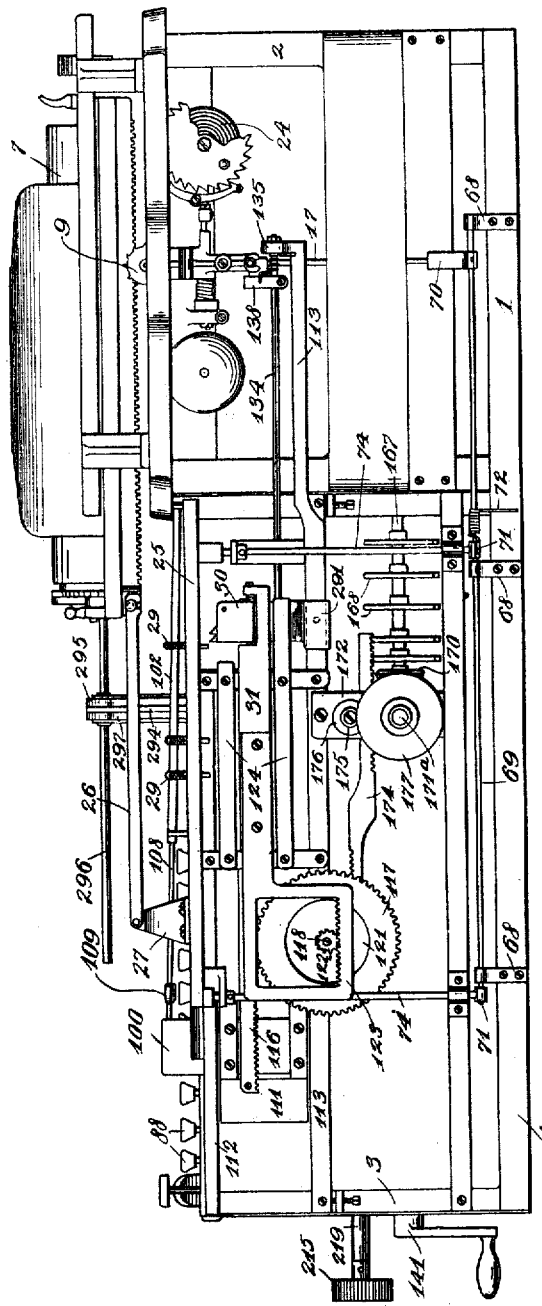

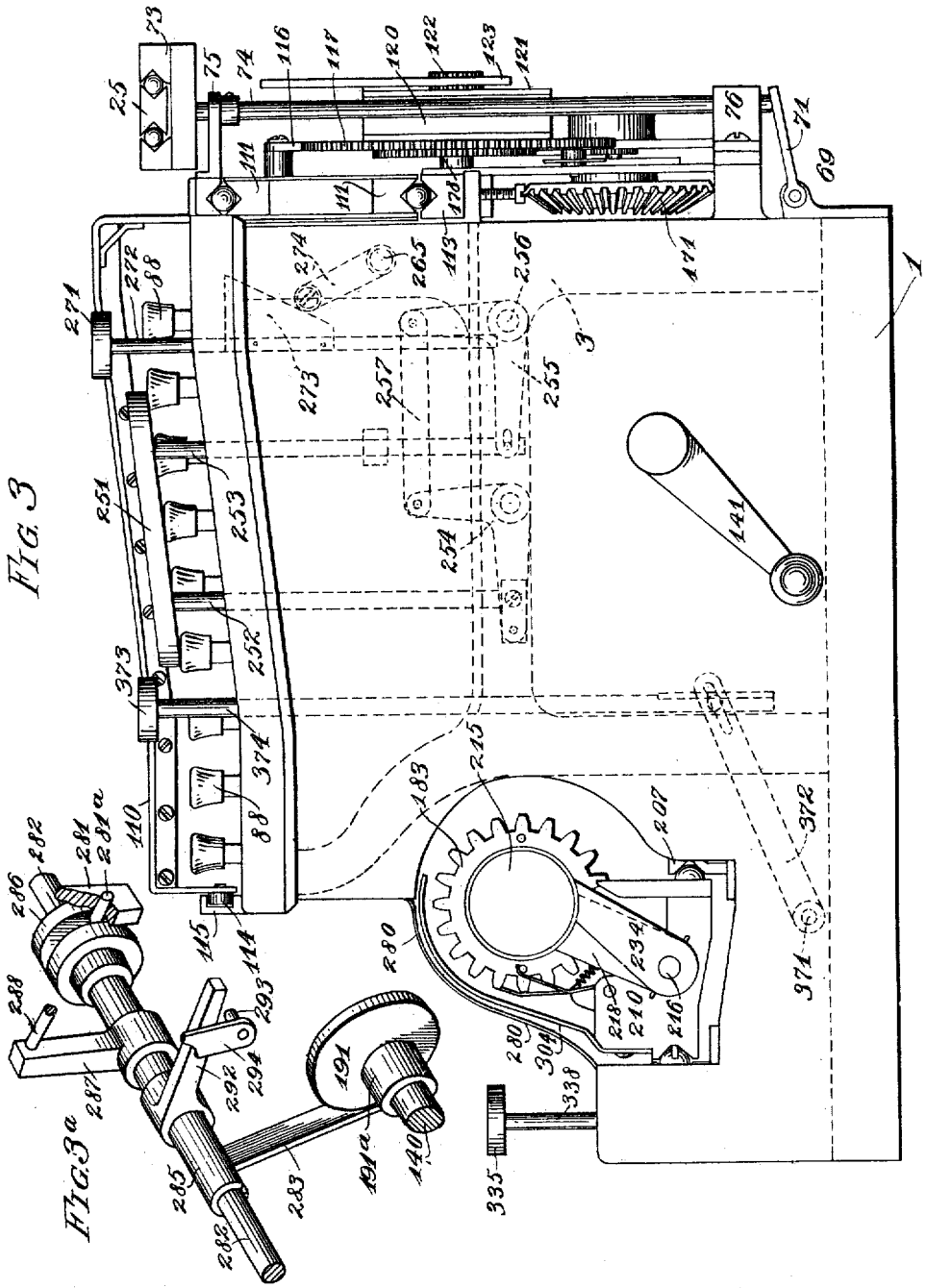

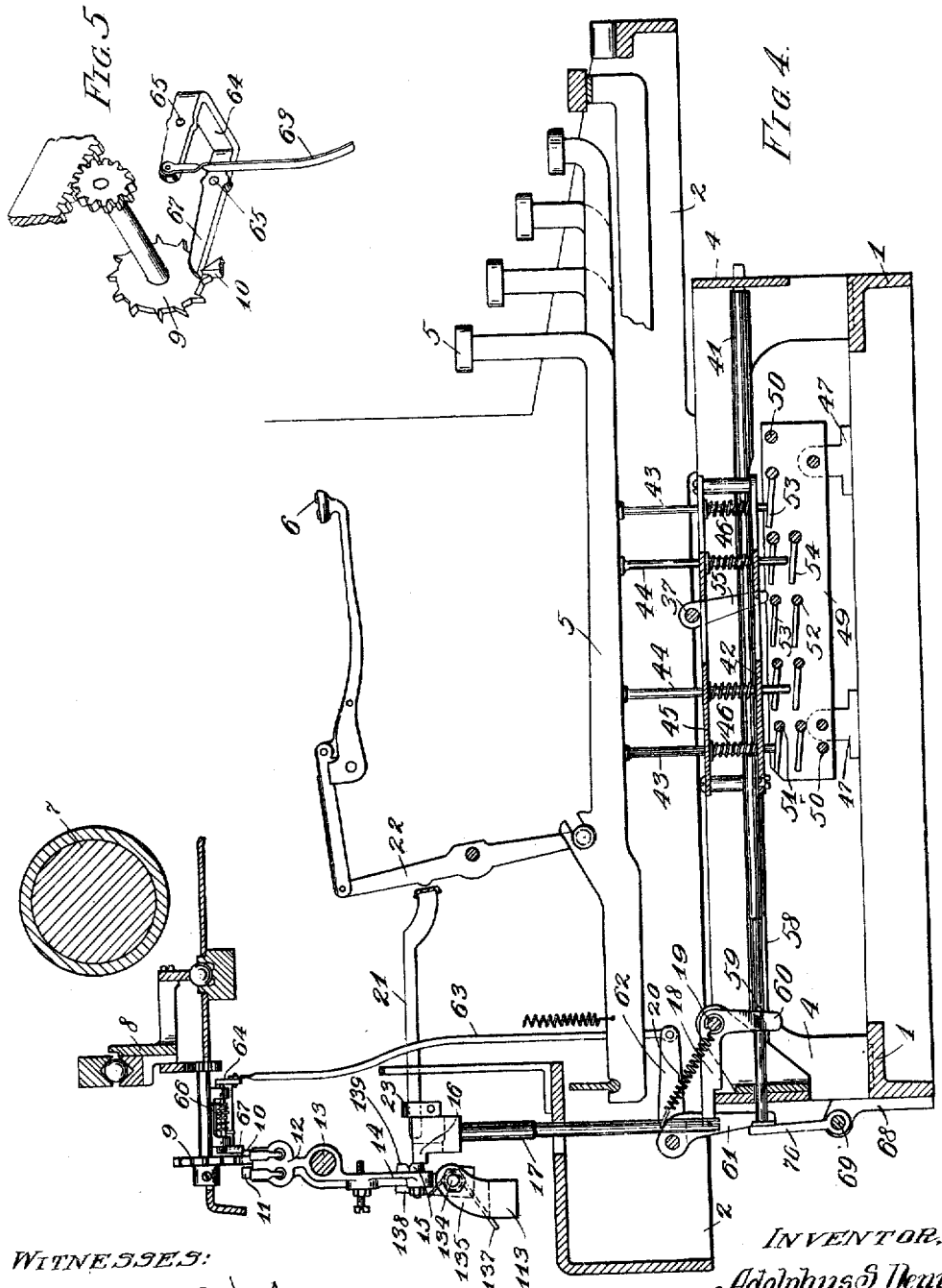

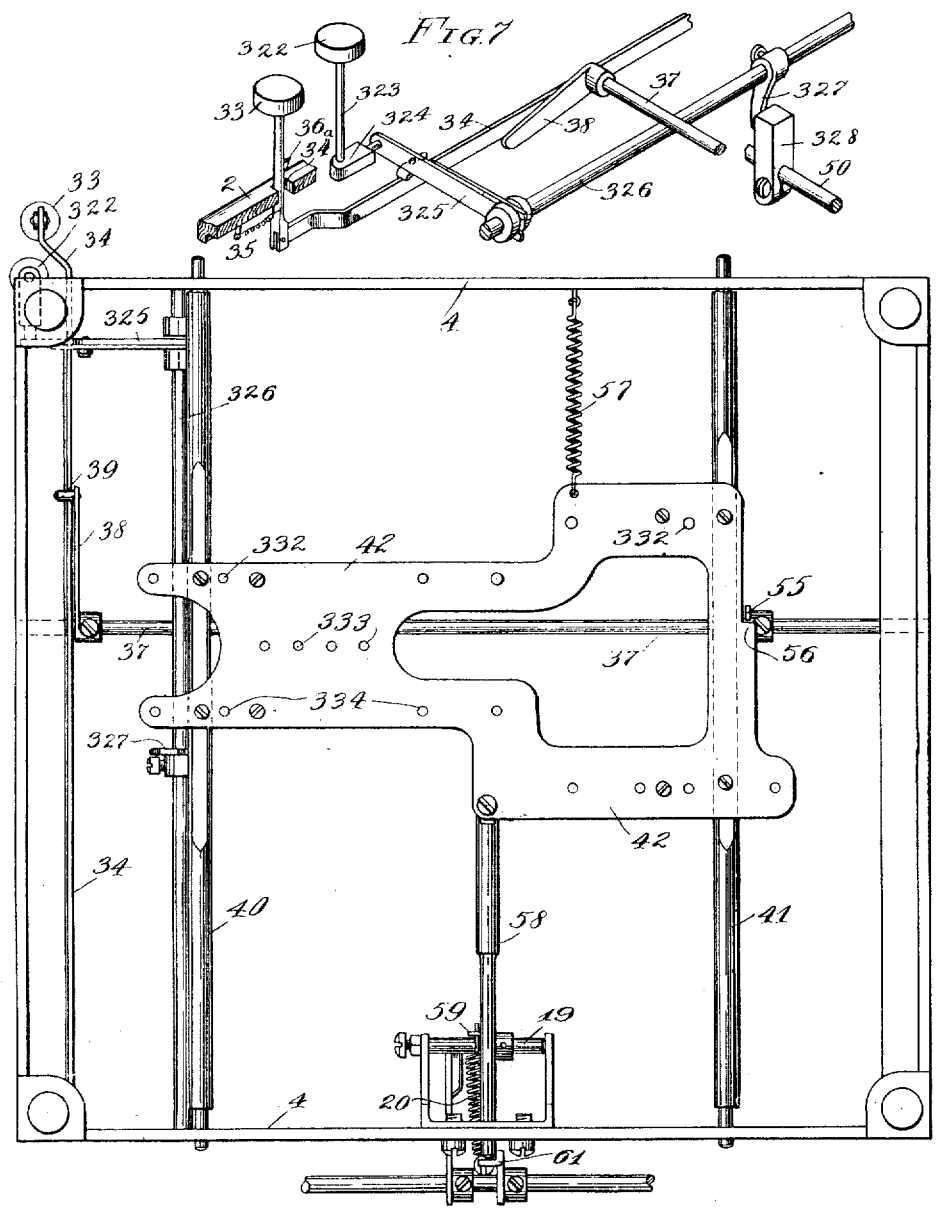

A. S. DENNIS.
COMBINED TYPE WRITING AND COMPUTING MACHINE.
APPLICATION FILED JAN. 13, 1909.

949,979.

Patented Feb. 22, 1910.
13 SHEETS—SHEET 6.

WITNESSES:
Brennan B. West
W. L. McGarrell

INVENTOR,
Adolphus S. Dennis.

BY Bates ATTYS.

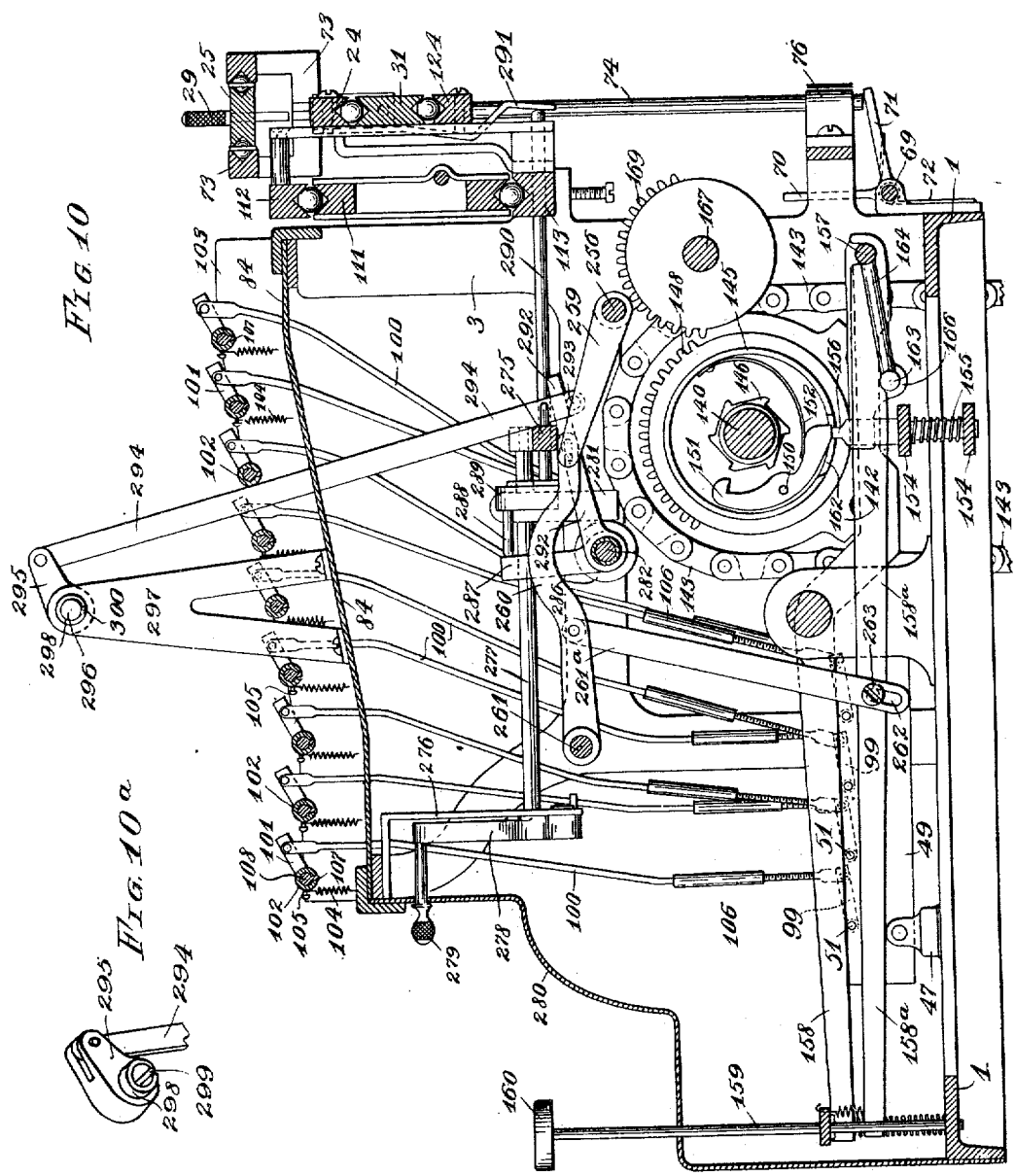

A. S. DENNIS.
COMBINED TYPE WRITING AND COMPUTING MACHINE.
APPLICATION FILED JAN. 13, 1909.

949,979.

Patented Feb. 22, 1910.

13 SHEETS—SHEET 8.

WITNESSES:

INVENTOR,
Adolphus S. Dennis
BY
ATTYS.

A. S. DENNIS.
COMBINED TYPE WRITING AND COMPUTING MACHINE.
APPLICATION FILED JAN. 13, 1909.

949,979.

Patented Feb. 22, 1910.
13 SHEETS—SHEET 9.

WITNESSES:

INVENTOR,
Adolphus S. Dennis.
By
ATTYS.

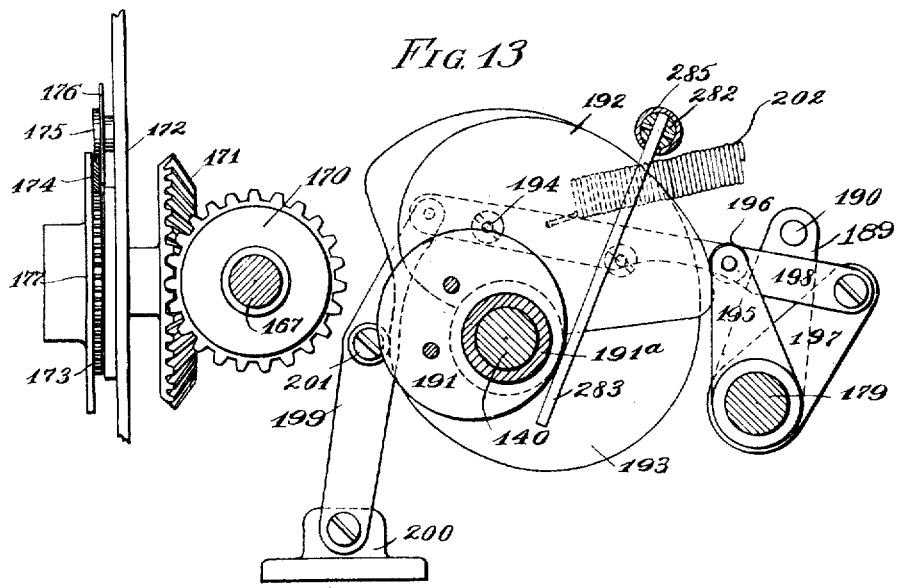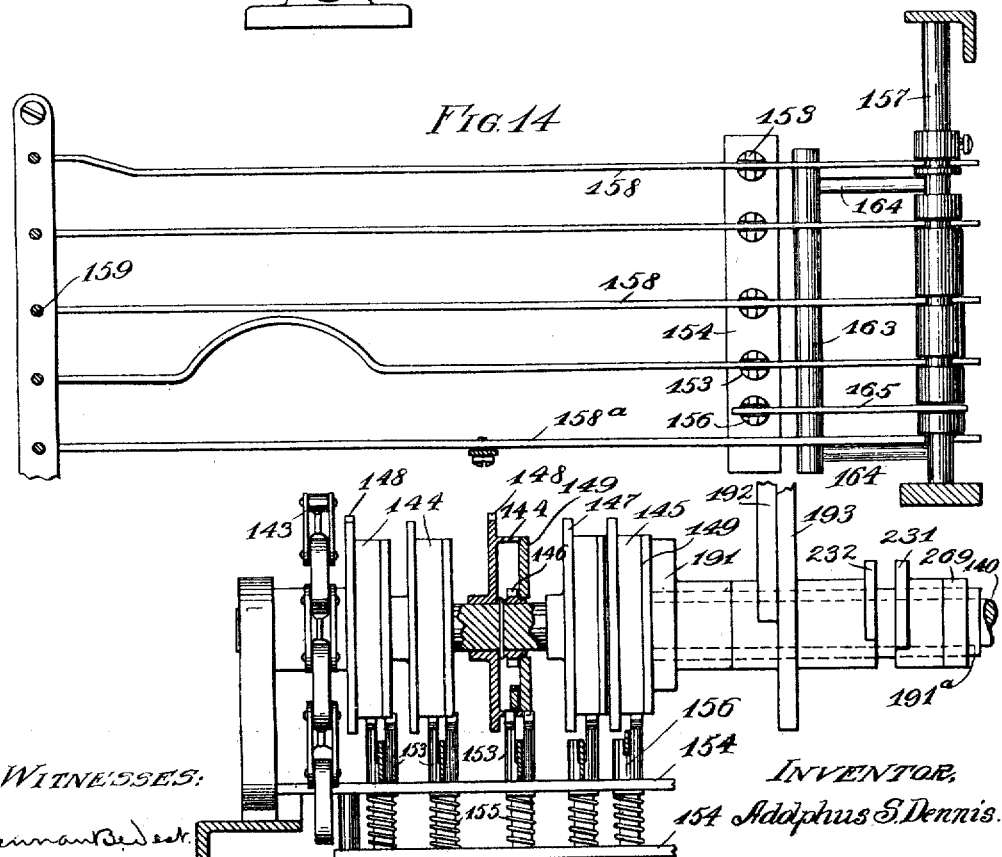

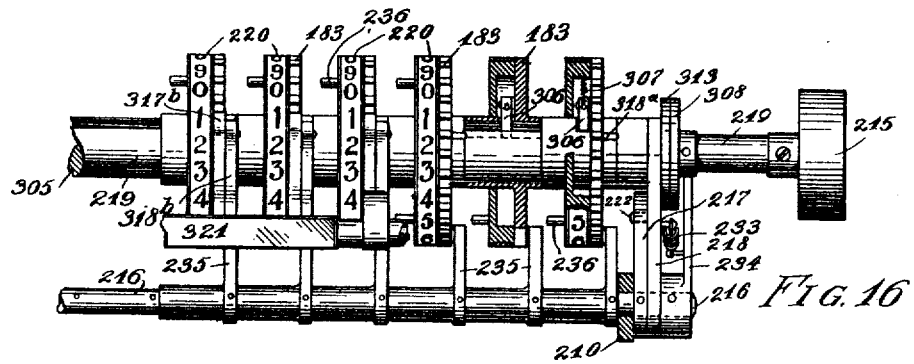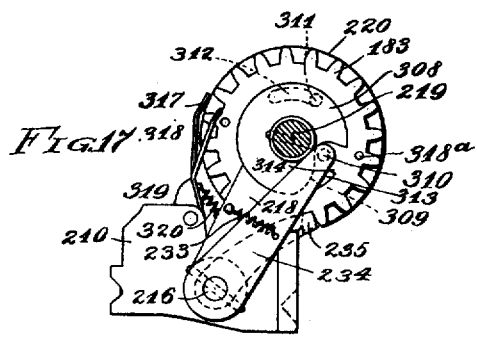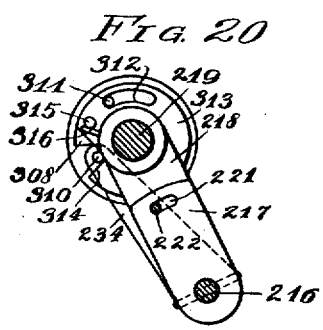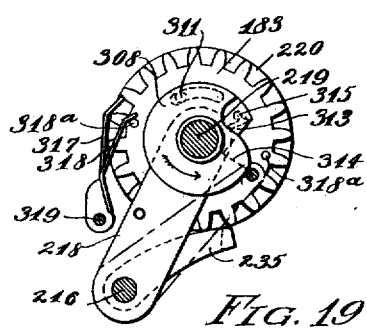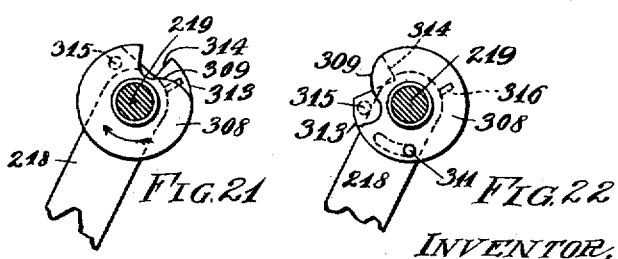

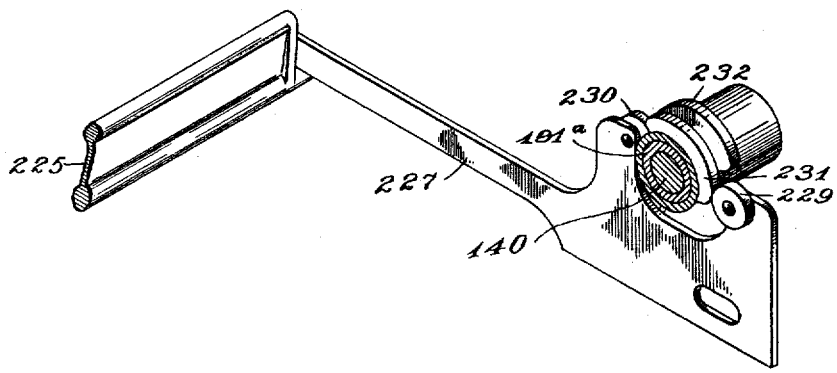
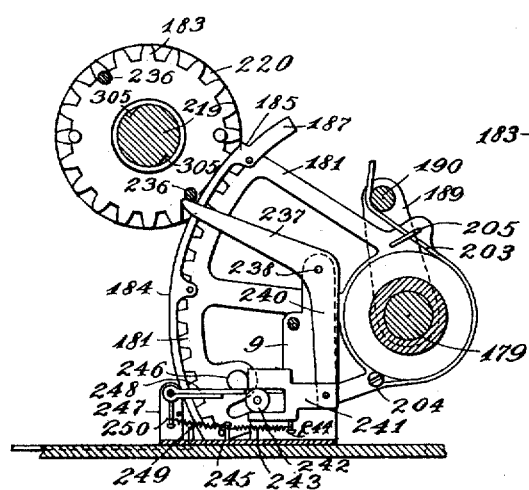
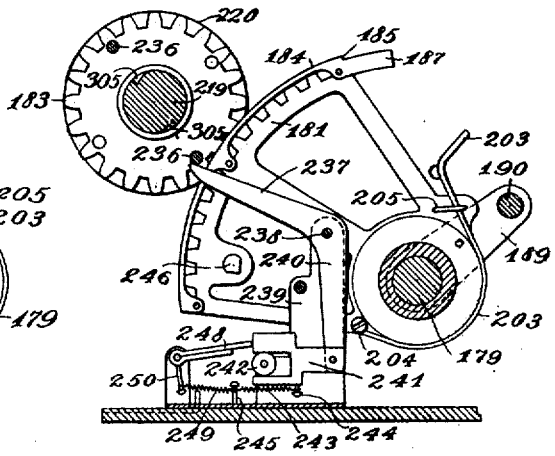

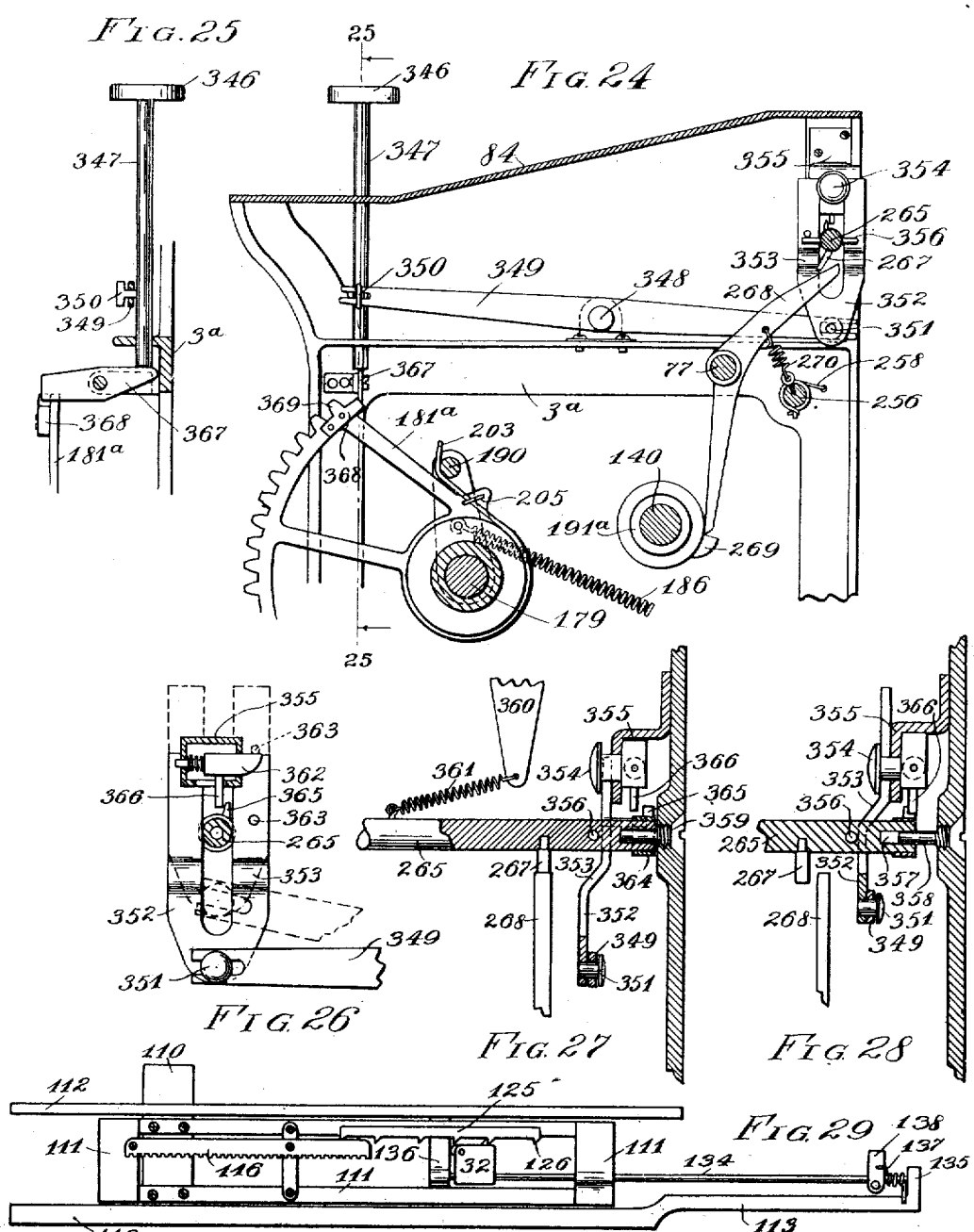

UNITED STATES PATENT OFFICE.

ADOLPHUS S. DENNIS, OF CLEVELAND, OHIO, ASSIGNOR TO BATES, FOUTS AND HULL, OF CLEVELAND, OHIO, A FIRM.

COMBINED TYPE-WRITING AND COMPUTING MACHINE.

949,979.  Specification of Letters Patent.  Patented Feb. 22, 1910.

Application filed January 13, 1909. Serial No. 472,046.

*To all whom it may concern:*

Be it known that I, ADOLPHUS S. DENNIS, a citizen of the United States, residing at Cleveland, in the county of Cuyahoga and State of Ohio, have invented a certain new and useful Improvement in Combined Type-Writing and Computing Machines, of which the following is a full, clear, and exact description, reference being had to the accompanying drawings.

This invention relates to typewriting machines and the combination therewith of a computing device, the latter being so connected with the typewriter that the operation of the numeral keys on the typewriter will, when the parts are properly disposed and the computing machine is then operated, perform various numerical computations, the numerical result depending upon the manipulation of the mechanism of the computing machine.

The various objects and the leading features of my invention may be said to be as follows:

1st. The combination with a typewriter, of computing mechanism for performing various numerical computations.

2nd. The printing, by means of the numerical keys of the typewriter, the figures representing the computation, and the simultaneous depressing in the value keybank of the computing machine the proper keys for carrying out such computation upon the subsequent operation of the computing attachment.

3rd. The combination with the typewriting machine and the computing attachment, of a tabulating mechanism for determining the position at which the numbers will be printed upon the paper in the typewriter.

4th. The provision of escapement mechanism under control of the typewriting machine for permitting the carriage of the typewriter to shift from one space to the next, and for simultaneously permitting the carriage of the computing mechanism to escape a distance substantially equal to the space between adjacent rows of value keys in said adding attachment.

5th. The provision of means for causing the computing attachment to add items which may be printed in a line transversely of the paper in the typewriter.

6th. The provision of means for causing the computing attachment to add the totals of items arranged in a vertical column, or in a plurality of such columns, on the paper of the typewriter, the different columns being added into separate totals.

7th. The provision of means for causing the numeral keys of the typewriter to depress the keys of co-digit values in the value keybank of the computing mechanism whereby problems in subtraction may be performed.

8th. The provision of means for locking the value keys of the computing mechanism in their operated positions and for automatically releasing the same substantially at the end of the succeeding operation of the computing mechanism.

9th. The provision of means for causing the operations of the computing mechanism to be successively repeated whereby problems in multiplication or division may be performed.

10th. The provision of means for causing the number of operations of the computing mechanism during the process of multiplication to be indicated for each order in the multiplier whereby, at the conclusion of the multiplying process, the complete multiplier will be indicated.

11th. The provision of means for applying external power for driving the computing mechanism whereby the operator is relieved of the work required for such operation.

12th. The provision of a series of clutches in connection with the driving mechanism, and order keys for throwing any one of such clutches into operative relation with the driving mechanism.

13th. The provision of means in combination with the clutches for automatically shifting the carriage of the computing mechanism longitudinally of the machine in order that the proper value keys may be depressed.

14th. The provision of means for operating one of said clutches irrespective of the order key depressed, said means consisting of a universal bar that is adapted to be operated by any one of the order keys.

15th. The provision of means for transferring from a lower to a higher order in the computing mechanism and of means for throwing out of operation such transfer mechanism when the character of the computation necessitates such operation.

16th. The provision of improved means for clearing the machine, or for turning the wheels of the computing mechanism back to zero.

The above and additional objects of the invention will be more clearly set forth in the following specification and in the claims appended thereto.

Figure 8:
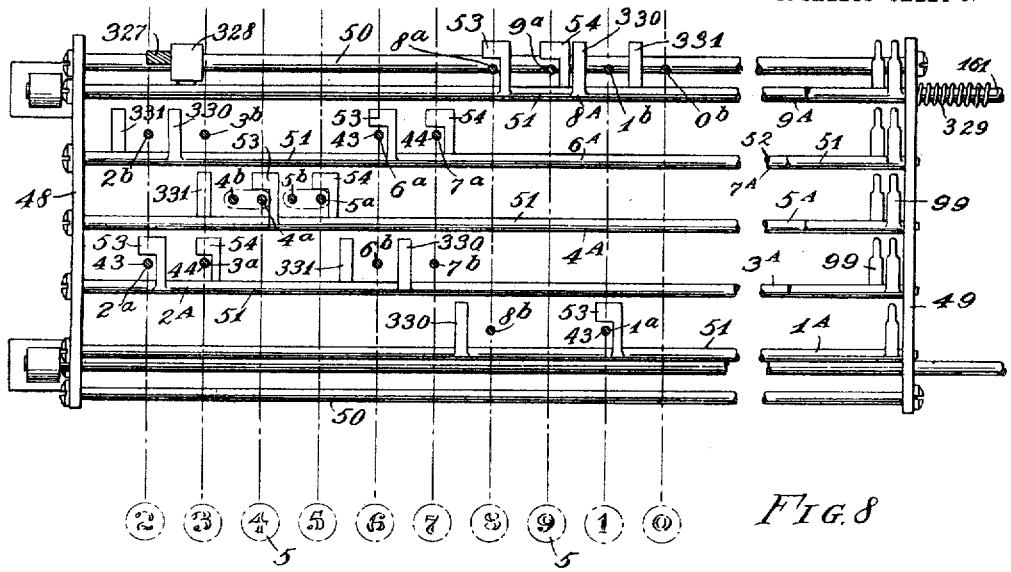
Figure 9:
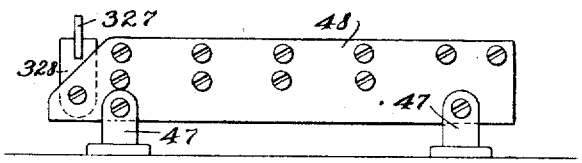
Figure 32:
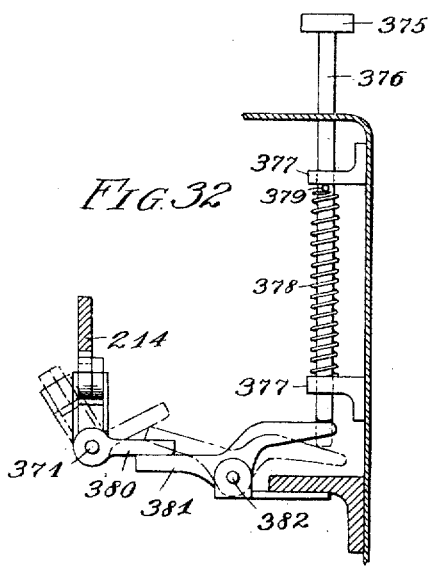
Figure 33:
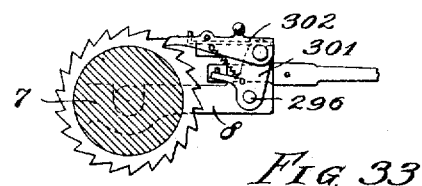
Figure 11:
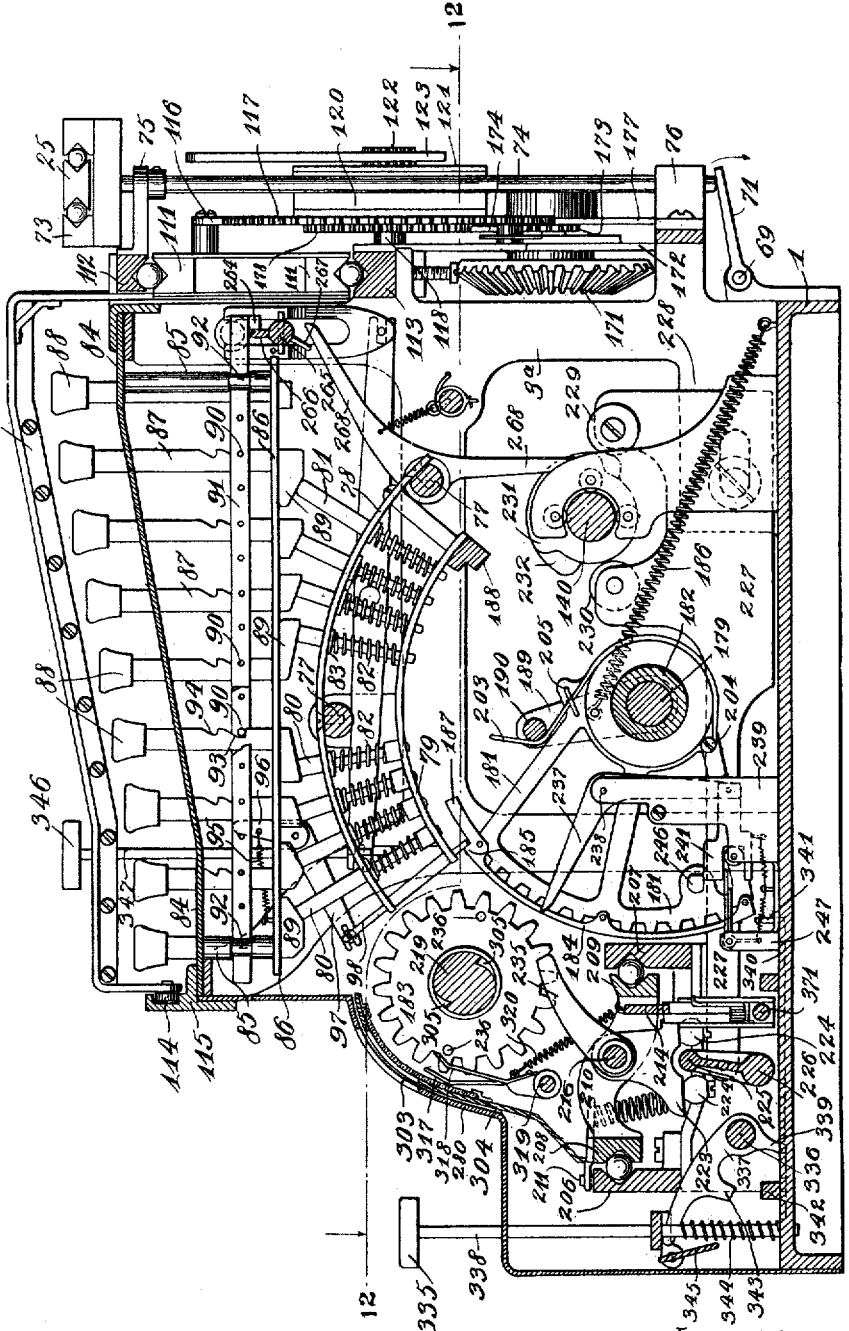
Figure 12:
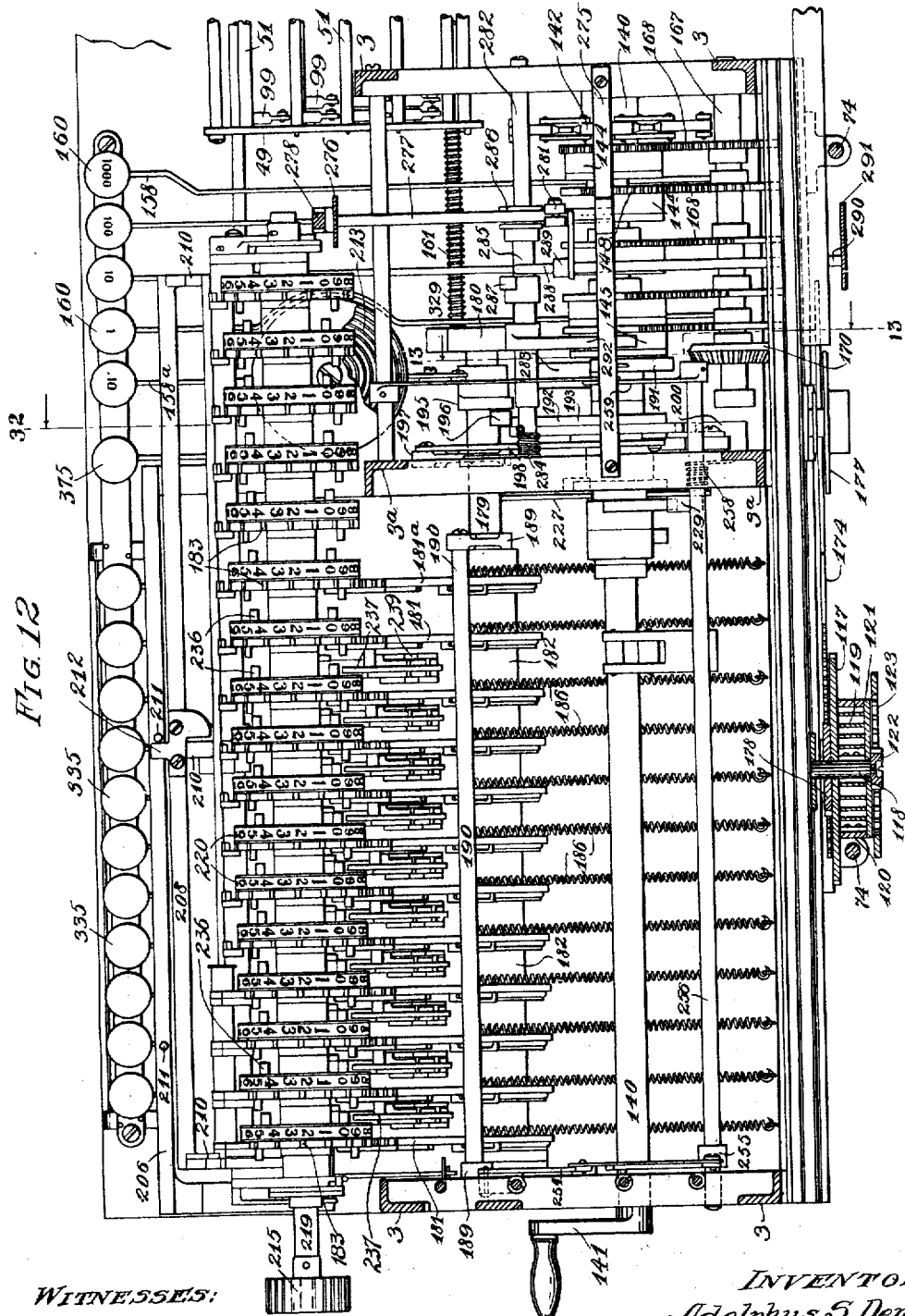

In the drawings forming a part hereof, Figure 1 is a general plan view showing the combined typewriter and computing mechanism; Fig. 2 is a rear elevation of the combined typewriter and computing mechanism; Fig. 3 is an end view of the computing mechanism looking toward the right hand end of Fig. 1; Fig. 3ª is a perspective view showing some details of the machine; Fig. 4 is a section taken through the typewriter substantially on the line 4—4 of Fig. 1; Fig. 5 is a perspective view showing a part of the escapement mechanism for the typewriter and the means for throwing the same out of operation when the computing mechanism is to be operated; Fig. 6 is a bottom plan view of the intermediate frame for the typewriter, showing one of the shifting plates and the parts connected therewith. Fig. 7 is a perspective view showing the addition and subtraction keys and the adjacent parts that are operated thereby; Fig. 8 is a plan view of the rock shafts that are mounted below the intermediate frame for the typewriter and which are rocked by the numeral keys of the latter, said view also showing the frame in which said shafts are mounted; Fig. 9 is an end view of the frame shown in Fig. 8, said view also indicating the positions of the rock shafts therein; Fig. 10 is a transverse section through the computing mechanism taken substantially on line 10—10 of Fig. 1 and looking in the direction of the arrows thereon; Fig. 10ª is a perspective view of a detail; Fig. 11 is a transverse section taken substantially on the line 11—11 of Fig. 1 looking toward the left; Fig. 12 is a horizontal section through the computing mechanism taken substantially on line 12—12 of Fig. 11 and looking in the direction of the arrows thereon; Fig. 13 is a detail view of the eccentric and cam on the drive shaft, with portions of the immediately adjacent mechanisms operated thereby, said view also showing the gearing for moving the computing and typewriter carriages so as to bring them to the proper orders; Fig. 14 is a plan view of the levers that are operated by the order keys, said view showing the universal bar and the plungers for controlling the driving clutches. Fig. 15 is a view partly in section and partly in elevation showing the clutches, the plungers for controlling the latter, and the order keys for controlling the plungers, said view also showing portions of the cam shown in Fig. 13; Fig. 16 is a view partly in section and partly in elevation of the computing wheels and of means for turning the latter to zero position; Figs. 17, 18, 19, 20, 21 and 22 are detail views showing the construction and the operation of the means for turning the computing wheels to zero; Fig. 23 is a perspective view showing the rocking web bar for throwing the computing head into and out of operative position, and the mechanism for rocking said bar; Fig. 24 is a transverse sectional view through the computing mechanism showing the repeat key and the connections therewith for preventing the release of the value keys, and also the means connected with said release key for permitting one of the operating segments to have a slight movement at each operation of the computing machine whereby the number of such operations will be indicated on certain of the computing wheels; Fig. 25 is a section taken through Fig. 24 substantially on the line 25—25 thereof and looking in the direction of the arrows; Figs. 26, 27 and 28 are detail views illustrating the construction and operation of the mechanism for throwing out of operation the means for locking the value keys in their depressed positions; Fig. 29 is a rear elevation showing portions of the carriage for the computing machine and parts carried thereby and of the escapement mechanism for controlling the operation of such carriage from the typewriter; Figs. 30 and 31 are side and end elevations respectively of the escapement mechanism for the carriage of the computing mechanism; Fig. 32 is a transverse section through the front of the computing machine adjacent the shifting key, said view being taken substantially on the line 32—32 of Fig. 12 and looking in the direction of the arrows; Fig. 33 is a detail view showing the means for turning the platen roller for the typewriter automatically when the computer is operated. Fig. 34 is a sectional view taken alongside one of the computing wheels and illustrating the transfer mechanism in one of its positions; and Fig. 35 is a view similar to Fig. 34 but showing the transfer mechanism in another of its positions.

Taking up a more complete description of my invention by reference to the drawings, in which the same reference character designates the same part throughout the several views, 1 represents a base frame which is substantially of the combined length of the typewriter and the computing mechanism, the frame 2 of the typewriter being supported by the left-hand end of the base frame, while the frame 3 of the computing mechanism is supported upon the right-hand end thereof. Beneath the typewriter frame 2 and the base plate 1, is an auxiliary frame 4 upon which the typewriter rests, said frame being shown in inverted plan view in Fig. 6 of the drawings, and being of substantially the width of the typewriter and having a length substantially equal to the width of the base plate. This intermediate frame is adapted to be attached to the typewriter so as to be removable from the base plate when the typewriter is removed.

*The typewriter.*—As many forms of typewriters using the universal keyboard are equally adapted for use with my invention, I shall describe only those parts of the typewriting machine which come into active use during the computing operation. Such parts are best illustrated in Figs. 1 and 4 of the drawings, in which 5 represents the numeral keys and 6 the numeral type for making the impressions on the paper by printing against the platen roller 7. The platen roller is journaled upon a shifting carriage 8 in the usual manner, said carriage being controlled in its movements by an escapement wheel 9 with which coöperates the escapement pawls 10 and 11. These pawls are mounted upon a swinging lever 12 that is pivoted upon a shaft 13, said lever having a depending arm 14 with a lug 15 against which a head 16 is adapted to press for swinging the lever 12 so as to shift the pawl 11 into position to engage with the escapement wheel 9. The head 16 is carried upon the upper end of a stem 17 that is pivoted to the rear of a bell-crank 18, said bell-crank being pivoted on a rod 19. A spring 20 connects the rod 19 with the stem 17 in such a manner as to tend to maintain the head 16 in its forward and downward position. 21 is a horizontal plunger that is moved rearwardly by the levers 22 forming part of the connections between the keys 5 and the type carrier. This plunger has a block or collar 23 for engaging with the front of the head 16 so that, when the plunger is forced rearwardly, the lever 12 will be swung so as to permit the carriage to escape. By rocking the bell crank 18, in a manner hereinafter described, the stem 17 will be lifted until it fails to engage with the lug 15; and, in this way, the escapement mechanism for the typewriter carriage is thrown out of operation. It will be understood that the typewriter carriage is moved, when permitted to escape, by a spring 24 (see Fig. 2) in the usual manner.

*The tabulator.*—The movements of the typewriter carriage are transmitted to a tabulating bar 25 that is carried by the computing machine, through the medium of a link 26 that is removably secured to the typewriter carriage at one of its ends, its other end being permanently pivoted to a bracket 27 that is secured to the tabulating-bar. The tabulating-bar is provided with a row of vertical perforations 28 in which may be inserted tabulating-pins 29, which pins may be arranged in the said perforations according to any desired order. This tabulating-bar with its pins has the usual function of permitting the typewriter carriage to escape and move to the proper extent for bringing the paper on the typewriter carriage in position to receive the printed impressions of the numeral types. In this way the various items on the sheet may be arranged in vertical columns and the columns may be placed in any desired position upon the sheet. The tabulating bar and the typewriting carriage are arrested by the engagement of the pins 29 with an escapement mechanism 30 that is mounted upon a rack-bar 31 of the computing mechanism. The escapement mechanism 30 coöperates only with the pins 29 of the tabulating bar, permitting said bar with the typewriter carriage to move the distance between the adjacent pins before being again arrested. This escapement mechanism, therefore, controls the relative movement between the tabulating-bar and the rack-bar 31. Normally, the bar 25 is held elevated so as to maintain the pins 29 out of engaging position with the escapement mechanism, and said bar must be lowered into operative position when the computing mechanism is to be used in connection with the typewriter. At such time the escapement mechanism for the typewriter is maintained out of operation, and the movements of the carriages on the typewriter and the computing mechanism are controlled by an escapement on the latter carriage, said escapement mechanism being shown in Fig. 29 at 32, and being hereinafter more fully described.

*The adding-key and its connections.*—I shall now describe the mechanism for throwing out the escapement for the typewriter and for placing the tabulating-bar in its operative position, and will invite attention to Figs. 1 to 7 inclusive of the drawings.

33, Figs. 1 and 7, is a special key which I shall herein term the adding key, said key being mounted for vertical movement in a slot 34 in the frame 2 of the typewriter and being pivoted to a rearwardly extending key-lever 34 near the forward end of the latter. A spring 35 connects the key-stem with the frame in front of the slot and tends to draw the stem toward the front end of the slot. In order to hold the key in its depressed position, the stem is provided with a lug 36 on its rear side. When the key is depressed and the same is rocked slightly to the rear, the lug engages with the frame 2 and holds the key and its lever 34 depressed. This lever is pivoted at its rear end to the rear side of the intermediate frame 4.

Extending transversely across the frame 4 and journaled in the side members of the latter is a rock shaft 37, said rock shaft being provided with a crank arm 38 having a laterally extending pin or roller 39 that projects beneath the key-lever 34 so that, upon the operation of the key-lever, the shaft will be rocked. Extending from front to rear of the frame 4 and guided in perforations in said frame are sliding rods 40 and 41, said rods being turned to a smaller diameter at their ends where they slide in said perforations. Secured to the under side of said rods near their centers is a plate 42, said plate being of the formation shown in Fig. 6 of the drawing and having a series of perforations therein to receive and guide the lower ends of vertically extending plunger rods 43 and 44, the rods 44 being longer than the rods 43, for a purpose hereinafter set forth. Above the plate 42, and supported therefrom, is a similar plate 45, said plate being provided with perforations above those in the lower plate through which the plungers 43 and 44 are also guided. The springs 46 between the plate 42 and the collars or pins on the plungers tend to thrust the plungers upwardly. The upper ends of the plungers are immediately below the numeral key-levers 5 of the typewriter, which levers depress their corresponding plunger or plungers when the numeral keys are operated.

Supported in brackets 47 from the base plate 1 is a frame having end plates 48 and 49 (see Figs. 8 and 9), said end plates being secured together by rods 50. Journaled in the end plates is a series of rock shafts 51 and 52, the shafts 52 being preferably immediately below the shafts 51, and there being altogether nine of said shafts. Projecting rearwardly from the shafts 51 and 52, and arranged thereon in positions to coöperate with the plunger rods 43 and 44, are selecting fingers 53 and 54, the fingers 53 being on the shafts 51 and the fingers 54 being on the shafts 52. Each of these fingers is L-shaped; and, during the operation of the typewriter alone, the said fingers are so positioned with respect to the lower ends of the plungers 43 and 44 as to permit said plungers to move downwardly in the angle of the L without engaging the fingers,—Fig. 8 showing in section the plungers, and also distinguishing by shading the fingers 54 from the fingers 53.

As stated, the plates 42 and 45 are carried by the sliding rods 40 and 41, which rods and plates are normally in their forward positions, as shown in Figs. 4 and 6. Upon the operation of the adding key 33 and the consequent rocking movement imparted to the rod 37, a downwardly extending arm 55 on the rock shaft 37, engaging with a shoulder 56 on the plate 42, moves the plates, the rods 41 and the plungers 43 and 44 rearwardly so as to bring the lower end of the plungers above the lateral arms of the L-shaped fingers 53 and 54, so that, upon the depression of a numeral key 5, the corresponding rock shaft or shafts 51 and 52 will be rocked. Although the purpose of such operation will be fully set forth hereinafter, it may now be stated that the rock shafts 51 and 52 depress keys in the computing attachment and thus determine the values to be dealt with in the next succeeding operation of the computing mechanism.

From the above description it will be understood that the operation of the adding key places the connections between the typewriter and the computing mechanism in operative condition, which condition is maintained so long as the adding key is held depressed by the engagement of its lug 36 with the frame 2. When the adding key is to be released it is only necessary to draw said key forwardly until the lug 36 escapes from the frame, when a spring 57, that connects the plate 42 with the frame 4, returns the plates and their plungers to normal position and, through the rock shaft 37, lifts the adding lever-key 34. When the computing mechanism is to be thus thrown into operative relation with the typewriter, it is necessary to throw out of operation the escapement mechanism for the typewriter and to lower the tabulating bar 25 so as to bring the tabulating pins 29 in position to engage the escapement mechanism 30 for the said bar; and I shall now describe the means by which these different operations are accomplished.

Connected with the plate 42, Fig. 6, is a rearwardly extending plunger 58, said plunger being guided at its rear in the intermediate frame 4. Said plunger has a laterally extending pin 59 that is adapted to engage with a downwardly extending arm 60 of the bell-crank 18, Fig. 4, whereby, when the plunger is thrust rearwardly by the operation of the adding key-lever 34, the bell-crank 18 will be rocked to lift the stem 17 and the head 16 so as to carry the latter above the lug 15 on the lever 12 which carries the escapement-pawls 10 and 11. Thereafter, the operation of the numeral keys 5 on the typewriter will not rock the lever 12, so that the typewriter escapement is thrown out of operation. The pawl 10, however, will remain in the plane of the escapement wheel, and it must be thrown out of engagement with said wheel so as to leave the same free to turn. For this purpose I employ a bell-crank 61 having an arm depending into the path of movement of the rear end of the plunger 58 so as to be swung thereby when the adding-key is operated. To the forwardly extending arm 62 of said bell-crank I attach the lower end of a connecting rod 63, the upper end of which is pivoted to a yoke 64, see Fig. 5. The opposite sides of this yoke are perforated at 65 for the reception of a pin upon which the yoke is pivoted, said yoke being normally held in the position shown in Fig. 5 by a spring 66, see Fig. 4. One side of the yoke is extended at 67 so as to project over the upper end of the escapement pawl 10, whereby, upon the operation of the yoke, said escapement pawl will be depressed and thereby removed from the wheel 9, thus leaving the latter perfectly free to turn. As has been stated, the tabulating bar 25 is attached to the typewriter carriage through the link 26, and the carriage and bar are moved by the spring 24 on the typewriter. Upon the depression of the escapement pawl 10, the typewriter carriage and the tabulating bar are thrown to the right, as viewed in Fig. 2, and they would continue this movement to the end of their travel unless arrested by the tabulating pins 29. These are normally held above the escapement 30, and must consequently be lowered into engaging relationship therewith. For this purpose, I mount in brackets 68 on the rear of the base frame 1 a rock shaft 69, said shaft having an upwardly extending arm 70 at the rear of the plunger rod 58, and a pair of rearwardly extending arms 71 below the tabulating bar. A coil spring 72, operating in a well known manner in connection with one of the arms 71, operates to hold the latter arms elevated and the arm 70 against the end of the plunger 58.

As appears from Figs. 3 and 10, the tabulating-bar 25 is mounted to slide in ball-bearings between the ends of upwardly extending arms of a U-shaped guide frame 73, which frame is supported upon the upper ends of lifting-rods 74, said rods being guided in brackets 75 and 76 that project from the frame 3 of the computing machine. The lower ends of the lifting-rods rest upon the arms 71 of the rock shaft 69, and the spring 72 normally maintains the frame 73 and the tabulating-bar in their upward positions. Upon the operation of the adding-key and the consequent backward thrust of the plunger 58, the rod 69 is rocked to lower the arms 71 thereon and thus lower the tabulating-bar and the pins therein until the latter are in position to engage with the escapement 30. The same movement, therefore, of the adding key operates to release the typewriter carriage and the tabulating-bar and to bring the latter into position to be arrested by the escapement 30. The position of the first pin 29 in said bar will determine the point at which the typewriter carriage will be arrested.

*The keyboard for the computing mechanism.*—Toward its left-hand end, the frame 3 of the computing mechanism is provided with an intermediate or partition frame 3ª, see Figs. 11 and 12. Extending from the partition frame to the right hand end of the main frame, are stationary rods 77, said rods supporting a series of curved guide plates 78. Separated from and supported by the plates 78 is a corresponding series of curved guide plates 79, the latter plates being substantially concentric with the plates 78. Each of these plates is provided with a series of perforations for spring-pressed plungers 80 and 81, there being four of each of the plungers 80 and 81 in each set of said plates 78 and 79. As appears from Fig. 11, the plungers 80 extend barely through the plates 79, while the plungers 81 extend through said plates to a farther distance, for a purpose hereinafter set forth. The plungers 80 and 81 are respectively on opposite sides of the center of said plates and are separated some distance at the center, for a purpose which will also be made to appear. The plungers are normally maintained in their upper positions by springs 82 which surround the plungers between the plates 78 and 79, bearing with their lower ends upon the latter plates and with their upper ends upon collars or pins 83 connected with the plungers. Also supported by the partition frame and the end frame, is a top plate 84, said plate serving as the upper part of the casing for the computing mechanism. Supported by said plate 84 below the latter, and separated therefrom by posts 85, is a guide plate 86, said plates 84 and 86 serving as guides for the stems 87 of the keys 88 of the computing machine, which keys, in order to distinguish the same from other keys of the computing machine hereinafter described, I shall term value keys. The lower ends of the key stems 87 are provided with lateral projections or feet 89 which extend into positions for engagement with the upper ends of the respective plungers 80 and 81, whereby, upon the depression of a key 88, its corresponding plunger will be thrust downwardly through the plates 79 into position to engage with certain of the operating parts hereinafter to be described, and thereby determine the value of the numerical computation that is to follow upon an operation of the computing machine. The key stems 87 are returned to their outer position by the springs 82 of the plungers, and they are limited in their outer movements by the feet 89 which engage with the plate 86. The keys 88 are held in their downward positions by pins 90 on locking frames 91, said frames each consisting of a pair of parallel plates that are held together by the pins 90, being guided in their fore-and-aft movement by the posts 85, the latter being provided with circumferential grooves 92 in which said frames move. The pins 90 are adapted to engage in notches 93 and 94 on the rear of each of the key stems, the notches 93 receiving the pins when the keys are in their outward positions, and the notches 94 receiving said pins when the keys are fully depressed. Each of the transverse rows of keys in the value keyboard has its own locking frame 91, and each of said frames is drawn forwardly into locking position by a spring 95 that is secured at one of its ends to the plate 86 and at its other end to an arm 96 of a bell-crank, said bell-crank being pivoted below the plate 86 and engaging with one of the pins extending between the plates comprising the corresponding frame 91. In case the wrong key in one of the order rows of the value key-bank should be depressed, it may be released upon the depression of another key in the same row, which will cam back the lock-frame for that row until the pin 90 can escape from the notch 94 of the wrongly depressed key, which key will thereupon be thrown outwardly by the spring 82 for the corresponding plunger. It may here be stated that the bell-cranks 96 each have a forwardly extending arm 97 with a slot in its end, in which is pivoted the upper end of a plunger 98, the function of which will be hereinafter set forth, said plungers being guided in perforations in their respective sets of plates 78 and 79.

*Value key operating mechanism.*—As has been hereinbefore stated, the value keys of the computing machine are depressed by the depression of the numeral keys of corresponding value in the typewriter. This statement is not true, however, in the operation of the machine for subtracting, in which case the operation of a key of a certain value in the typewriter depresses the key in the computing machine having the co-digit value,—the co-digit being that number which, when added to the value of the depressed key in the typewriter, will make nine—which latter operation will be later described.

I will now describe the connections between the typewriter keys and the value keys of the computing mechanism, and will again invite attention to Figs. 4 and 8 of the drawings.

Upon the depression of a numeral key 5, the corresponding rock shaft 51 or 52 is operated through the plungers 43 or 44 and the selecting fingers 53 and 54. Each of the shafts 51 and 52 is provided near its right hand end with a crank arm 99, shown also in dotted line in Fig. 10 and in full line in Fig. 12. The crank arms 99 are connected, through rods 100, to similar crank arms 101 that are mounted on tubular shafts 102 that extend longitudinally of the computing machine, terminating adjacent the row of keys of highest order in the value key bank, as appears from Fig. 1, said tubular shafts being journaled at their left hand ends in a plate 103 that is carried by the frame 3 of the computing mechanism. The shafts 102 are returned to normal position by springs 104 that are connected with the top plate 84 and with pins 105 that project from the tubular shafts. The connecting rods 100 are adjustable in length, being formed in two parts that are connected together by an internally threaded sleeve 106 that engages with threads on the lower part of said rods. Each of the tubular rods 102 is slotted, preferably along their lower sides as shown, through which slots project pins or keys 107 on shafts 108 that extend into the said tubular shafts. By this construction, the rocking movements imparted to the tubular shafts will also rock the shafts 108.

As will be seen from Fig. 1, there are nine value keys in each transverse row of the value keyboard, so that there are nine longitudinal rows of keys in said keyboard. Each of said longitudinal rows of keys has its corresponding shafts 102 and 108, so that there are nine sets of said shafts, the shafts 108 extending slightly above and slightly in advance of its corresponding row of value keys. The function of the shafts 108 is to depress the value keys, and this is carried into effect by a depressing finger 109 on each of said shafts, said fingers pressing upon the heads of the keys when the shafts are rocked.

The right hand ends of the shafts 108 are journaled in a plate 110 which, as appears from Figs. 1, 11 and 29, is attached to the carriage 111 of the computing machine, said carriage being mounted to slide in ball-bearings between guides 112 and 113 that are secured to the frame of the computing machine. The forward end of the plate 110 is bent downwardly and is provided with a roller 114 which travels in a groove in a front plate 115 that is carried on the front of the casing for the computing mechanism.

*The computer carriage and the escapement therefor.*—The carriage for the computer is shown in detail in Fig. 29, which figure also shows the guides 112 and 113 for the carriage and the plate 110 in which the rock shafts 108 are journaled. The carriage 111 has secured thereto a rack bar 116, with which meshes a spur gear 117, see Figs. 2, 11 and 12 that is journaled on a stub shaft 118 projecting from the guide 113. Secured at one of its ends to the stub shaft 118 is a spiral spring 119, the other end of which is secured to the gear 117, said spring being under tension so as to turn the gear 118 to the left, as viewed in Fig. 2, or opposite the hands of a watch, so as to move the rack 116 and the carriage 111 toward the left in said figure. The spring 119 is contained within a casing 120, having a rear plate 121, said casing being secured to the gear 117 so as to turn therewith. Secured to the plate 121 of the casing concentric with the shaft 118 is a pinion 122, said pinion meshing with a rack 123 on the rack-bar 31. As appears from Fig. 10 of the drawings, the rack-bar 31 is mounted to slide in ball-bearings between guides 124 of the carriage 111, and said bar 31 carries the escapement mechanism 30 for the tabulating-bar. The carriage 111 also has secured thereto a ratchet escapement-bar 125, the teeth on the same being shown at 126 in Fig. 29. With said teeth coöperate escapement pawls 127 and 128, said pawls being mounted in the frame 32 of said escapement mechanism (see Fig. 30). At their rear ends these pawls are pivoted upon a pin or rod 129 in said frame, the pawl 128 being slotted at 130, so as to be capable of longitudinal movement on its pivot pin. The pawls are normally held in their forward and upward positions by springs 131 in the frame, which exert a forward and upward thrust upon the free ends of the pawls, the latter being prevented from rising too far by a pin 132 in the frame 32 which engages with lugs 133 on said pawls. The frame 32 of this escapement mechanism is secured to one end of a rock-shaft 134, said rock-shaft being journaled at one of its ends in a bracket projection 135 of the guide-bar 113, and at its opposite end in a stationary bracket 136 that is carried by the frame of the computing machine. A spring 137, which engages at one of its ends with the guide-bar 113 and at its other end with an arm 138 secured to said shaft, normally holds the latter in position to cause the escapement-pawl 128 to lie in the plane of the teeth 126 on the ratchet-bar 125. As appears from Fig. 2, the shaft 134 projects to the rear of the typewriting machine, and the arm 138 on said shaft is situated at the rear of the head 16 on the stem 17. See Fig. 4. The upper end of the arm 138 is provided with a lug 139 similar to the lug 15 on the escapement-lever 12. When said head 16 is lifted, upon the depression of the adding-key, as hereinbefore described, the rearwardly extending lug on said head is carried beyond the lug 15, as hereinbefore stated, and is brought opposite and into coöperative relation with the lug 139 on the arm 138. It will also be remembered that, simultaneous with the lifting of said head, the escapement pawl 10 controlling the typewriter carriage was thrown out of operative position by the yoke 64 of Fig. 5. When the head is lifted, the subsequent operations of the typewriter keys, camming backwardly on the plunger 21, rock the arm 138 and the shaft 134, and thereby rock the frame 32 of the escapement mechanism for the computer carriage. The tension of the spring 119 is sufficient to cause the tooth 126 on the ratchet bar 125 to force backwardly the pawl 128 against the tension of its spring 131 so as to bring its operating face into substantial alinement with the operating face of the adjacent pawl 127; and this is the normal position of these pawls. When, therefore, the shaft 134 is rocked by the depression of a key on the typewriter, the frame 32 is moved so as to throw the pawl 127 into position for engagement with the same tooth 126 that had previously been engaging with the pawl 128, which latter pawl, being freed from the ratchet bar, is pushed forwardly by its spring into the position shown in Fig. 30, leaving sufficient space between said pawls for the tooth 126 to pass, which operation takes place when the typewriter key is released. The ratchet-bar 125 and the carriage 111 being thus temporarily released, the carriage moves, under the stress of the spring 119, until the next succeeding tooth 126 on the ratchet bar engages with the pawl 128, as hereinbefore described.

As appears from Fig. 2, when the gear 117 and the pinion 122 are permitted to turn by the escapement mechanism just described, the rack-bar 123 moves to the right in said figure a short distance, while the rack-bar 116 and the carriage 111 move to the left a greater distance, the difference in the distances moved being due to the difference in the sizes of said pinion and said gear. The movement of the rack 123 carries the escapement 30 for the tabulator a distance to give the ordinary spacing on the typewriting machine while the carriage 111 is moved a distance approximately equal to the space between the transverse rows of value keys on the computer. Thus the typewriter is accurately spaced and the depressing fingers 109 are brought into position for depressing a key in the next succeeding row of the keybank, the shafts 108 being drawn out of the tubular shafts 102 as the plate 110 of the carriage 111 moves.

In writing the numbers upon the typewriter it is very desirable to form a wider space between the decimals and units, between the hundreds and thousands, etc., to prevent confusion in reading. For this reason the teeth on the ratchet-bar 125 are not spaced equidistantly, as appears from Fig. 29, the wider spaces between the teeth permitting the carriage 111, and consequently the typewriter carriage to escape a greater distance than normal. By this arrangement the depressing fingers 109 do not always press upon the centers of the keys 88, the shorter distance between the teeth 126 being a trifle shorter than the distance between the rows of keys in the value keybank, while the greater distance between said teeth is slightly greater than the distance between said rows of keys. By properly spacing the teeth 126, the loss of movement of the depressing fingers caused by the narrow spacing of the teeth is balanced by the excess of movement when the wider space is reached.

*Driving mechanism for computing machines.*—The operation of the numeral keys of the typewriter performs no part of the computing process except to depress the keys in the value keybank and to operate the escapement for the computer carriage, which are done by the mechanisms hereinbefore described. The power for operating the computer may be manually applied by a crank or lever, but I prefer to use some external power,—such as an electric motor—for this purpose. I have, therefore, shown the machine as supplied with both a manual and power driven operating mechanism.

Toward the lower rear part of the machine I journal in the side frames 3 a drive shaft 140, which shaft I have shown as provided with a crank 141 on its right hand end, and with a sprocket wheel 142 near its left-hand end, over which wheel I lead a sprocket chain 143, Figs. 10, 12 and 15 which may be driven by any suitable form of driving mechanism. Near its left-hand end this shaft is provided with a series of clutches, the outer members 144 of which appear in Figs. 12 and 15. The inner or right-hand clutch being somewhat different from the other clutches, its outer member is designated 145, as appears from Fig. 15. Within said outer members I pin, or otherwise secure to the shaft 140, ratchet driving members 146, Fig. 10 said members turning with the shaft. The outer driving members have outwardly extending flanges 147 which are provided with a series of spur-gear teeth 148, the numbers of the gear teeth on the said flanges differing with the location of the clutches along the shaft 140 and increasing successively toward the left as appears from Fig. 12. In Fig. 10, in which the member 145 of the right-hand clutch appears, but five teeth are shown on said member, whereas said figure shows beyond said member the projecting teeth 148 on the clutches beyond. From this description it will be understood that, the special clutch member having five teeth, the adjacent clutch member to the left has six or more teeth, the next member to the left has seven or more teeth, and so on throughout the entire series of clutch members. Of course, the increment of increase between adjacent clutch members does not necessarily have to be one, but it should be the same throughout the series. As will hereinafter appear, the various clutches are designed to rotate a shaft variable distances at which complete rotation of the drive shaft 140. By throwing in the proper clutch, the required degree of rotation is thus imparted to the driven shaft at each rotation of the drive shaft. The ratchet members 146 are substantially inclosed within the members 144, those sides of the latter opposite the toothed flanges 147 being closed by plates 149.

Pivoted on pins 150, that extend between the side plates of the members 144, are pawls 151, each having a hooked end that is adapted to engage with the teeth on the respective ratchet 146 so that, when thus engaged the outer members 144 and 145 will be turned with the drive shaft. The pawls are impelled toward engaging position by springs 152 which are secured at one end to the outer members of the clutch and bear with their inner ends upon the tails of said pawls. Normally the pawls are maintained out of engagement with their ratchet wheels by spring-pressed plungers 153 which project upwardly through and are guided by bars 154 on the machine frame. Springs 155 surround said plungers between the bars and serve to thrust the plungers upwardly with sufficient force to overcome the tension of the springs 152 and throw the hooked end of the pawls away from the ratchet wheels. Inasmuch as the right-hand plunger, which coöperates with the special clutch 145, is of somewhat peculiar formation, I shall designate the same 156.

*The order keys.*—Extending longitudinally of the computing machine at the rear of the clutches is a pivot-rod 157, Figs. 10 and 11 said rod being adapted to have a slight rocking motion, as hereinafter described. Pivoted upon said rod, by hooking beneath the same, is a series of key-levers 158, the right-hand key-lever being designated 158ᵃ. These levers extend substantially to the front of the machine where they are attached in any convenient manner to stems 159 of what I term order-keys 160. As shown in Fig. 12, the captions of these keys bear numerals as follows: "1000"; "100"; "10"; "1"; ".1". The key lever 158ᵃ is substantially straight throughout its length, while the key levers 158 are carried upwardly in front of the drive shaft in order that they may not interfere with a rod 161, see Fig. 12, the function of which rod will be stated in connection with the description of the mechanism for effecting subtraction. Each of the key-levers 158 passes through an open-ended slot in the upper part of the plungers 153 and bears against the bottom of said slot so that, when the key-levers are depressed by the operation of the order keys 160, their corresponding plungers 153 are are also depressed, and the corresponding clutches are thereby connected with the drive shaft through their pawls 151 and ratchets 146. In the operation of the machine, the order key is permitted to return to normal position as soon as the clutching operation is effected, so that the clutch is given but a single rotation. The unclutching of the pawl and ratchet is effected by the plunger 153. Upon the depression of the latter and the subsequent release of the order key, the plunger rides upon or bears against the horizontal flange of the member 144 until said member has almost completed its rotation, at which time the plunger passes through an opening 162 in said horizontal flange, contacts with the tail of the pawl and unhooks the same from the ratchet wheel. Of course, if the order key be held depressed, the clutch continues to rotate; but this is not the normal operation of the machine.

For reasons hereinafter set forth, the plunger 156 for the special clutch 145 must be operated at each operation of the machine, irrespective of the particular order-key depressed. For this purpose, I employ, in combination with the key-levers 158 and 158$^a$, a universal-bar 163, said bar being carried on the forward end of arms 164 that project from the pivot-rod 157, the universal-bar lying immediately beneath said key-levers so as to be depressed by either of them. The plunger 156 does not receive directly in its slotted end the special key-lever 158$^a$, but it receives a lever 165, which lever has a downwardly extending boss 166 through which the universal bar 163 passes. With this construction, the operation of any one of the order keys results in the depression of the special plunger 156 and in the operation of the special clutch 145.

*Control of computer carriage from the order-keys.*—Upon the operation of the adding-key 33 and the consequent release of the escapement mechanism for the typewriter carriage, the latter and the tabulating-bar are shifted until the tabulating pin 29 engages with the escapement mechanism 30, as hereinbefore described, whereby the typewriter carriage is arrested. The arresting tabulating-pin 29 has been so positioned, however, as to permit the carriage to move past the printing positions for the numerals of higher order, and the carriage is not arrested until it has reached the position where the numeral forming the lowest order is to be printed. That is to say, if the number 12935 is to be printed and accounted for on the computing mechanism, the typewriter carriage moves past all of the higher orders until it reaches the position where 5 is to be printed. It therefore becomes necessary to move back the carriage to the position of highest order, when the printing and the computation may commence. This is the function of the order keys, which control the various clutches and the connections between the latter and the computing carriage 111. These connections I shall now describe.

Journaled in the rear of the machine, back of and parallel with the drive shaft 140 is a shaft 167, see Figs. 10 and 12, said shaft having secured thereto, immediately behind the clutch members 144 and 145, gear segments 168, said segments having spur teeth 169 that are adapted to mesh with the teeth 148 on the members of the clutches. The segments 168 and the clutches are therefore arranged in pairs, and each segment has a number of teeth equal to the number of teeth on its corresponding clutch member. The different clutches therefore will operate to rotate the shaft 167 through varying degrees; and, as these clutches are controlled by the order-keys, the said shaft will be rotated a distance dependent upon the particular order-key depressed. Of course, if a number containing but one numeral in the lower order is to be printed, the carriages on the typewriter and the computer do not require shifting, so that no order-key is provided for the lowest order. If, however, a number of two figures is to be printed, these carriages must be moved backwardly through one order, which is accomplished by depressing the key bearing the number ".1", and so on throughout the various orders.

For moving the carriages from the shaft 167, I secure to the latter a bevel pinion 170, which meshes with a bevel pinion 171, see Fig. 13, which is secured to a stub shaft 171$^a$, Fig. 2 that is journaled in a brace 172 of the machine frame. This shaft carries a spur gear 173 that meshes with a rack-bar 174 extending longitudinally of the machine at the rear thereof. The right hand end of this rack-bar, as viewed in Fig. 2, engages with said pinion 173, Fig. 13 the same being held in mesh therewith by a roller 175 pressing upon the upper edge of the rack and by a guide disk 176 engaging with the rear side of the rack-bar. The bar is also held in position by a disk 177 that is carried on the shaft 171$^a$ and that turns with the pinion 173. The opposite end of the rack-bar 174 is provided with teeth on its upper edge, which teeth mesh with a gear 178, Fig. 12 on the shaft 118, said gear being mounted alongside of and turning with the gear 117. The movement of the rack-bar 174, therefore, turns the gears 117 and 118 in a direction to move the rack 116 and the computer carriage 111 toward the right in Fig. 2, and to simultaneously move the rack-bar 31, the tabulating-bar 25 and the typewriter carriage in the opposite direction. As has been stated, the various order-keys control the clutches, and these clutches have varying numbers of teeth 148. The depression of an order key 160, therefore, results, through the mechanism described, in shifting the carriages distances corresponding with the position of the depressed order key in the row of keys 160.

*Operating mechanism for computing wheels.*—In front of, slightly below and parallel with the drive shaft 140, I journal a shaft 179, said shaft extending from the right hand end of the frame 3 of the computer to a bracket 180 in front of the clutch mechanisms, Fig. 12. Journaled on this shaft below their respective rows of keys in the value key-bank are a series of computing segments 181, the left-hand segment being designated 181$^a$ for the reason that its operation differs slightly from that of the other segments. These segments are properly spaced on the shaft by spacing collars 182. The segments are provided with gear teeth for meshing with the teeth on the pinions 183 for the computing wheels, hereinafter more fully described. Mounted on the forward portions of the segments 181, and projecting substantially flush with the outer line of the teeth thereon, are curved plates 184, see Fig. 11, said plates having a shoulder 185 near their upper ends with which the plungers 98, hereinbefore described, normally engage. These plungers, which are under control of the keys in their corresponding rows of value-keys, normally hold the segments 181 from movement, and said segments are released for movement only when a key in the corresponding row of the value key-bank is operated. Upon the depression of a value-key, the lifting of the plunger 98 thereby, and the subsequent operation of the machine, the released segment is pulled backwardly by a coil spring 186, which is secured to the segments above the shaft 179 and to the frame 1 near the rear of the machine, until the segment is arrested by engagement with the lower end of the depressed plunger 80 or 81. As has been stated, the four plungers 80 toward the front of the machine extend barely through the plates 79, while the four plungers 81 at the rear project through said plate for a slight distance. The plungers 80 are adapted to contact with the shoulder 185 on the plate 184, while the plungers 81 are adapted to contact with a rearwardly extending projection 187 on said plate. This being the construction and operation, the purpose of the wide space between the adjacent plungers 80 and 81 becomes apparent. The curved plates 184 being in the plane of the plungers 80 and 81, all the plungers in front of the one depressed will be arrested by the outer curved edge of the plate, and the corresponding value keys are thus locked against depression. As stated, there are nine keys in each transverse row of the value keyboard, whereas there are but eight plungers 80 and 81 corresponding with such row. The rear key 88 in the various rows has no corresponding plunger, but the segments 181 are arrested when said rear keys are depressed by a stationary longitudinal plate 188 with which the projections 187 engage. Upon the depression of a key of a certain value in any row of the value keyboard, therefore, the corresponding segment 181 will be permitted to move under the impulse of its spring 186 a distance corresponding with the value of such depressed key. This movement will take place during the first part of the rotation of the special clutch 145, while the pinions 183 are out of mesh with the segments. Upon the completion of the rearward movement of the segments, the pinions are thrown rearwardly into engagement with the segments, by means hereinafter described, and the segments are then forced back to normal position, whereby the computing wheels are turned to make the computation represented by the depressed value-keys for that particular operation of the machine. For returning the segments to normal position, I secure to the shaft 179 crank-arms 189, which arms are connected by a bar or rod 190 extending parallel with the shaft 179 at the rear of the upper edges of the segments, said crank-arms and bar forming a yoke.

Secured to the clutch member 145 is an eccentric 191, Figs. 13 and 15 and secured to the latter through a sleeve 191$^a$, so as to rotate with said clutch, is a pair of cams 192 and 193, said cams being also secured together by screws 194, see Fig. 13. As has already been set forth, the clutch member 145 is caused, through the medium of the universal bar 163, to be turned at each operation of the machine; and, from the above description, it will be understood that the eccentric 191 and the cams 192 and 193 also rotate at each operation of the machine.

Secured to the shaft 179, near the bracket 180, is a crank-arm 195, carrying on its outer end an antifriction roller 196 which bears upon the periphery of the cam 192. Also secured to the shaft 179 is an arm 197, which is connected, through a link 198, with a lever 199 that is pivoted at its lower end to a bracket 200 on the base of the machine. The lever 199 has an antifriction roller 201 which engages with the periphery of the cam 193, the rollers 196 and 201 being on opposite sides of the shaft 140. A spring 202, secured to the link 198 at one of its ends and to a stationary part of the frame at its other end, serves to hold the roller 201 in contact with its cam. The cams 192 and 193 are so shaped as to give a positive reciprocation to the link 198 and a positive rocking motion to the shaft 179 and to the yoke rod or bar 190 which returns the segments 181 to normal position. The said cams are also so positioned as to produce the forward movement of the segments during the last part of the operation of the machine and after the computing wheels have been thrown into mesh with their segments.

As appears from Fig. 11, the bar 190 does not contact directly with the segments 181, but it bears against springs 203 that are attached at 204 to the segments below the shaft 179 and, extending about the latter, pass through staples 205 which hold the free ends of the springs to their segments. The segments are, therefore, driven forwardly with a yielding pressure, which prevents racking of the machine; and furthermore, the springs 203 serve to give the segments an excess of movement when the transferring operation takes place, as will be hereinafter more fully described.

*The computer head and carriage therefor.*—Mounted in roller bearings so as to move longitudinally between guides 206 and 207 in the front part of the computer, is a carriage having side rails 208 and 209 and cross braces 210 at the ends of the side rails and near the middle of the carriage. The carriage is limited in its longitudinal movements by pins 211 that project upwardly from the guide 206, and by a stop-plate 212 that is secured to the side rail 208 of the carriage and is projected between the pins 211. A coil spring 213, see Fig. 12, is attached to the carriage and tends to move the same to the left, or to the right as viewed in Fig. 12. The carriage is held against such movement normally by an escapement mechanism, hereinafter described, which engages with teeth on a ratchet-bar 214 that is secured to the carriage and moves therewith. As appears from Fig. 3 of the drawings, the end casing of the computing machine is cut away opposite the computing head and carriage so that the latter may be drawn outwardly by hand by grasping a knurled head 215. During the process of addition, the computing wheels occupy the same relative positions with respect to their segments 181, so that the escapement mechanism above referred to does not come into operation; and, as I shall first describe the operation for addition, I shall leave the description of said escapement mechanism and the operative parts therefor until I come to the description of a process where its use is required.

Journaled in the cross braces 210, Figs. 11 and 16 to 22, of the carriage for the computing head is a shaft 216, said shaft having near its ends upwardly and rearwardly extending arms 217 that are pinned or otherwise secured to the shaft so as to be rocked positively therewith. Journaled loosely on the shaft 216 alongside the arms 217 are links 218, in the upper ends of which there is journaled the shaft 219 upon which the computing wheels 220 are journaled, said wheels having connected therewith the pinions 183, hereinbefore described. The arms 217 are each provided with a slot 221 into which projects a pin 222 that is carried by the link 218. Secured rigidly to the shaft 216 is a downwardly depending yoke member 223, said member carrying on its lower edge antifriction rollers 224, said rollers being separated so as to receive therebetween the upper edge of a web-bar 225, said bar being pivoted in the machine frame at 226. Pivoted to the center of the web of this bar and extending rearwardly almost to the back of the machine, is a plate 227, Figs. 11 and 23, said plate being widened at its rear end so as to be guided upon a lug 228 on the partition frame 3ª and so as to afford bearings for antifriction rollers 229 and 230 which are positioned on opposite sides of the drive shaft 140.

231 is a cam for coöperating with the roller 229, and 232 is a similar cam for coöperating with the roller 230, said cams, when rotated, causing the plate 227 to move back and forth and thereby rock the web-bar 225. The cams 231 and 232 are also connected with the special clutch 145 through the sleeve 191ª, as appears from Fig. 15 of the drawings.

When the plate 227 is moved forwardly by the cam 232, the rock shaft 216 in the carriage for the computing head is rocked, which movement carries the arm 217 therewith. The links 218 with the shaft 219 are also moved with the arms 217 until the pinions 183 are carried into mesh with the segments 181, such movement of this shaft and pinions being due in part to gravity and in part to springs 233 that connect the links with arms 234 that are pinned or otherwise secured to the shaft 216. When this shaft is rocked therefore, the links 218 will follow the movement of the arms 217 and 234 until the pinions are in mesh with their respective segments, when the movement of said links is arrested, although the rocking movement of the shaft 216 is continued a short distance farther, during which time the pins 222 travel in their slots 221. This excess of movement of the shaft 216 is for the purpose of carrying detent pawls 235, which are secured to said shaft, out of mesh with the teeth of the pinions 183 for the computing wheels. By maintaining these detent pawls in engagement with these pinions while the latter are out of mesh with their segments, all accidental movement of the adding wheels is prevented. The shapes and positions of the cams 231 and 232 are such as to throw the pinions 183 into mesh with their respective segments 181 just prior to the beginning of the return movement of the latter, so that the values of the depressed keys are computed. Of course, all of the computing wheels will be moved rearwardly; but if no key in a row in the value keybank has been depressed, the segment for that row will be held by its plunger 98 so that the computing wheel for that row will not be turned, except in the case of a transfer, which operation will now be described.

*The transfer mechanism.*—As shown, each of the pinions 183 has twenty teeth, and each of the computing wheels has two sets of numerals running from zero to 9. It will be apparent, however, that one, two, or more sets of numerals may be impressed on the wheels, the numbers of teeth in the pinions being ten times the numbers of such sets. Whenever an amount is to be added to a computing wheel which, together with the amount already indicated by said wheel, will make more than 9, it is necessary to carry 1 to the wheel of next highest order, which operation is known as transferring.

Projecting from that face of each of the adding wheels that is opposite the pinion 183, is a pair of pins 236, said pins being diametrically opposite each other. These pins are arranged near the outer edges of the computing wheels so that, when the wheels are thrown into mesh with their segments, the pins are brought into position to engage with the ends of forwardly projecting arms 237, Figs. 34 and 35, of bell-cranks, which are pivoted at 238 in brackets 239 that are secured to the plate 1. Ten of these bell-cranks are shown in Fig. 12 of the drawing, which number is sufficient for all practical purposes, although the computing head carries seventeen wheels. To the lower arm 240 of each of the bell-cranks, I pivot a sliding plate or block 241, the forward end of which is bifurcated so as to extend on opposite sides of a roller 242 that is journaled in the bracket 239, whereby the forward end of the block 241 is guided and held against vertical movement. The block 241 is normally held in its forward position by a spring 243 that connects with pins 244 and 245 on the block 241 and the bracket respectively. When in its forward position, which is shown in Fig. 11, the upper forward edge of the block 241 is in position to engage with a lug or pin 246 on the segment 181, and thus limit the downward or forward movement of the segment. This is the position these parts occupy prior to the operation of the bell-crank arms 237 by one of the pins 236; but when one of said pins depresses the arm 237 of the bell-crank, the block 241 is drawn rearwardly away from the path of the lug or pin 246, so that said lug will not be intercepted by the upper edge of said plate but will continue, under the impulse of the spring 203, a distance sufficient to turn the pinion 183 with which the segment engages an additional distance of one tooth or of one number on the computing wheel. In case the computing wheel is to be turned at the same operation of the machine for some distance beyond the point at which the pin 236 contacts with the arm 237, the pin would, unless prevented, pass said arm and leave the plate 241 free to again move into position to intercept the lug 246, and in this way no transfer would be effected. To prevent this failure of operation, I pivot, between ears 247 in the front of the bracket 239, a plate 248 which is pressed upwardly by a spring 249 that is secured to a pin 250 depending from the plate at its pivot and to the said pin 245 on the bracket. When the parts are in the position shown in Fig. 11, this plate bears against the lower side of the upper bifurcation of the block 241; but when said block is moved rearwardly into the position shown in Fig. 35, the plate moves upwardly against the front face of said upper bifurcation and holds the block rearwardly so that the lug 246 will pass its upper edge and effect the transfer, the plate 248 being depressed to normal position by said lug as the transfer is effected.

*The operating key and its connections.*— From the description hereinbefore given, it will be understood that, when it is desired to add a number on the computing machine, the operator first depresses the adding-key to shift the carriages on the typewriter and on the computing machine to a position to print and compute a numeral in the lowest order of the number to be added, and that the order-key 160 for the highest order in such number is then depressed, which operation runs back the said carriages to the proper positions for printing and computing the numeral in the highest order of such number. Thereafter, the successive depressions of the proper numeral keys on the typewriter print the number and also depress the proper value keys in the computer, the depression of the value-keys releasing the segments 181 corresponding thereto. The number has thus been set up on the computer, but the latter requires to be operated from the drive shaft 140 before the number is actually computed. It will also be remembered that the cams for returning the segments 181 and for swinging the computing wheels into engagement with the segments are operated from the special clutch 145. It therefore becomes necessary to throw this special clutch into operation, This may be done by again depressing one of the order keys 160 which, through the universal bar 163, sets said clutch in operation as hereinbefore described. When a series of numbers are to be added the clutch would be thrown into operation by the depression of the order-key corresponding with the highest order in the next number to be added, whereby, not only the special clutch is thrown into operation to add the number then set up in the computer, but the clutch corresponding to the order-key depressed will also be thrown into operation to carry back the carriages to the highest order of the next number to be added. Another means for throwing into operation the special clutch is illustrated in Figs. 1, 3, 10 and 11, in which 251 is a key that I shall hereinafter refer to as the operating-key, the same being preferably of the particular shape shown in Fig. 1 of the drawings. This key is carried by a pair of key stems 252 and 253, the former stem being pivoted at its lower end to the forwardly extending arm of a bell-crank 254, and the stem 253 being pivoted to the forward end of a similar bell-crank 255, the latter bell-crank being secured to a rock shaft 256 that is journaled in the right hand frame 3 and in the partition frame 3ª. The upper arms of the bell-cranks 254 and 255 are connected by a link 257, the construction being such that equal and parallel movements are given to the key stems 252 and 253, whereby the operating-key is prevented from tipping. A spring 258, Figs. 12 and 24, is coiled about the shaft 256 for returning the same and the operating-key to normal position. At its extreme inner end the shaft 256 has secured to it an arm 259, see Fig. 10, which arm has a pin and slot connection with the rearward end of a lever 260 that is pivoted on a rod 261 in the forward part of the machine. The depression of the operating-key depresses the arm 259 and also the lever 260, which lever is connected through a link 261ª with the key lever 158ª that controls the special operating clutch 145, so that said key lever is also depressed and the clutch 145 is thrown into operation. In order that the key lever 158ª may be depressed without moving the link 261ª and the lever 260 with its connections, said link is provided with a slot 262 in its lower end through which projects a pin 263 on the key lever.

*Value key releasing mechanism.*—By reference to Fig. 11 it will be seen that the locking frames 91 are provided at their rear ends with downturned lugs 264. Journaled in the machine frame beneath the rear ends of the locking frames is a rock shaft 265, having an upwardly projecting web 266 which extends across the rear of the keyboard end of the machine just in front of the lugs 264. Near its left hand end the shaft 265 is provided with a downwardly extending pin 267, Fig. 24, that normally projects in front of a lever 268 that is pivoted near its center on the rod 77, the downwardly extending arm of said lever lying in the path of a cam 269 on the sleeve 191ª of the operating cam 145, the cam passing said lever and permitting the same to be returned to normal position by a spring 270, Fig. 24, that is attached to said lever above its pivot and to the shaft 256, hereinbefore described. The release of the lever 268 by the cam permits the rod 265 and the locking frame to return to normal position so that the plungers 98 may engage with their respective computing segments 181 and hold the latter against movement until value-keys corresponding therewith are again depressed.

*Special release key for value keybank.*—As has been stated, a mistake in the depression of a key in a row in the value keybank may be corrected by the depression of another key in the same row. It may happen, however, that the operator may wish to release all of the depressed keys; and, for this purpose, a special release key 271 is provided. (See Fig. 3.) The stem 272 of this key carries a cam 273, against which a roller, on an arm 274 upon the key release shaft 265, bears. Upon the depression of the release key 271, the cam 273 rocks the shaft 265, and thus causes the web 266 thereon to draw the locking frames 91 rearwardly to release the depressed keys.

*Tabulating mechanism for transverse lines or columns.*—In some cases it is desirable to add or make other computations of a series of numbers or items that are written in the same transverse line on the typewriter paper, and for this purpose I use the tabulating bar and pins 25 and 29. The said pins are first spaced so as to cause the typewriter to print in the desired positions in the line. Upon the operation of the adding-key, the typewriter carriage and the tabulating-bar are carried to the left until the first pin 29 engages with the escapement 30, which engagement is maintained until the first number or item is written and computed. Upon the operation of the computing machine for making the computation, the escapement 30 is operated, in order to permit the tabulating-bar and the typewriter carriage to escape until the next pin 29 is arrested by said escapement. I shall now describe the mechanism for effecting this result, and shall direct attention more particularly to Figs. 3ª, 10 and 12 of the drawings.

Journaled at its rear end in a longitudinally extending bar 275 that is carried by the frames 3 and 3ª, and in its forward end in a bracket arm 276 depending from the upper and forward part of the machine casing, is a rock-shaft 277, said shaft having on its front end a crank 278, with a crank-pin 279 that extends outwardly through a slot in the front part of the casing 280. Near its rear end the shaft 277 has secured thereto a downwardly extending arm 281.

Journaled in the frames 3 and 3ª, in front of and slightly below the bar 275, is a rock-shaft 282, said shaft being rocked in one direction by the eccentric 191, see Figs. 3ª and 13, that engages with an arm 283 that is secured to said shaft, and in the opposite direction by a spring 284, Fig. 12, that is coiled about the shaft. It being remembered that the eccentric 191 is secured to the special operating clutch 145, it will be understood that the shaft 282 is rocked at each operation of the machine.

Surrounding the shaft 282 and adapted for longitudinal movement thereon, is a sleeve 285, said sleeve being slotted at one end, through which slot the arm 283 extends, the slot permitting the movement of the sleeve relative to the arm. At its opposite end the sleeve is provided with a collar 286, having a groove therein, into which a pin 281ª, carried by the lower end of the arm 281, projects. By this construction, the sleeve 285 is moved longitudinally on the shaft 282 whenever the crank-pin 279 is moved in its slot. Near its center, the sleeve 285 has secured to it an upwardly extending arm 287, which arm is adapted to be moved, through its sleeve, into a position directly in front of a pin 288, that projects from a head 289 on the forward end of a rod 290, said rod being guided in the bar 275 and in the guide bar 113 for the computing carriage. The rod 290 terminates directly in front of a downwardly depending plate 291, that is rigidly secured to the frame carrying the escapement pawls for the escapement mechanism 30 of the tabulating mechanism. When, therefore, the crank-pin 279 is swung in the proper direction, the arm 287 on the sleeve 285 is brought in front of the rod 290, and then, upon the operation of the machine, the eccentric 191 will rock the shaft 282 and the sleeve 285 in the direction to push said rod rearwardly and operate the escapement 30, thereby releasing the tabulator-bar and permitting the same with the typewriter carriage to move until the next succeeding pin is caught by the escapement mechanism, when the carriages are in position for the printing and the computation of the next number or item in the same transverse row on the typewriter paper.

*Tabulating mechanism for vertical columns.*—Also secured to the sleeve 285 is a rearwardly extending arm 292, which is rocked downwardly at its rear end when said sleeve is turned by the eccentric 191. When the crank-pin 279 is swung so as to throw the arm 287 into position for operating the tabulator escapement, the arm 292 moves up and down idly, or without effecting any function. When the crank-pin is swung to the left, the arm 292 is carried over a pin 293 on the lower end of an upwardly extending link 294, Figs. 10 and 10ª, the upper end of which is pivoted in the bifurcated end of a crank 295 on a longitudinal rock shaft 296, said shaft being journaled at its left-hand end in the typewriter carriage 8, Fig. 33, and at another point, along its length, in a bracket or standard 297 that rises from the top plate 84 of the casing for the computer. The crank 295, as appears from Fig. 10ª, is provided with a sleeve extension 298, which is slotted on its lower side at 299, through which slot a key 300 on the rock-shaft extends, the rock-shaft being turned by the engagement of the sleeve with said key. The projecting sleeve 298 has its bearings in the bracket 297, as appears from Fig. 10. By this construction the shaft may be moved longitudinally, with the typewriter carriage, through the crank arm 295 and still be capable in all positions of being rocked by the latter.

As appears from Fig. 33, the shaft 296 carries on its left-hand end a crank 301, to the upper end of which is pivoted the pawl 302 for turning the roller-platen 7 of the typewriter. When, therefore, the shaft 296 is rocked upon the operation of the computing machine, and the crank pin 279 is in its left-hand position, the platen 7 is turned to space the paper in the typewriter longitudinally, and thereby prepare the typewriter for printing in a vertical column. It will be understood that the rocking of the crank 278 by the crank-pin 279 into position for turning the platen, carries the arm 287 away from the pin 288, and thereby throws out of operation the tabulating mechanism for transverse lines or columns, and that the swinging of the crank-pin into position for operating the latter mechanism, carries the arm 292 away from the pin 293 on the link 294, and thus cuts out of operation the platen operating mechanism. When the crank-pin 279 is in its mid-position, both tabulating mechanisms are thrown out of operation, which is the position of the parts when the computer is to be used without the typewriter.

*Mechanism for clearing the machine.*—It is necessary in machines of this character to occasionally clear the machine by returning all of the computing wheels to zero position, or to that position where the naught figures on the wheels show through the slot 303, Fig. 11 in the plate 304 that is carried by the carriage 208. For this purpose that part of the shaft 219 upon which the computing wheels 220 are journaled is provided with diametrically arranged slots or grooves 305, said grooves having one abrupt side extending radially, and the other side gradually tapering or curving from said abrupt side to the circumference of the shaft, as appears in Fig. 11. Pivoted within the computing wheels are pawls 306, Fig. 16 that are pressed into engagement with the shaft by springs 307, said pawls being adapted to trip idly over the grooves or slots 305 as the computing wheels are turned by their operating segments, but to engage with the abrupt sides of said slots when the shaft is turned to the right, as viewed in Fig. 11. By turning to the left on the shaft 219 until one of said slots passes beyond all of the pawls 306 on one side of the wheels, and then turning the shaft to the right, the said pawls and their respective computing wheels will be successively picked up and carried with the shaft to their zero positions. During this clearing operation, the pinions 183 must, of course, be out of engagement with their segments 181; and it will be remembered that the pinions are at that time normally held from rotation by their detent-pawls 235. It becomes necessary, therefore, to swing the shaft 219 forwardly on the links 218 so as to carry the pinions away from the detent-pawls before the wheels can be turned. To accomplish this result, I pin or otherwise secure to the shaft 219 a cam disk 308, said disk having a gradually curving cam surface 309 forming one side of a notch therein. 310 is a pin on the arm 234 which normally rests in this notch, as is shown in Fig. 17, the disk 308 being drawn toward said pin by the spring 233, hereinbefore described. 311 is another pin that is secured to the disk 308, said pin projecting laterally into a slot 312 in a second disk 313 that is loosely mounted on the shaft 219 alongside the disk 308. Normally, the pin 311 rests in the rear end of the slot 312, as is shown in Figs. 17 and 18. The disk 313 is also provided with a notch in its edge, said notch having an abrupt side 314. When the disks 308 and 313 are in their normal positions, as in Fig. 17, the pin 310 on the arm 234 rests in the notches in each of said disks, so that the pinions 183 may engage with their detent-pawls 235. When the shaft 219 is turned backwardly, or to the left in Fig. 17, the cam surface 309 gradually swings back the shaft 219 away from the pin 310, and, during this swinging movement of the shaft, the disk 313 is held against rotation by said pin, the pin 311 traveling in the slot 312. By the time this latter pin reaches the forward end of the slot 312, the pin 310 has moved out of the notch in the disk 313 so that the latter travels with the disk 308 and with the shaft 219, the pawls 306 in the computing wheels tripping idly over the grooves 305 in the shaft.

315 is a pin that projects from the left side of the disk 313 into a position to engage with the forward side of the link 218 as said disk is turned backwardly, and the engagement of this pin with the link limits the backward movement of the shaft 219. The shaft is not thus arrested, however, until after it has turned far enough to enable it to pick up all of the computing wheels when it is again turned forward. During the forward rotation of the shaft, the disk 313 remains stationary until the pin 311 reaches the rear part of the slot 312, after which the disks move together. During this independent movement of the disk 308, the inclined face 309 thereon passes and uncovers the abrupt face 314 of the disk 313, the notches in the disks assuming the position shown in Fig. 17. When the shaft is turned to the position to permit the abrupt shoulder 314 to escape past the pin 310, the shaft 219 swings rearwardly, and the detent-pawls 235 reëngage with the teeth on the pinions 183. At substantially the same instant that the pin 310 drops into the notch in the disk 313, the pin 315 on said disk engages with a stationary pin 316 that projects from the upper end of the link 218, and thus arrests the rotation of the shaft 219. It will be understood that the grooves in the shaft 219 and the pawls on the computing wheels are so positioned as to cause the zero figures on said wheels to be opposite the slot 303 when the movement of the shaft is thus arrested.

In order to prevent the computing wheels from turning too freely, I employ for each wheel a pair of detent-pawls 317 and 318, the pawl 317 being adapted to press upon the teeth of the pinions 183, and the pawls 318 being adapted to press upon pins 318ᵃ, the latter pawls increasing the resistance to the rotation of the computing wheels at the moment the wheels reach zero position.

As has been stated, the right-hand end of the casing for the computer is cut away opposite the computing head and its carriage so that the latter may be drawn to the right until its end projects beyond the casing, although it is not intended that the computing head be entirely withdrawn. The computing wheels that may be thus projected beyond the casing are liable to be accidentally turned when the pinions for the wheels within the casing are thrown into mesh with their operating segments, it being remembered that at this time the detent-pawls 235 are out of engagement with the pinions; to prevent such accidental turning, the pawls 317 and 318 for these wheels are pivoted upon a rod 319 that is stationarily mounted in the cross plates 210 of the computer carriage, and they are drawn forward into their engaging position by springs 320. As appears from Fig. 19, the pawls 317, by engaging with the teeth of the pinions 183, positively lock the computing wheels against backward rotation and, by their resiliency, also resist the forward rotation of said wheels. Those pawls 317ᵇ and 318ᵇ for the other wheels are mounted stationarily upon a plate 321 that is secured to the rod 319, the resiliency of the pawls being sufficient to prevent their wheels from accidental movement.

*The adding operation.*—It is believed that the foregoing description is sufficient to enable the operation of addition—either in transverse lines or in vertical columns—to be understood without an extended description of the successive steps of this operation. I may state, however, that when it is desired to add items in a line across the page of the typewriting paper, the crank pin 279 is first swung so as to bring the arm 287 in front of the pin 288 of the rod 290. The operator then depresses the adding-key 33, thereby throwing out the typewriter escapement, lowering the tabulating-bar, and shifting the said bar and carriage to the position for printing the figure in the lowest order of the number to be printed and added. He then depresses that order-key 160 that corresponds with the order of the first figure in the number to be printed, and thereby throws in the clutch 144 corresponding with said order-key and also the special operating clutch, the clutch 144, through its segment 148 and the segment 169 gearing therewith, turning the shaft 167, the pinions 170 and 171, and thus running back the rack bar 174 and feeding the carriages into position for printing and computing the numeral of highest order in the number or item. The depression of the numeral key on the typewriter for printing this figure depresses the value-key on the computer having the same value, and it also operates the escapement 32 for the computer carriage so that the latter may move into position to bring the depressing fingers 109 over the next row of value keys. The movement of the computer carriage also moves the typewriter carriage into position for printing the next figure in the item, and the printing of this figure results in the depression of the key 88 having the same value. This same operation is continued until all the figures comprising the item are printed and set up on the key-board of the computer. The latter is then thrown into operation, by the depression of the order key representing the highest order in the next item, the special operating clutch 145 is thrown into gear, which gives the cams 192, 193, 231 and 232 a single complete rotation, and thus throws the pinions 183 of the adding head into mesh with the segments 181, and returns said segments to their normal position, thereby adding the values of the depressed keys on the adding wheels. The turning of the operating clutch also gives a single rotation to the eccentric 191 which, through the arm 283 rocks the sleeve 285 and the arm 287 thereon to push rearwardly escapement 30 for permitting the typewriter carriage to move into position for printing the next item in the same transverse line with the item just added. The operation just described would then be repeated for that item, and would be successively repeated for each of the items in that line.

The operation for adding the items in a vertical column on the typewriter paper differs from that just described merely in the fact that the crank pin 279 is turned in the opposite direction so as to cause the sleeve 285 to move into position for bringing the arm 292 thereon over the pin 293 in the link 294, and simultaneously moving the finger 287 on said sleeve away from the rod 290 so that the tabulator escapement will not be operated while the typewriter platen will be rotated through the shaft 296.

In case it should be desired to foot up or totalize separately more than one vertical column on a page of the typewriter paper, this may be done by drawing out the adding head so as to add the items in the first column on those adding wheels which are toward the left hand end of the computing head, then feeding said head to the left so as to bring another set of adding wheels into position for adding the items in the second column, and so on, there being a sufficient number of computing wheels to permit of adding two or more separate columns in this way. The same series of adding wheels, mounted on the same shaft and operated by the same mechanism may, therefore, be employed for keeping separate totals and for displaying the same simultaneously to the operator. Having ascertained the several totals for the several columns, such totals may be printed under their respective columns; and, by setting the tabulating mechanism for these columns and throwing in the tabulator escapement, a grand total of the said several totals may be secured and added on the computing mechanism, the same series of computing wheels serving also for adding these totals.

*Mechanism for subtracting and the subtracting process.*—In order to set the machine for subtraction, I depress the subtracting-key 322, which is mounted in the frame 2 of the typewriter at the rear of the adding key 33, being guided in said frame by its stem 323, on the lower end of which is a block 324 that is connected to the outer end of a crank-arm 325. See Fig. 7. This crank-arm is secured to a forwardly and rearwardly extending rock-shaft 326 that is journaled in the intermediate frame 4 slightly above the guide rod 40. This crank-arm extends over the key-lever 34 for the adding-key, and depresses the latter when the subtracting-key is operated, thereby rocking the shaft 37 and causing the arm 55 thereon to move the plates 42 and 45 rearwardly, as and for the purpose hereinbefore described. The rock-shaft 326 is provided with a downwardly extending arm 327 that is adapted to swing into contact with a block 328 on one of the rods 50 of the selecting frame shown in Fig. 8, and to push said frame to the right against the tension of a spring 329 that surrounds the rod 161 and bears with one end against the plate 49 of the selecting frame, the right hand end of the rod 161 being carried by the bracket 180, and the corresponding end of the spring 329 bearing against this bracket. See Fig. 12. The endwise movement of the selecting frame carries the L-shaped fingers 53 and 54 out of the range of the spring-pressed plungers 43 and 44, but brings into the range of said plungers other rectangular-shaped fingers 330 and 331, the fingers 330 extending from the upper shafts 51 in the same plane with the fingers 53, and the fingers 331 extending rearwardly from the lower shafts in the plane of the fingers 54. The perforations 332, 333 and 334 in the plate 42, see Fig. 6, indicate the relative positions of the plungers 43 and 44, and the plan view of Fig. 8 indicates in section the positions of said plungers. From these views it will be seen that some of the numeral keys operate upon two plungers, while others operate upon a single plunger. The position of these plungers with respect to the fingers 53, 54, 330 and 331 is such that, when the selecting-frame carrying said fingers is moved to the right upon the depression of the subtracting-key, the fingers 53 and 54 will be carried out of the range of the plungers and the fingers 330 and 331 will be brought into the range thereof, whereby the operation of a numeral key in the typewriter will cause the co-digit of that key in the value keybank of the computing machine to be depressed.

To make the operation plainer, I have indicated in Fig. 8 the numeral keys of the typewriter and have also indicated by reference letters the various plungers 43 and 44 that are operated by these keys during the process of addition and subtraction. In this connection it may be explained that in the so-called "universal" key board the small letter "l" is used for the numeral 1, and the capital letter "O" is used for naught, this accounting for the location of the numerals 1 and 0 at the right hand end of the line of numeral keys 5. Upon the depression of the adding key 33 the selecting frame with its plungers 43 and 44 is moved rearwardly, thereby associating the plungers with the keys 5 and the rock shafts 51 and 52 as follows: The "O" key depresses plunger indicated O$^b$; but, as this plunger has no finger on a rock shaft to engage, it performs no function, and no key is depressed in the computer key bank. The "l" key depresses plungers 1$^a$ and 1$^b$ simultaneously, the plunger 1$^a$ engaging its L-shaped finger 53 on the rock shaft specially designated 1$^A$ to depress a key "l" in the computer. The plunger 1$^b$ having no finger with which to coöperate, its movement is idle. The "2" key depresses plungers 2$^a$ and 2$^b$, but only the first is operative, the same rocking shaft 2$^A$ to depress a key "2" in the computer. The "3" key depresses plungers 3$^a$ and 3$^b$, but only the shaft 3$^A$, being below 2$^A$ in Fig. 8, is rocked. The "4" key depresses plungers 4$^a$ and 4$^b$, said plungers being connected together, as indicated in dotted lines, but 4$^a$ alone operates on the computer keys through shaft 4$^A$. The "5" key depresses plungers 5$^a$ and 5$^b$, these plungers being likewise connected together, as indicated, the plunger 5$^a$ rocking shaft 5$^A$ to depress computer key No. 5, the plunger 5$^b$ being idle. Key "6" depresses plungers 6$^a$ and 6$^b$, the latter plunger performing no function while plunger 6$^a$ rocks shaft 6$^A$ to depress numeral key No. 6. Key "7" depresses plungers 7$^a$ and 7$^b$, but rocks only shaft 7$^A$, as the movement of 7$^b$ is idle. Key "8" depresses plungers 8$^a$ and 8$^b$, but only the one shaft 8$^A$ is rocked. Key "9" depresses but one plunger, the same being designated 9$^a$. This plunger rocks shaft 9$^A$ to depress key "9" in the computer. Upon the depression of the subtracting key 322 the selecting frame is moved rearwardly, and the frame carrying the rock shaft is moved laterally, to the right as viewed from Fig. 8, the latter movement carrying the L-shaped fingers 53 and 54 away from the plungers and bringing the fingers 330 and 331 into position to be operated upon.

It is, of course, generally understood that two numbers may be subtracted by adding to one of the numbers the complement of the other number. In the operation of my machine, therefore, I set up in the usual way the number comprising the minuend, depressing the adding-key for that purpose. I then depress the subtracting-key and print the real digits forming the subtrahend on the typewriter; but the depression of the subtracting-key has carried the frame having the rock shafts 50 and 51 into position for depressing those keys in the value keybank of the computer which represent the co-digits of the subtrahend. The depression of a numeral-key in the typewriter, therefore, while the subtraction-key is depressed, will result in depressing a key in the computing machine which has the value of the co-digit of the key operated on the typewriter. For example, suppose we take the number 8634, and from it subtract 2813. The correct difference is 5821. Thus:

```
 8634
 2813
 ————
 5821
```

Now the co-digits of the subtrahend are respectively 7, 1, 8 and 6; so that, if we subtract by adding these co-digits to the minuend, we shall have the following result:

```
  8634
  7186
 —————
 15820
```

It will be seen, therefore, that the numeral in the lowest order is too small by one, and that one has been transferred or carried over from the numeral of highest order. To rectify the first error, I depress in the value keyboard in the last order a key which is one greater than the key which has been depressed by the typewriter key. In the concrete example given, I push down the key numbered 7, which releases key numbered 6 by camming back the locking frame 91, as hereinbefore described.

Now, again referring to Fig. 8, it may be stated that, after the depression of the subtracting key, the depression of the "O"

key in the typewriter depresses plunger O^b which, engaging finger 331 on shaft 9^A, rocks the latter to depress key "9" in the computer, nine being the co-digit of naught. Key "1" depresses plunger 1^b and rocks shaft 8^A. Key "2" depresses plunger 2^b and rocks shaft 7^A. Key "3" depresses plunger 3^b and rocks shaft 6^A. Key "4" depresses plunger 4^b and rocks shaft 5^A. Key "5" depresses plunger 5^b and rocks shaft 4^A. Key "6" depresses plunger 6^b and rocks shaft 3^A. Key "7" depresses plunger 7^b and rocks shaft 2^A. Key "8" depresses plunger 8^b and rocks shaft 1^A. Key "9" has no co-digit, and it therefore has no plunger to depress while subtracting.

For preventing the transfer from the numeral of highest order, as in the example above set forth, I provide a series of keys 335, in the front part of the computer, which I shall term transfer-preventing keys, one of such keys being shown in Fig. 11. While I have shown 17 computing wheels and but 11 transfer-preventing keys, I deem the latter number sufficient for all practical purposes, although the number of keys 335 may be increased or diminished as desired. Journaled on a rod or shaft 336 in the lower forward part of the machine is a series of pivoted levers 337, there being one of said levers for each of said keys 335, the forward part of the lever being connected with the stems 338 of the transfer-preventing keys in any suitable manner, as by extending the ends of the levers through slots in the key stems. Below the rod 336, each of the levers is provided with a downwardly extending finger 339 that connects with a plate 340, shown in Figs. 11, 34 and 35, each of said plates having on its rear end an upwardly projecting finger 341. Upon the depression of one of the keys 335, its corresponding plate 340 will be moved rearwardly and the finger 341 thereon will be brought under the corresponding segment 181 so as to prevent the same from falling beyond its normal position in case the transfer for that segment is operated. The rearward movement of the plate 340 is limited by a stop 342 on the base of the machine, with which a lug 343 on the lever 337 is adapted to contact. The keys 335 and the plates 340 are held in normal position, and returned thereto after operation, by coiled springs 344 which surround the lower part of the key stems and bear against the levers 337. For holding the key-stems 338 in their depressed positions, I employ a detent plate 345 for engaging with the ends of the levers 337 when they are depressed.

Returning now to the problem, it will be seen that if that transfer-preventing key 335 which corresponds with and controls the transfer mechanism in the fifth order be depressed before the operation of the machine for adding the co-digit numbers, the one will not be carried over, and the correct result, 5821, will be secured.

*The multiplying process.*—In general, multiplication of one number by another is effected as follows: The operator depresses the keys in the value keybank of the computer which represent the multiplicand, and he then draws out the computer head from its extreme inward position to at least as many spaces or steps as there are orders in the multiplier. The computing head may in fact be drawn outwardly on the machine shown in the drawings until the last or inner computing wheel is brought into coöperative relation with the special computing segment 181^a. Having determined the longitudinal position of the computing head, the operator next depresses what I call the repeat-key, which prevents the release of the depressed keys in the value key-board. He then depresses the operating-key 251, and holds the same depressed until the drive shaft has made as many revolutions as are represented by the value of the digit of highest order in the multiplier. That is to say, if the multiplier be 156, the operating-key 251 will be simply depressed and then released, permitting the drive shaft to turn but once. He then depresses a key for spacing the computing head, which operation causes the spring 213 for said head to draw the same to the left one space, or a distance equal to the space between two adjacent computing wheels. He then again depresses the operating-key 251, and holds the same depressed until the drive shaft has made five complete rotations. He then again operates the spacing-key for the computing head, and finally depresses the operating-key for the multiplication by the digit of lowest order, and holds the same depressed until the drive shaft has made six rotations, when the process is complete, and the computing wheels show the correct product through the slot 303.

I shall now describe the instrumentalities by which the above process is carried into effect, and will first take up

*The repeat key.*—It will be remembered that the key locking frames 91 are moved to release the depressed keys by the cam 269 on the sleeve 191^a, rocking the shaft 265 through the lever 268, said lever engaging with a pin 267 on the rock shaft. The repeat-key is shown in Figs. 11, 24 and 25 at 346, said key having a stem 347 that is guided in the top plate 84 of the casing and in the partition frame 3^a. Pivoted at 348 on the upper side of said partition frame is the repeat-key lever 349 which is slotted at its forward end to receive a T-shaped pin 350 that is carried by the key stem. At its rear end the lever 349 is bifurcated to receive a pin 351 on the lower end of a cam-plate 352, said plate being of U-shape in side elevation and extending on opposite sides of the rock shaft 265. Fig. 27 shows the normal position of these parts; and, from the same, it will be seen that, below the shaft 265, the cam plate is bent laterally so as to form a cam surface 353. The upper end of the cam plate is held in position and guided by a headed pin or lug 354, which projects from a lock-bolt housing 355 that is supported from the machine frame, the cam-plate being guided between said housing and the head of the pin. Extending through the shaft 265 at the right of the cam-plate is a pin 356, said pin being in position for engagement with the cam 353 on said plate when the latter is lifted. The left end of the shaft 265 has a hollow center at 357, Fig. 28 into which projects a pivot-pin 358 that is formed on the inner end of a screw 359 that screws into the machine frame.

360 is a lug or bracket depending from the upper part of the machine, to which the shaft 265 is connected through the medium of a coil spring 361, said spring tending to move and to hold said shaft in its normal position, as shown in Fig. 27.

When the repeat-key is depressed, the cam 353 forces the shaft 265 longitudinally, and carries the pin 267 away from the upper end of the lever 268, so that said lever is incapable of rocking the shaft when the machine is operated. It is desirable to relieve the operator of the necessity of holding down the repeat-key, and for this reason I mount within the housing 355 a spring pressed bolt 362, which projects into the path of a pin 363 on the cam-plate when the latter is lifted into the position shown in dotted lines in Fig. 26. This lock-bolt and pin prevent the return of the cam-plate and thereby maintain the shaft 265 in its inoperative position with respect to the lever 268. The drive-shaft may thus be caused to rotate any desired number of times without releasing the depressed value keys.

It is of course necessary to release the cam-plate and the repeat-key after the drive shaft has made the desired number of rotations, and, for that purpose, I secure to the end of the shaft 265 a collar 364, Figs. 27 and 28 having a pin 365 that is adapted to contact with a pin 366 projecting from the lock-bolt 362. Upon the rotation of the rock-shaft by the release-key 271, see Fig. 3, the pin 365 forces back the lock-bolt and permits the cam-plate to fall and the repeat-key 346 to return to normal position. At the same time, the operation of the release key permits the shaft to return to normal position, and also releases the value-keys through the web 266 on said shaft, Fig. 11.

As will be seen from Fig. 27, the pins 365 and 366 are out of operative relation except when the repeat-key is in its depressed position.

*Indicator for the multiplier.*—As will be seen from Figs. 24 and 25, the lower end of the repeat-key stem 347 contacts with one end of a pivoted latch plate 367, the opposite end of which normally rests against the rear end of a plate 368 that is carried by the special computing segment 181ª. This special segment 181ª is like each of the other segments 181 except that it has this plate 368, and the special segment is operated in the same manner as the other segments. That is to say, when it is released it is drawn backward by its spring 186, and it is returned to its normal position again by the bar or rod 190, which presses upon the spring 203 belonging to the special segment. Instead, however, of the special segment being moved to different distances dependent upon the keys in the value key bank, it is controlled exclusively by the repeat key 346, and is then permitted to move only the distance of one tooth. When, therefore, the repeat key is depressed, the latch plate 367 is rocked so as to lift it away from the end of the plate 368 into the path of travel of the upper tooth 369 on the special segment. This distance of travel is the distance between two adjacent teeth on the segment. Any computing wheel pinion 183 that may be in mesh with the special segment will be turned forward a distance of one tooth for each operation of the machine and, so long as the repeat key remains depressed, the special segment will simply vibrate back and forth at each operation of the machine, the number of such operations of the machine being added upon the computing wheel to which the pinion meshing with said segment belongs. Thus, taking the previous multiplier 156, the first wheel thrown into engagement with this segment will be caused to indicate "1" for the reason that the drive repeat key is held down while the drive shaft is turning once. The computing head is then shifted one space, such shift bringing the next successive computing wheel pinion into position for engagement with the said special segment 181ª. The repeat key is then depressed and is held in its depressed position while the machine is operating five times, this operation multiplying by 5. During this operation the special segment 181ª has turned the adding wheel in coöperation therewith through five spaces, so that said computing wheel indicates 5. The computing head is then again shifted so as to bring the next computing wheel pinion into position for engagement with the special segment, and the repeat key is then held down while the machine is operating six times. This operation turns that particular computing wheel which is then in operative relation with the special segment so as to add six. The three computing wheels which have thus been acted upon by the special segment will, therefore, indicate 156, which indication, showing through the openings 370 in the plate 280, Fig. 1, correctly indicate the digits comprising the multiplier, and show that the operation of the machine has been correctly performed.

*Spacing and release keys for the computing head.*—Engaging with the rack bar 214 on the computer head carriage are pawls of an escapement mechanism that is identical in all material respects with that shown in Figs. 30 and 31 of the drawings, so that further description of the same is not deemed necessary. The frame in which said pawls are mounted is secured to a rock-shaft 371, Fig. 11 to which shaft is secured an arm 372, said shaft and arm being shown in dotted lines in Fig. 3.

373 is the spacing-key, having a stem 374 that is guided for vertical movement in the frame piece 3 at the right-hand end of the machine. This key stem has a pin and slot connection with the arm 372 so that, when the key is depressed, the shaft 371 will be rocked to operate the escapement mechanism thereon and thus permit the computing head to move the distance of one tooth on the rack-bar 214. As has been seen, this spacing-key is utilized during the process of multiplication; and, as the process of division is substantially a reversal of that of multiplication, this key is also useful for this process.

At times it is desirable to move the computing head its entire distance without stepping the same along by the spacing-key; and, for this purpose, I employ a special release-key 375, see Fig. 32, said key being preferably arranged, as shown in Figs. 1 and 12 between the bank of order-keys and the bank of transfer-preventing-keys. The key 375 has a stem 376 that is guided in brackets 377 on the front part of the machine casing, the key being normally held in its outward position by a spring 378 which rests upon the lower bracket and presses with its upper end against a cross pin 379 in the key-stem. Opposite the release-key 375, the escapement shaft 371 is provided with a forwardly extending arm 380, said arm projecting over the rear arm of a lever 381, said lever being pivoted at 382 to a bracket projecting from the machine frame, and having its forwardly extending arm below the end of the key-stem 376 of the release key. Upon depressing the release-key, the shaft 371 will be rocked so as to carry the escapement mechanism thereon entirely out of operative relation with the rack 214, thereby entirely freeing the computing head and permitting the same to be moved inwardly to its extreme position by its spring 213. This position of the escapement mechanism is indicated in dotted lines in Fig. 32.

While I have shown the typewriter and the computer combined into one organized machine, it will be understood that the former may be operated independently of the computer even if left in position on the base frame 1. However, the typewriter may be lifted bodily from said base frame and placed and operated in any other position. The computer is also capable of operation independently of the typewriter, whether the latter is in position on the base frame or not.

It will be evident that many of the numerous details of my invention may be changed or modified without departing from the principles thereof, and, for that reason, the following claims are not intended to be limited to such details any further than may be made necessary by the specific terms therein employed or by the prior state of the art.

Having thus described my invention, I claim:

1. The combination with a typewriter having numeral keys, of a computing machine arranged alongside the typewriter and having independently operable value keys, and mechanical connections between the numeral keys of the typewriter and the value keys of the computing mechanism, whereby the operation of one of said numeral keys depresses a key of corresponding value in the computing machine without operating any of the other value keys.

2. The combination with a typewriter having numeral keys, of a computing machine arranged alongside the typewriter, selecting mechanism in said computing machine for determining the computation to be made thereon, a series of rock shafts operated by said numeral keys, means connected with said rock shafts for setting the selecting mechanism for computing an amount having the value of the numeral key operated, and means independent of the typewriter for operating the computing machine after the selecting mechanism has been set.

3. The combination with a typewriter having numeral keys, of a computing machine arranged alongside the typewriter and having value keys, a series of rock shafts extending from the typewriter to the computing machine and operated by said numeral keys, and means connected with said rock shafts for depressing value keys of the computing machine that correspond in value with the typewriter keys depressed.

4. The combination with a typewriter having numeral keys, of a computing machine arranged alongside the typewriter and having a bank of value keys arranged in order rows, means operated by the numeral keys for depressing the keys of corresponding value in the value keybank, and escapement mechanism controlled by the typewriter keys for shifting the position of the depressing means from one order row of keys to another.

5. The combination with a typewriter having numeral keys, of a computing machine arranged alongside the typewriter and having a bank of value keys arranged in order rows, a rock shaft for each numeral key and operated thereby, means on said rock shafts for depressing the keys of corresponding value in the value keybank, and escapement mechanism controlled by the typewriter keys for shifting the position of the depressing means from one order row of keys to another.

6. The combination with a typewriter having numeral keys, of a computing machine arranged alongside the typewriter and having value keys arranged in order rows, a series of rock shafts, connections between the said numeral keys and their respective rock shafts, means operated by said rock shafts for depressing value keys in the computing machine having values corresponding with those of the numeral keys depressed, and an escapement mechanism controlled by the typewriter keys for shifting the depressing means from one order row to another.

7. The combination with a typewriter having numeral keys, of a computing machine arranged alongside the typewriter and having value keys arranged in order rows, a series of extensible rock shafts, connections between the said numeral keys and said rock shafts, means operated by said rock shafts and movable with the extensible portions thereof for depressing value keys in the computing machine having values corresponding with those of the numeral keys depressed, and an escapement mechanism controlled by the typewriter keys for shifting the depressing means from one order row to another.

8. The combination with a typewriter having numeral keys, of a computing machine arranged alongside the typewriter and having independently operable value keys, plungers coöperating with said numeral keys, a series of rock shafts operated by said plungers, depressing means for the value keys, and connections between the rock shafts and said depressing means, whereby, upon the operation of a numeral key, the corresponding value key is depressed to the exclusion of all other value keys.

9. The combination with a typewriter having numeral keys, of a computing machine having a bank of value keys arranged in order rows, a series of extensible rock shafts operated from said numeral keys, depressing means for the value keys on the extensible portions of said rock shafts, and means for automatically shifting the said depressing means from one order row of value keys to another upon the operation of a numeral key.

10. The combination with a typewriter having numeral keys and a computing machine having value keys, of a series of rock shafts connected with the typewriter, said shafts being normally out of operative connection with the numeral keys, connections between said shafts and the value keys for depressing said value keys when the shafts are rocked, and means for establishing operative connection between the numeral keys and the said shafts whereby, upon the operation of the numeral keys of the typewriter, said shafts are rocked and the value keys of corresponding values are depressed.

11. The combination with a typewriter having numeral keys and a computing machine having a bank of value keys arranged in order rows, of a series of rock shafts connected with the typewriter, said shafts being normally out of operative connection with the numeral keys, a second series of rock shafts connected with the rock shafts of the first series, connections between said second series of shafts and the value keys for depressing said value keys when the shafts are rocked, and means for establishing operative connection between the numeral keys and the first series of rock shafts whereby, upon the operation of the numeral keys of the typewriter, said shafts will be rocked and the value keys of corresponding values will be depressed.

12. The combination with a typewriter having numeral keys and a computing machine having value keys, of a series of plungers operated by said numeral keys, a series of rock shafts having fingers that are adapted to coöperate with said plungers, the plungers being normally out of operative relation with said fingers, connections between said shafts and the value keys of the computing machine, and means for moving said plungers into operative relation with the fingers on the rock shafts whereby, on the depression of a numeral key, the corresponding rock shaft will be rocked to depress a key in the value keybank.

13. The combination with a typewriter having numeral keys and a computing machine having value keys, of a series of spring-pressed plungers operated by said numeral keys, a shift-frame for guiding said plungers, a series of rock shafts having fingers that are adapted to coöperate with said plungers, the plungers being normally out of operative relation with said fingers, connections between said shafts and the value keys of the computing machine; and means for shifting said frame for moving said plungers into operative relation with the fingers on the rock shafts whereby, on the depression of a numeral key the corresponding rock shaft will be rocked to depress a key in the value keybank.

14. The combination with a typewriter having numeral keys and a computing machine having value keys, of a series of rock shafts, connections between the numeral keys and said rock shafts for rocking the latter upon the depression of a numeral key, a second series of rock shafts, means connecting the respective rock shafts in the two series in pairs, and means operated by the said second series of rock shafts for depressing the value keys of the computing machine.

15. The combination with a typewriter having numeral keys and a computing machine having value keys, of a series of rock shafts, connections between the numeral keys and said rock shafts for rocking the latter upon the depression of a numeral key, a series of extensible rock shafts, means connecting the respective rock shafts in the two series in pairs, and means carried by the said extensible rock shafts for depressing the value keys of the computing machine.

16. The combination with a typewriter having numeral keys and a computing machine having a bank of value keys arranged in order rows, of a series of rock shafts, there being one rock shaft for each of the numeral keys of the typewriter and for each of the keys in an order row in the value keybank, a carriage for the computing machine in which said shafts are journaled, means on each of said shafts for depressing the value keys, connections between each of the numeral keys and its respective rock shaft for operating the latter key by the depression of a numeral key, and an escapement mechanism under control of the numeral keys for permitting the said carriage to move after the operation of each numeral key so as to shift the depressing means from one order row of the value keybank to another.

17. The combination with a typewriter having numeral keys and a computing machine having a bank of value keys arranged in order rows, of a series of extensible rock shafts, there being one rock shaft for each of the numeral keys of the typewriter and for each of the keys in an order row in the value keybank, a carriage for the computing machine in which the extensible portions of said shafts are journaled, means on each of said extensible portions for depressing the value keys, connections between each of the numeral keys and its respective rock shaft for operating the latter by the depression of a numeral key, and an escapement mechanism under control of the numeral keys for permitting the said carriage to move after the operation of each numeral key so as to shift the depressing means from one order row of the value keybank to another.

18. The combination with a typewriter having numeral keys and a computing machine having a bank of value keys arranged in order rows, of a series of tubular shafts, there being one shaft for each numeral key and for each key in an order row, connections between each numeral key and its respective tubular shaft whereby the shaft is rocked upon the operation of a numeral key, a carriage for the computing machine, said carriage having an arm projecting over the value keybank, a second series of rock shafts journaled at one of their ends in said arm and extending at their other ends into their respective tubular shafts, said arm moving the shafts in their respective tubular shafts as the carriage moves back and forth, and means on each rock shaft of the second series for depressing the value keys, said depressing means being moved from one order row to another as the carriage moves back and forth.

19. The combination with a typewriter having numeral keys and a computing machine having a bank of value keys arranged in order rows, of a series of tubular shafts, there being one shaft for each numeral key and for each key in an order row, connections between each numeral key and its respective tubular shaft whereby the shaft is rocked upon the operation of a numeral key, a carriage for the computing machine, said carriage having an arm projecting over the value keybank, a second series of rock shafts journaled at one of their ends in said arm and extending at their other ends into their respective tubular shafts, said arm moving the shafts in their respective tubular shafts as the carriage moves back and forth, means on each rock shaft of the second series for depressing the value keys, said depressing means being moved from one order row to another as the carriage moves back and forth, an escapement for the said carriage, and means for controlling the said escapement from the typewriter keys.

20. The combination with a typewriter having numeral keys and a computing machine having value keys, of a pair of frame plates below the numeral keys, a series of spring-pressed plungers guided in said plates and coöperating with the numeral keys, a series of rock shafts below said plungers, fingers on said rock shafts that are normally out of operative relation with the plungers, means for establishing operative relation between the plungers and said fingers, and connections between said rock shafts and the value keys of the computing machine whereby, upon the depression of a numeral key, the value key of corresponding value is also depressed.

21. The combination with a typewriter having numeral keys and a computing machine having value keys, of a pair of frame plates below the numeral keys, a series of spring-pressed plungers guided in said plates and coöperating with the numeral keys, a series of rock shafts below said plungers, fingers on said rock shafts that are normally out of operative relation with the plungers, means for moving the frame plates and plungers so as to bring the latter into operative relation with said fingers, and connections between said rock shafts and the value keys of the computing machine whereby, after the movement of said plates and upon the depression of a numeral key, the value key of corresponding value is also depressed.

22. The combination with a typewriter having numeral keys and a computing machine having value keys, of a frame arranged beneath the numeral keys, a series of plungers mounted in said frame and coöperating with the numeral keys, a series of rock shafts arranged below said plungers, a finger projecting from each of said rock shafts toward the corresponding plunger but being normally out of operative connection therewith, a special key, mechanism connected with said special key for establishing an operative relation between the plungers and the said fingers, and connections between the rock shafts and the value keys of the computing machine whereby, upon the depression of the special key, the operation of a numeral key will result in operating the value key of corresponding value.

23. The combination with a typewriter having numeral keys and a computing machine having value keys, of a frame arranged beneath the numeral keys, a series of plungers mounted in said frame and coöperating with the numeral keys, a series of rock shafts arranged below said plungers, a finger projecting from each of said rock shafts toward the corresponding plunger but being normally out of operative connection therewith, an adding key, connections between said adding key and said frame for moving the frame into position to bring the plungers into coöperative engagement with said fingers, and connections between the rock shafts and the value keys of the computing machine whereby, upon the depression of the adding key, the operation of a numeral key will result in operating the value key of corresponding value.

24. The combination with a typewriter having numeral keys and a computing machine having value keys, of a pair of horizontal plates beneath the numeral keys, a series of vertical plungers guided in said plates, springs for holding said plungers in their upper positions, a series of rock shafts adapted to be operated by said plungers, means for normally maintaining said plungers and said shafts out of operative position with respect to each other, an adding key, mechanism connected with said adding key for establishing operative relation between said plungers and shafts, and means connecting the rock shafts with the value keyboard whereby, upon the depression of the adding key, the operation of a numeral key will depress a corresponding value key in the computing mechanism.

25. The combination with a typewriter having numeral keys and a computing machine having value keys, of a pair of horizontal plates beneath the numeral keys, a series of vertical plungers guided in said plates, springs for holding said plungers in their upper positions, a series of rock shafts adapted to be operated by said plungers, means for normally holding said plates in a position to maintain the plungers out of operative position with repect to their shafts, an adding key, connections between said adding key and said plates for moving the latter to carry the plungers into their operative positions, and means connecting the rock shafts with the value keyboard whereby, upon the depression of the adding key, the operation of a numeral key will depress a corresponding value key in the computing mechanism.

26. The combination with a typewriter having numeral keys and a computing machine having value keys, of a frame below the numeral keys, a series of vertical plungers in said frame for coöperating with the numeral keys, a spring for each of said plungers, said springs operating to hold the plungers in their upper positions, a series of rock shafts, there being one rock shaft for each of the numeral keys, a finger projecting from each of the rock shafts toward its corresponding plunger, means for holding said frame in position to maintain the plungers out of operative relation with said fingers, a special key, a rock shaft operated by said key, an arm on said rock shaft for engaging with and moving the said frame to carry the plungers therein over the said fingers, and connections between said rock shafts and the value keys whereby, upon the operation of the special key, the depression of a numeral key results in operating its corresponding rock shaft and in depressing a value key of corresponding value in the computing machine.

27. The combination with a typewriter having numeral keys and a computing machine having a bank of value keys arranged in order rows, of a frame below the numeral keys, a series of vertical plungers in said frame for coöperating with the numeral keys, a spring for each of said plungers, said springs operating to hold the plungers in their upper positions, a series of rock shafts, there being one rock shaft for each of the numeral keys, an L-shaped finger projecting from each of the rock shafts toward its corresponding plunger, means for holding said frame in position to maintain the plungers out of operative relation with said fingers, an adding key, a rock shaft operated by said key, an arm on said rock shaft for engaging with and moving the said frame to carry the plungers therein over the angular portions of said fingers, connections between said rock shafts and the value keys whereby, upon the operation of the adding key, the depression of a numeral key results in operating its corresponding rock shaft and in depressing a value key of corresponding value in one of the order rows of the computing machine, and a carriage for the computing machine under control of the numeral keys of the typewriter.

28. The combination with a typewriter having numeral keys and a computing mechanism, of a series of rock shafts corresponding with the numeral keys of the typewriter, normally broken connections between said numeral keys and the rock shafts, a carriage on the typewriter, a tabulating bar on the computing machine, connections between the carriage and the tabulating bar for moving the two together, an escapement mechanism for the typewriter carriage, an adding key, means operated by said adding key for establishing the connection between the numeral keys and the rock shafts, means operated by said adding key for throwing the escapement out of operation, whereby the carriage and the tabulator are moved, and connections between the rock shafts and the computing mechanism, whereby the operation of a numeral key will set such mechanism for computing the value of the operated key.

29. The combination with a typewriter having numeral keys and a computing mechanism, of a series of rock shafts corresponding with the numeral keys of the typewriter, a frame arranged between said numeral keys and the rock shafts, said frame having a plurality of plungers that are adapted to be depressed by said keys, fingers on said shafts adapted to be depressed by said plungers, means for normally holding said frame in a position to maintain the plungers out of operative relation with said fingers, a carriage on the typewriter, a tabulating bar on the computing machine, connections between the carriage and the tabulating bar for moving the two together, an escapement mechanism for the typewriter carriage, an adding key, means operated by said adding key for moving the frame to carry the plungers into operative position with respect to said fingers, means operated by said frame for throwing the escapement out of operation, whereby the carriage and the tabulator are moved, and connections between the rock shafts and the computing mechanism whereby the operation of a numeral key will set such mechanism for computing the value of the key.

30. The combination with a typewriter and a computing machine, of a carriage on the typewriter, a carriage on the computing machine, an escapement for the typewriter carriage, an escapement for the computing machine, normally inoperative connections between the said carriages, means for throwing out of operation the typewriter escapement and for simultaneously establishing operative connections between the said carriages, and means for thereafter operating the escapement for the computing machine from the typewriter.

31. The combination with a typewriter having numeral keys and a computing machine, of a carriage on the typewriter, a carriage on the computing machine, an escapement for the typewriter carriage, an escapement for the computing machine, normally inoperative connections between the said carriages, means for throwing out of operation the typewriter escapement and for simultaneously establishing operative connections between the said carriages, means for thereafter operating the escapement for the computing machine from the typewriter, and connections between the numeral keys and the computing machine for setting the latter for computing the values of the numeral keys operated.

32. The combination with a typewriter and a computing machine, of a typewriter carriage, an escapement for said carriage, an escapement on the computing machine, and means for shifting at will the control of the said carriage from one escapement to the other.

33. The combination with a typewriter having numeral keys and a computing machine, of a typewriter carriage, an escapement on the computing machine, means for shifting at will the control of the said carriage from one escapement to the other, and connections between the numeral keys and the computing machine for setting the latter for computing the values of the numeral key operated.

34. The combination with a typewriter and a computing machine, of a carriage on the typewriter, an escapement normally controlling said carriage, a tabulator on the computing machine, means connecting said tabulator with the carriage, an escapement on the computing machine, means for throwing out of operation the typewriter escapement whereby the tabulator is operated, and means for thereafter controlling the typewriter carriage from the escapement on the computing machine.

35. The combination with a typewriter having numeral keys and a computing machine, of a carriage on the typewriter, an escapement normally controlling said carriage, a tabulator on the computing machine, means connecting said tabulator with the carriage, an escapement on the computing machine, means for throwing out of operation the typewriter escapement whereby the tabulator is operated, means for thereafter controlling the typewriter carriage from the escapement on the computing machine, and connections between the numeral keys and the computing machine for setting the latter for computing the values of the numeral keys operated.

36. The combination with a typewriter and a computing machine, of an escapement for the typewriter, means for operating the escapement from the typewriter keys, an escapement for the computing machine also operated by said means, and mechanism for shifting said means so as to operate either escapement as desired.

37. The combination of a typewriter having numeral keys and a computing machine, of an escapement for the typewriter, means for operating the escapement from the typewriter keys, an escapement for the computing machine also operated by said means, mechanism for shifting said means so as to operate either escapement as desired, and connections between the numeral keys and the computing machine for setting the latter for computing the values of the numeral keys operated.

38. The combination with a typewriter and a computing machine, of an escapement for the typewriter, means for operating the escapement from the typewriter keys, an escapement for the computing machine including a frame carrying escapement pawls, a shaft upon which said frame is mounted, said shaft extending to the said typewriter, a common means for actuating the typewriter escapement and for rocking said shaft, and mechanism for shifting said means so as to operate either the shaft or the typewriter escapement as desired.

39. The combination with a typewriter having a carriage, of a computing machine having a carriage, an escapement on the computing machine for controlling the movements of both of said carriages, said escapement including a toothed bar, the teeth on which are spaced unequal distances whereby the carriage is permitted to space unequally, for the purpose specified.

40. The combination with a typewriter and a computing machine, a carriage on the typewriter, a carriage on the computing machine, an escapement coöperating with the latter carriage, means for controlling the escapement from the typewriter, connections between the typewriter carriage and said escapement, a toothed bar forming a member of said escapement, the teeth on said bar being spaced unequal distances whereby the characters printed by the typewriter will be unequally spaced, for the purpose specified, and means for disconnecting the typewriter carriage from said escapement.

41. The combination with a typewriter and a computing machine, of a carriage for the typewriter, a carriage for the computing machine, an escapement for the typewriter carriage, an escapement for the computing machine carriage, means for operating each of said escapements from the typewriter, connections between said carriages, said connections including reduction gearing whereby, when the carriage for the computing machine is permitted to escape, the typewriter carriage will be moved a distance less than the movement of the computer carriage.

42. The combination with a typewriter and a computer, of a carriage for the typewriter, a carriage for the computer, an escapement for the typewriter carriage, an escapement for the computer carriage, means for operating each of said escapements from the typewriter, mechanism for shifting said operating means so as to operate either escapement desired, connections between said carriages, said connections including reduction gears, whereby, when the computer escapement is operated to cause the computer carriage to move, the typewriter carriage will move a shorter distance.

43. The combination with a typewriter and a computer, of a carriage for the typewriter, a carriage for the computer, an escapement mechanism for the computer carriage, means for operating said escapement mechanism from the typewriter, connections between said carriages, said connections including gearing so arranged that, when the computer carriage is permitted to move for one space in one direction, the typewriter carriage will move for one space in the opposite direction.

44. The combination with a typewriter and a computer, of a carriage for the typewriter, a carriage for the computer, an escapement mechanism for the computer carriage, said mechanism including a toothed bar having its teeth unequally spaced, means for operating said escapement mechanism from the typewriter, connections between said carriages, said connections including gearing so arranged that when the computer carriage is permitted to move in one direction the typewriter carriage will move in the opposite direction, the unequal spacing of the teeth on the toothed bar causing said carriages to escape unequal distances, for the purpose specified.

45. The combination with a typewriter and a computer, of a carriage for the typewriter, a carriage for the computer, an escapement mechanism for the computer carriage, means for operating said escapement mechanism from the typewriter, connections between said carriages, said connections including reduction gearing so arranged that when the computer carriage is permitted by its escapement to move for one space in one direction the typewriter carriage will move for a shorter space in the opposite direction, and means for causing said carriages to escape for different distances at different operations of the computer-carriage escapement.

46. The combination with a typewriter having numeral keys, of a computer, selecting mechanism in said computer for determining the computations to be made thereon, and connections between the numeral keys of the typewriter and the selecting mechanism of the computer, whereby the operation of one of said numeral keys sets the selecting mechanism for computing an amount having the co-digit value of the numeral key operated.

47. The combination with a typewriter having numeral keys, of a computing machine having value keys, and connections between the numeral keys and the value keys whereby the operation of one of said numeral keys depresses the value key having the co-digit value of the numeral key depressed.

48. The combination with a typewriter having numeral keys, of a computing machine, selecting mechanism in said computing machine for determining the computation to be made thereon, a series of rock shafts operated by said numeral keys, and means coöperating with said rock shafts for setting the selecting mechanism for computing an amount having the co-digit value of the numeral key operated.

49. The combination with a typewriter having numeral keys, of a computing machine having value keys, a series of rock shafts operated by said numeral keys, and means coöperating with said rock shafts for depressing value keys of the computing machine that represent the co-digit values of the numeral keys depressed.

50. The combination with a typewriter having numeral keys, of a computing machine having a bank of value keys arranged in order rows, means operated by the numeral keys for depressing the keys of co-digit value in the value keybank, and escapement mechanism controlled by the typewriter keys for shifting the position of the depressing means from one order row of keys to another.

51. The combination with a typewriter having numeral keys, of a computing machine having a bank of value keys arranged in order rows, a rock shaft for each numeral key and operated thereby, means coöperating with said rock shafts for causing the depression of value keys having the co-digit values of the numeral keys operated, and an escapement mechanism controlled by the typewriter keys for shifting the position of the depressing means from one order row of keys to another.

52. The combination with a typewriter having numeral keys, of a computing machine having a bank of value keys arranged in order rows, a series of extensible rock shafts, connections between the said numeral keys and their respective rock shafts, means carried by said extensible rock shafts for depressing value keys having the co-digit values of the numeral keys depressed, and an escapement mechanism controlled by the typewriter keys for shifting the depressing means from one order row to another.

53. The combination with a typewriter having numeral keys, of a computing machine having value keys arranged in order rows, a series of extensible rock shafts, connections between the said numeral keys and said rock shafts, means operated by said rock shafts and movable with the extensible portions thereof for depressing value keys in the computing machine having the co-digit values of the numeral keys depressed, and an escapement mechanism controlled by the typewriter keys for shifting the depressing means from one order row to another.

54. The combination with a typewriter having numeral keys and a computing machine having value keys, of a series of rock shafts connected with the typewriter, said shafts being normally out of operative connection with the numeral keys, connections between said shafts and the value keys for depressing said value keys when the shafts are rocked, and means for establishing operative connection between the numeral keys and the said shafts whereby, upon the operations of the numeral keys of the typewriter, said shafts are rocked and value keys having the co-digit values of the operated numeral keys are depressed.

55. The combination with a typewriter having numeral keys and a computing machine having a bank of value keys arranged in order rows, of a series of rock shafts connected with the typewriter, said shafts being normally out of operative connection with the numeral keys, a second series of rock shafts connected with the rock shafts of the first series, connections between the said second series of shafts and the value keys for depressing said value keys when the shafts are rocked, and means for establishing operative connections between the numeral keys and the first series of rock shafts such that, upon the operation of the numeral keys of the typewriter, said shafts will be rocked and value keys having the co-digit values of the operated numeral keys will be depressed.

56. The combination with a typewriter having numeral keys and a computing machine having value keys, of a series of plungers operated by said numeral keys, a series of rock shafts having fingers that are adapted to coöperate with said plungers, the plungers being normally out of operative relation with said fingers, connections between said shafts and the value keys of the computing machine, and means for establishing operative relation between the said plungers and the said fingers on the rock shafts, whereby, on the depression of a numeral key, one of said rock shafts will be operated to depress a value key having the co-digit value of the numeral key depressed.

57. The combination with a typewriter having numeral keys and a computing machine having value keys, of a series of plungers operated by said numeral keys, a shift frame for guiding said plungers, a series of rock shafts having fingers that are adapted to coöperate with said plungers, the plungers being normally out of operative relation with said fingers, connections between said shafts and the value keys of the computing machine, means for shifting said frame and said shafts for bringing the plungers and the fingers on the shafts into operative relation, whereby, on the depression of a numeral key, one of the rock shafts will be operated to depress the value key having the co-digit value of the numeral key operated.

58. The combination with a typewriter having numeral keys and a computing machine having value keys, of a pair of frame plates below the numeral keys, a series of spring-pressed plungers guided in said plates and coöperating with the numeral keys, a series of rock shafts below said plungers, fingers on said rock shafts that are normally out of operative relation with the plungers, means for establishing operative relation between the plungers and said fingers, and connections between said rock shafts and the value keys of the computing machine, the construction being such that upon the depression of a numeral key the value key of co-digit value is also depressed.

59. The combination with a typewriter having numeral keys and a computing machine having value keys, of a pair of frame plates below the numeral keys, a series of spring-pressed plungers guided in said plates and coöperating with the numeral keys, a series of rock shafts below said plungers, fingers on said rock shafts that are normally out of operative relation with the plungers, means for shifting the frame plates and the rock shafts so as to bring the plungers and said fingers into operative relation and connections between said rock shafts and the value keys of the computing machine whereby, after said relation has been established, and when a numeral key is depressed, a value key having the co-digit value of the numeral key will also be depressed.

60. The combination with a typewriter having numeral keys and a computing machine having value keys, of a frame arranged beneath the numeral keys, a series of plungers mounted in said frame and coöperating with the numeral keys, a series of rock shafts arranged below said plungers, a finger projecting from each of said rock shafts but being normally out of operative connection with the corresponding plunger, a special key, mechanism connected with said special key for establishing an operative relation between the plungers and the said fingers, and connections between the rock shafts and the value keys of the computing machine whereby, upon the depression of the special key, the operation of a numeral key will result in operating the value key having the co-digit value of the numeral key operated.

61. The combination with a typewriter having numeral keys, and a computing machine having value keys, of a frame arranged beneath the numeral keys, a series of plungers mounted in said frame and coöperating with the numeral keys, a series of rock shafts arranged below said plungers, a finger projecting from each of said rock shafts but being normally out of operative relation with its corresponding plunger, a subtraction key, connections between said subtraction key and said frame and between said key and the rock shafts for bringing the plungers and said fingers into operative relation; and means connecting the rock shaft and the value keys of the computing machine whereby, upon the depression of the subtraction key, the operation of a numeral key will result in depressing the value key having the co-digit value of the numeral key operated.

62. The combination with a typewriter having numeral keys and a computing machine having value keys, of a pair of horizontal plates beneath the numeral keys, a series of vertical plungers guided in said plates, springs for holding said plungers in their upper positions, a series of rock shafts adapted to be operated by said plungers, means for normally maintaining said plungers and said shafts out of operative position with respect to each other, a subtraction key, mechanism connected with said subtraction key for establishing operative relation between said plungers and said shafts, and means connecting the rock shafts with the value keyboard whereby, upon the depression of the subtraction key the operation of a numeral key will depress the value key of co-digit value in the computing mechanism.

63. The combination with a typewriter having numeral keys and a computing machine having value keys, of a pair of horizontal plates beneath the numeral keys, a series of vertical plungers guided in said plates, springs for normally holding said plungers in their upper position, a series of rock shafts adapted to be operated by said plungers, means for normally holding the plates and the rock shafts in positions for maintaining the plungers out of operative relation with their shafts, a subtraction key, means connected with said subtraction key for shifting both the plates and the rock shafts for establishing operative relation between the shafts and the plungers, and means connecting the rock shafts with the value keyboard whereby, upon the depression of the subtraction key, the operation of a numeral key will depress the value key having the co-digit value.

64. The combination with a typewriter having numeral keys and a computing machine having value keys, of a frame below the numeral keys, a series of vertical plungers in said frame for coöperating with the numeral keys, a spring for each of said plungers, said springs operating to hold the plungers in their vertical positions, a second frame, a series of rock shafts journaled in said second frame, there being one rock shaft for each of the numeral keys, a finger projecting from each of the rock shafts, means for holding said frames in position to maintain the plungers and said fingers out of operative relation, a subtraction key, a pair of rock shafts operated by said subtraction key, means on the latter shafts for moving the two frames so as to bring the plungers and the fingers into operative relation, and connections between the rock shafts of the said series and the value keys whereby, upon the operation of the subtraction key, the depression of a numeral key results in operating one of the rock shafts of said series and in depressing a value key having the co-digit value of the numeral key depressed.

65. The combination with a typewriter having numeral keys and a computing machine having a bank of value keys arranged in order rows, of a frame below the numeral keys, a series of vertical plungers in said frame for coöperating with the numeral keys, a spring for each of said plungers, said spring operating to hold the plungers in their upper positions, a second frame, a series of rock shafts journaled in said second frame, there being one rock shaft for each of the numeral keys, a finger projecting from each of the rock shafts, means for holding said frames in position to maintain the plungers and the fingers out of operative relation, a subtraction key, a pair of rock shafts operated by said key, means on the latter rock shafts for moving the said frames so as to bring the plungers and the said fingers into operative relation, connections between said series of rock shafts and the value keys whereby, upon the operation of the subtraction key, the depression of a numeral key results in operating its corresponding rock shaft and in depressing a value key in one of the order rows of the computing machine that has the co-digit value of the numeral key depressed, and a carriage for the computing machine under control of the numeral keys of the typewriter.

66. The combination with a typewriter having numeral keys and a computing machine, of a series of rock shafts corresponding with the numeral keys of the typewriter, normally broken connections between said numeral keys and the rock shafts, a carriage on the typewriter, a tabulating bar on the computing machine, connections between the carriage and the tabulating bar for moving the two together, an escapement mechanism for the typewriter carriage, a subtraction key, means operated by said subtraction key for establishing connection between the numeral keys and the rock shafts, means operated by the subtraction key for throwing the escapement out of operation whereby the carriage and the tabulator are moved, and connections between the rock shafts and the computing mechanism whereby the operation of a numeral key will set such mechanism for computing the co-digit value of the operated key.

67. The combination with a typewriter having numeral keys and a computing mechanism, of a series of rock shafts corresponding with the numeral keys of the typewriter, a frame arranged between said numeral keys and the rock shafts, said frame having a plurality of plungers that are adapted to be depressed by said keys, fingers on said shafts that are adapted to be depressed by said plungers, means for normally holding said frame and the shafts in a position for maintaining the plungers and the fingers out of operative relation, a carriage on the typewriter, a tabulating bar on the computing machine, connections between the carriage and the tabulating bar for moving the two together, an escapement mechanism for the typewriter carriage, a subtraction key, means operated by said subtraction key for moving the frame and the rock shafts so as to bring the plungers and said fingers into operative relation, means operated by the subtraction key for throwing the escapement out of operation whereby the carriage and the tabulator are caused to move, and connections between the rock shafts and the computing mechanism whereby the operation of a numeral key will set such mechanism for computing the co-digit value of the numeral key operated.

68. The combination with a typewriter having numeral keys and a computing machine, normally broken connections between the typewriter and the computing machine whereby the operation of the typewriter is independent of the computing machine, means for establishing connections between the typewriter and the computing machine such that the operation of a numeral key in the typewriter results in setting the computing machine for computing the value of the key depressed, and means for so altering the connections between the typewriter and the computing machine that, when a numeral key is operated the computing machine will be set for computing the co-digit value of the operated numeral key.

69. The combination with a typewriter having numeral keys and a computing machine, said typewriter being normally independent of the computing machine in its operation, of an adding key, means under control of the adding key for establishing a connection between the typewriter and the computing machine, such that upon the operation of a numeral key the computing machine will be set for computing the value of the numeral key depressed, a subtraction key, and means under control of the subtraction key for establishing a connection between the typewriter and the computing machine such that the operation of a numeral key results in setting the computing machine for computing the co-digit value of the numeral key depressed.

70. The combination with a typewriter having numeral keys and a computing machine, the typewriter being normally independent of the computing machine in its operation, of a series of plungers coöperating with the numeral keys, a series of rock shafts, one for each numeral key, a series of fingers projecting from said rock shafts, a second series of fingers also projecting from said rock shafts, all of said fingers being normally out of operative relation with the plungers, an adding key, means connected with said adding key for shifting the plungers into position to coöperate with the first series of fingers on the rock shafts, a subtraction key, means operated by said subtraction key for shifting the rock shafts so as to bring the second series of fingers into operative relation with the plungers, and connections between the rock shafts and the computing machine, the construction being such that when the adding key is operated and a numeral key is then depressed, the computing machine will be set for computing the value of the operated numeral key, and when the subtraction key is depressed and a numeral key is then operated, the computing machine will be set for computing the co-digit value of the operated numeral key.

71. The combination with a typewriter having numeral keys and a computing machine, of a frame, a series of plungers carried by said frame and coöperating with the numeral keys, a series of rock shafts, there being one rock shaft for each numeral key, a series of fingers carried by said rock shafts, a second series of fingers also carried by the rock shafts, all of said fingers being normally out of operative relation with the plungers so that the operation of the typewriter is independent of the computing machine, connections between the rock shafts and the computing machine, an adding key, means connected with said adding key for shifting the plungers into position to coöperate with the first series of said fingers so that, upon the operation of a numeral key the computing machine will be set to compute the value of said key, a subtracting key, means operated by the subtracting key for shifting the plungers and the rock shafts so as to establish operative relation between the plungers and the second series of said fingers so that, upon the operation of a numeral key, the computing machine will be set for computing the co-digit value of the numeral key operated.

72. The combination with a typewriter having numeral keys and a computing machine, of a frame, a series of plungers carried by said frame and coöperating with the numeral keys, a series of rock shafts, there being one rock shaft for each numeral key, a series of fingers carried by said rock shafts, a second series of fingers also carried by the rock shafts, all of said fingers being normally out of operative relation with the plungers so that the operation of the typewriter is independent of the computing machine, connections between the rock shafts and the computing machine, an adding key, means connected with said adding key for shifting the said frame so as to carry the plungers into position for coöperating with the first series of said fingers, so that, upon the operation of a numeral key, the computing machine will be set to compute the value of said key, a subtracting key, means connected with the subtracting key for operating the adding key and shifting the said frame, means also operated by the subtracting key for shifting the rock shafts so that the plungers and the second series of fingers are brought into operative relation whereby, upon the operation of a numeral key, the computing machine will be set for computing the co-digit value of the numeral key operated.

73. The combination with a typewriter having numeral keys and a computing machine, of a frame, a series of plungers carried by said frame and coöperating with the numeral keys, a series of rock shafts, there being one rock shaft for each numeral key, a series of fingers carried by said rock shaft, all of said fingers being normally out of operative relation with the plungers so that the operation of the typewriter is normally independent of the computing machine, connections between the rock shafts and the computing machine, an adding key, means operated by said adding key for establishing operative connection between certain of said plungers and certain of the fingers on the rock shafts so that the depression of a numeral key results in setting the computing machine for computing the value of that key, a subtracting key, and means operated by the subtraction key for establishing operative relation between other plungers and other fingers on the rock shafts, so that the operation of a numeral key will result in setting the computing machine for computing the co-digit value of the numeral key operated.

74. The combination with a typewriter having numeral keys and a computing machine, of normally broken connections between the typewriter and the computing machine so that they are independent of each other, a tabulating bar on the computing machine, an escapement for said tabulating bar, said bar and its escapement being normally out of operative relation with each other, and means for simultaneously establishing operative relation between the typewriter and the computing machine and between the tabulating bar and its escapement.

75. The combination with a typewriter having numeral keys and a computing machine, of normally broken connections between the typewriter and the computing machine so that they are independent of each other, a carriage on the typewriter, an escapement for said carriage, a tabulating bar on the computing machine, connections between the tabulating bar and the typewriter carriage, an escapement for said tabulating bar, said bar and its escapement being normally out of operative relation with each other, and means for simultaneously establishing operative relation between the typewriter and the computing machine and between the tabulating bar and its escapement, and at the same time throwing the escapement for the typewriter carriage out of operation whereby said carriage and the tabulating bar are permitted to move until arrested by the tabulating bar escapement.

76. The combination with a typewriter and a computing machine, of a carriage for the typewriter, an escapement for said carriage, a tabulating bar, an escapement for said tabulating bar, the escapement for the typewriter carriage being normally in operative condition and the escapement for the tabulating bar being normally in inoperative condition, and means for simultaneously throwing the escapement for the typewriter carriage out of operation and for bringing the tabulating bar escapement into operative condition.

77. The combination with a typewriter having numeral keys and a computing machine, of a carriage for the typewriter, an escapement for the carriage, a tabulating bar, an arresting means for said tabulating bar, said bar and its arresting means being normally out of operative relation, normally broken connections between the numeral keys of the typewriter and the computing machine, and means for simultaneously establishing operative connection between said keys and computing machine, establishing operative relation between the tabulating bar and its arresting means, and for throwing out of operation the escapement for the typewriter carriage whereby said carriage and the tabulating bar are permitted to move until arrested by said arresting means.

78. The combination with a typewriter having numeral keys and a computing machine, of normally broken connections between the said keys and the computing machine, a tabulating bar, an arresting means for the tabulating bar, mechanism for normally maintaining said bar out of operative relation with its arresting means, and means for establishing operative connections between the numeral keys and the computing machine and for simultaneously bringing the tabulating bar into position for engagement with its arresting means.

79. The combination with a typewriter having numeral keys and a computing machine, of normally broken connections between the said numeral keys and the computing machine, a tabulating bar, arresting means for said tabulating bar, means for normally holding the tabulating bar elevated so that it is out of operative position with respect to the arresting means, a special key, and means operated by the special key for establishing operative relations between the numeral keys and the computing machine, and for simultaneously lowering the tabulating bar into position for engagement with its arresting means.

80. The combination with a typewriter having numeral keys and a computing machine, of a series of plungers for the numeral keys, a series of rock shafts, connections between the rock shafts and the computing machine, said rock shafts and the plungers being normally out of operative relation, a tabulating bar on the computing machine, tabulating pins in said bar, an arresting means adapted to be engaged by said pins, means for normally maintaining said pins and arresting means out of operative relation, an adding key, a means operated by the adding key for establishing operative relation between the plungers and the rock shafts and for simultaneously establishing operative relation between the said pins and said arresting means.

81. The combination with a typewriter having numeral keys and a computing machine, of a frame below the numeral keys, a series of plungers mounted in said frame and coöperating with the numeral keys, a series of rock shafts, connections between said rock shafts and the computing machine, a series of fingers on said rock shafts, means for normally maintaining the frame in a position for holding the plungers out of operative relation with said fingers, a tabulating bar, an arresting means for said tabulating bar, means for normally holding said bar out of operative relation with its arresting means, an adding key, means connected with said adding key for shifting said frame so as to carry the plungers therein into operative position with respect to the fingers on the rock shafts, and means operated by said frame for causing the tabulating bar to be moved into operative position with respect to its arresting means.

82. In a combined printing and computing machine, the combination with means for printing digits, of means for adding values, and mechanism for causing the computing machine to add the co-digit value of the digit printed.

83. The combination with a typewriter and a computing machine, of numeral keys on the typewriter, means for adding values on the computing machine, and mechanism for causing the computing machine to add the co-digit values of the digits printed by the numeral keys.

84. The combination with a typewriter and a computing machine, of numeral keys on the typewriter for printing digits, means in said computing machine for adding values, connections between the value keys and the computing machine for causing the latter to add the values of the digits printed by the numeral keys, and means for altering said connections so as to cause the computing machine to add the co-digit values of the digits printed by the numeral keys.

85. In a computing machine having a bank of value keys arranged in order rows, a carriage, mechanical means carried by said carriage for depressing the value keys, mechanism for shifting said carriage so as to bring the depressing means into operative relation with the order rows, and means for predetermining the extent of movement of said carriage.

86. In a computing machine having a bank of value keys arranged in order rows, a carriage, mechanical means controlled by said carriage for operating the value keys, a drive shaft, means connected with the drive shaft for shifting the carriage, and selecting means for predetermining the order row to which said carriage is to be shifted.

87. In a computing machine having a bank of value keys arranged in order rows, a carriage, mechanical means on said carriage for operating the value keys, a drive shaft, a series of clutches on said shaft, connections between said clutches and the carriage for shifting the latter, said clutches being differentiated so as to shift the carriage different distances, and means for connecting any clutch with the drive shaft.

88. In a computing machine having a bank of value keys arranged in order rows, a carriage, mechanical means on said carriage for depressing the value keys, a drive shaft, a plurality of clutches on the drive shaft, means connecting said clutches and operated differentially thereby for shifting the carriage to different positions, and a series of order keys for controlling the clutches whereby, upon the operation of an order key, its corresponding clutch will be caused to operate and to shift the carriage to a position determined by said order key.

89. In a computing machine having a bank of value keys arranged in order rows, a carriage, means controlled by said carriage for operating said keys, a drive shaft, a series of normally disconnected clutches on the drive shaft, a gear segment connected with each clutch, the numbers of gear teeth differing progressively with the clutches, a series of gear segments coöperating with those on the clutches and having gear teeth corresponding in numbers with those on their respective clutches, connections between the latter gear segments and the carriage whereby, when the said clutches are operated, the carriage will be caused to travel a distance dependent upon the clutch employed, and means for selecting any clutch desired and for connecting the same with the drive shaft whereby the carriage may be moved to any desired position with respect to the keyboard.

90. In a computing machine having a bank of value keys arranged in order rows, a carriage, means controlled by said carriage for depressing said keys, a drive shaft, a series of clutch members secured to said shaft, a series of coöperating clutch members loosely mounted on the shaft and adapted to coöperate with the other clutch members respectively, means for clutching the respective clutch members together, said means being normally held out of operation a series of order keys for controlling the clutching means whereby, upon the operation of one of the order keys its corresponding clutch is caused to operate, and connections between the loosely mounted clutch members and the carriage for shifting the latter with respect to the value keyboard, the said loosely mounted members being differentially constructed so that said carriage is moved differentially and to positions predetermined by the order key operated.

91. In a computing machine having a bank of value keys arranged in order rows, a carriage, means controlled by said carriage for depressing the said keys, a drive shaft, a series of normally disconnected clutches on the drive shaft, connections between said clutches and the carriage for shifting the latter, means for connecting at will any clutch with the drive shaft and for disconnecting the same at the end of a single rotation, and means for determining which clutch is to be operated, the clutches being differentially constructed so as to move the carriage different distances.

92. In a computing machine having a bank of value keys arranged in order rows, a carriage, means controlled by said carriage for depressing the value keys, a constantly driven power shaft, connections between the power shaft and said carriage for shifting the latter and means for predetermining the position to which said carriage is to be shifted.

93. In a computing machine having a bank of value keys arranged in order rows, a carriage, means controlled by said carriage for depressing the value keys, a constantly driven power shaft, a series of clutches on said power shaft, said clutches being normally disconnected from the shaft, gearing connecting the said clutches with the carriage, the clutches being differentially constructed so that the carriage will be moved different distances by the different clutches, a series of order keys, and means controlled by the order keys for connecting any clutch desired with its shaft and for shifting the carriage to its predetermined position with respect to the keyboard.

94. In a computing machine having a bank of value keys arranged in order rows, a carriage, means controlled by said carriage for depressing the keys, a constantly driven power shaft, ratchet clutch members secured to said shaft, coöperating clutch members mounted loosely on the shaft, a pawl pivoted to each of the coöperating clutch members, a spring bearing upon said pawl and tending to throw the same into engagement with its ratchet clutch member, a flange on the coöperating clutch member projecting over the pawls therein, said flange having an opening opposite the tails of the pawls, plungers extending through said openings and bearing against the tails of the pawls to hold the latter out of operation, means for operating any one of said plungers desired so as to permit its coöperating pawl to engage with its ratchet member whereby said coöperating member is rotated, the said flange holding the plunger out of operation until the opening in the flange again reaches the plunger so that the latter may disconnect with its pawl, gear teeth on the coöperating members, the numbers of gear teeth on the successive members differing progressively, and connections between the coöperating members and the carriage for shifting the latter distances predetermined by the plunger operated.

95. The combination with a typewriter and a computing machine, of numeral keys on the typewriter, a bank of value keys arranged in order rows on the computing machine, a carriage for the typewriter, a carriage for the computing machine, means carried by the latter carriage for depressing the value keys of the computing machine, a tabulator connected with the typewriter carriage, an escapement mechanism for the typewriter carriage, means for throwing out said escapement and for causing said tabulator to operate whereby the said carriages are automatically moved into positions for printing and computing in one order of a number, and means for automatically shifting the carriages into position for printing and computing in another order of said number.

96. The combination with a typewriter having numeral keys and a computing machine having a bank of value keys arranged in order rows, of a carriage for the typewriter, a carriage for the computing machine, means controlled by the latter carriage for depressing the value keys, an escapement for the typewriter carriage, a tabulating bar, an arresting means for said bar, means for throwing out the escapement for the typewriter carriage whereby said carriage is permitted to move into position for printing the digit of the lowest order in a number to be printed, and mechanism connected with the computing machine for automatically shifting said carriages into position for printing and computing the digit of the highest order in the number.

97. The combination with a typewriter having numeral keys and a computing machine having a bank of value keys arranged in order rows, of normally broken connections between the numeral keys and the value keys so that the typewriter and computing machine are normally independent, a carriage for the typewriter, a carriage for the computing machine, means controlled by the latter carriage for controlling the connections between the numeral and value keys, an escapement for the typewriter carriage, a tabulating bar for determining the position of the typewriter carriage, means for throwing out of operation the escapement for the typewriter carriage and for establishing operative connection between the numeral and the value keys whereby the tabulating bar and the typewriter carriage are permitted to move to a position for printing the digit of lowest order in a number, and means for automatically shifting the carriages into position for printing and computing the digit of highest order in such number.

98. The combination with a typewriter having numeral keys and a computing machine having a bank of value keys arranged in order rows, of normally broken connections between the typewriter and the computing machine so that said machines are normally independent of each other, a carriage for the typewriter, a carriage for the computing machine, an escapement for the typewriter carriage, a tabulating bar connected with the typewriter carriage, an arresting means for said bar, means for establishing operative connection between the numeral and value keys and for throwing out of operation the said escapement mechanism whereby the typewriter carriage and the tabulating bar are permitted to move until said bar is arrested by its arresting means, such movement carrying the typewriter carriage into position for printing the digit of lowest order in a number, a drive shaft, a series of clutches on said drive shaft, means connecting said clutches with the carriage on the computing machine whereby, upon the operation of said clutches, the carriages are moved, said clutches being differentially constructed so as to move the carriages different distances, and a series of order keys controlling the various clutches whereby, upon the depression of the proper order key said carriages will be shifted into position for printing and computing the digit of highest order in said number.

99. The combination with a typewriter having numeral keys and a computing machine, of connections between said numeral keys and the computing machine such that the operation of the numeral keys for printing a numeral sets the computing machine for computing the co-digit value of that numeral, a constantly driven power shaft, a normally inoperative clutch on said power shaft, mechanism connected with said clutch for computing the number previously printed, and means for connecting said clutch with the drive shaft so as to operate the computer.

100. In a computing machine, a bank of value keys arranged in order rows, a series of computing wheels, means controlled by the operated value keys for computing their values upon their respective computing wheels, a drive shaft, an operating clutch normally disconnected from said shaft, means operated by said clutch for turning the computing wheels, a series of differentiated order clutches normally disconnected from said drive shaft, a carriage, gearing connecting the order clutches with the carriage, and means for simultaneously operating the operating clutch and one of said order clutches, whereby the number previously set up on the keyboard is computed and the machine is placed in condition for the depressing of a key in the highest order of the next number to be computed.

101. The combination with a typewriter having numeral keys and a computing machine having value keys arranged in order rows, of connections between the numeral keys and the value keys whereby the latter are depressed by the operation of the numeral keys, a series of computing wheels, means controlled by the operated value keys for computing their values upon their respective computing wheels, a drive shaft, an operating clutch normally disconnected with said shaft, means operated by said clutch for turning the computing wheels, a series of order clutches normally disconnected with said drive shaft, means under control of the order clutches for placing the typewriter and the computing machine in condition for printing and adding the digit of highest order in the next succeeding number, and means for simultaneously operating the operating clutch and one of said order clutches, for the purpose specified.

102. The combination with a typewriter having numeral keys and a computing machine having a bank of value keys arranged in order rows, of connections between the numeral keys and the value keys for depressing the latter upon the operation of the numeral keys, a carriage for the computing machine for controlling said connections, a carriage for the typewriter, an escapement mechanism for the typewriter carriage, a tabulating bar connected with the typewriter carriage, arresting means for the tabulating bar, mechanism for throwing the escapement mechanism out of operation whereby the typewriter carriage and the tabulating bar are permitted to move until the latter is arrested by engagement with its arresting means, at which time the typewriter carriage is in position to print the digit of lowest order in a number, a drive shaft, an operating clutch on said drive shaft but normally disconnected therefrom, a series of order keys, a series of order clutches on the drive shaft under control of their respective order keys, and gearing connecting said clutches with the carriage for the computing machine, the clutches being differentially constructed so as to move the carriage for the computer varying distances, whereby upon the operation of an order key representing the highest order in the next number to be printed and computed, the said carriages will be automatically moved into position for printing and computing the digit in that order.

103. In a computing machine having a bank of value keys arranged in order rows, a carriage, means controlled by said carriage for depressing the keys in the keybank, a drive shaft, a series of computing wheels, means operated by said operating clutch for computing the values of the depressed value keys on the computing wheels, a series of order clutches carried by but being normally disconnected from the drive shaft, gearing connecting said clutches with the said carriage for moving the latter, said clutches being differentially constructed so as to move the carriage different distances depending upon the clutch operated, a series of order keys, one of said keys controlling the operating clutch alone and the other order keys controlling their respective order clutches, and connections between the order keys such that the operation of any of the said other order keys operates its respective order clutch and also the operating clutch whereby the values of the keys depressed in the value keybank are computed on the computing wheels and the carriage is shifted to position for depressing a key in the order of the first digit of the next succeeding number to be computed.

104. In a computing machine, a drive shaft, a main operating clutch and a series of order clutches mounted on but normally disconnected from the drive shaft, an operating-clutch order key and a series or order-clutch keys for controlling said clutches, and means connecting the operating-clutch order key with the order-clutch key whereby, upon the operation of one of the latter keys its respective clutch and also the operating clutch will be engaged with the drive shaft.

105. In a computing machine, a drive shaft, an operating clutch and a series of order clutches mounted on but normally disconnected from the drive shaft, an operating-clutch order key for controlling the operating clutch, a series of order-clutch keys for controlling their respective order clutches, and a universal bar coöperating with said keys whereby the operation of one of the order-clutch keys engages both its respective order clutch and the operating-clutch with the drive shaft, for the purpose specified.

106. In a computing machine, a series of computing wheels, a series of operating segments for said wheels, keys for controlling the movements of said segments in one direction, a constantly driven power shaft, a clutch on said shaft, a cam on said clutch, a yoke for returning the segments to normal position, and means operated by said cam for moving the yoke.

107. In a computing machine, a series of computing wheels, a series of computing segments for operating said wheels, keys for controlling the movements of said segments in one direction, a resilient member for and connected with each of the operating segments, means for engaging with said resilient members for returning the segments to normal position, movable stops for arresting the segments in their normal positions as they are returned, and transfer lugs on the computing wheels for moving the said stops and for permitting the segments to be moved an additional distance by the said resilient members whereby values are transferred from wheels of lower to wheels of higher order, and mechanism for operating the said engaging means for the resilient members.

108. In a computing machine, a series of computing wheels, a series of operating segments for said wheels, keys for limiting the movements of the segments in one direction, a spring for and connected with each of the operating segments, a yoke for engaging with said springs, means for moving said yoke whereby they are yieldingly moved by their springs to normal position, a movable stop for normally arresting the segments in their normal positions, and transfer lugs on the computing wheels for moving said stops and for thus permitting the said springs to move their respective segments an additional distance for transferring values on the computing wheels from the lower to the higher orders.

109. In a computing machine, a series of computing wheels, a series of operating segments for said wheels, said segments being pivoted upon a common axis, keys for limiting the movements of said segments in one direction, a yoke turning on the same axis with the segments, resilient members between said yoke and each of said segments, and means for rocking said yoke against the resilient members for returning the segments to normal position.

110. In a computing machine, a series of computing wheels, a series of operating segments therefor, said segments being pivoted on a common axis, a yoke mounted on the same axis with said segments, a constantly driven power shaft, a cam driven by said shaft, and connections between said cam and said yoke for moving the latter to return the segments to normal position.

111. In a computing machine, a series of computing wheels, a series of operating segments therefor, a resilient member on each of said segments, said segments being mounted on a common axis, a yoke also mounted on the said axis with the segments, a constantly driven power shaft, a cam driven from said shaft, and means connecting said cam with the said yoke for returning the segments to normal position.

112. In a computing machine, a series of computing wheels, a series of operating segments therefor, said segments being mounted on a common axis, a resilient member carried by each of said segments, a yoke mounted on the same axis with the segments, said yoke being adapted to engage with the resilient member on the segments, a constantly driven power shaft, a normally disconnected clutch on said power shaft, means for engaging said clutch with the shaft, a cam connected with said clutch, and connections between the cam and the said yoke for swinging the latter and returning the segments to normal position.

113. In a computing machine, a series of computing wheels, a series of operating segments therefor, said segments being pivoted on a common axis, keys for limiting the movements of the segments in one direction, a yoke pivoted on the same axis with the segment, a constantly driven power shaft, a pair of cams driven from said shaft, a pair of arms engaging with said cam on opposite sides of the power shaft, means connecting said arms together, and connections between one of said arms and the said yoke for moving the latter whereby the said segments are returned to normal position.

114. In a computing machine, a series of computing wheels, a rocking frame in which said wheels are mounted, a series of operating segments for said wheels, the said frame being normally rocked so as to maintain the said wheels out of engagement with the segments, means for limiting the movements of the segments in one direction while the wheels are out of engagement therewith, a constantly driven power shaft, a clutch on said power shaft, and means connected with said clutch for swinging the said frame to carry the wheels into engagement with their segments and for then returning the segments to normal position.

115. In a computing machine, a series of computing wheels, a swinging frame in which said wheels are mounted, a series of operating segments for said wheels, the swinging frame being normally held in position to maintain the wheels out of engagement with their segments, value keys for determining the movements of said segments in one direction while said wheels are out of engagement with the segments, a drive shaft, a clutch on said drive shaft, a sleeve connected with the clutch and surrounding the drive shaft, and cams on said sleeve for swinging the frame so as to throw the wheels into engagement with their segments and for then returning the segments to normal position, whereby the values of the operated keys are computed on the wheels.

116. In a computing machine, a series of computing wheels mounted side by side on a shaft, a swinging frame in which said shaft is journaled, a series of operating segments for said wheels, value keys for limiting the movements of the segments in one direction, the wheels being retained out of engagement with the segments while the latter are thus moving, a constantly driven power shaft, a clutch normally disconnected from said shaft, means for connecting said clutch with the shaft, a pair of cams connected with said clutch, means connecting one of said cams with the swinging frame for moving the computing wheels into engagement with their segments, and means connected with the other cam for returning the segments to normal position after the wheels have been thrown into engagement therewith, whereby the values of the operated keys are computed on the computing wheels.

117. In a computing machine, a series of computing wheels that are mounted side by side on a common shaft, a swinging frame within which said shaft is journaled, a series of operating segments for said wheels, value keys for controlling the movements of the segments in one direction, a constantly driven power shaft, a normally disconnected clutch thereon, means for connecting said clutch with the power shaft, a sleeve on said clutch and surrounding the power shaft, a pair of cams connected with said sleeve, mechanism connecting one of said cams with the said swinging frame for moving the computing wheels into and out of engagement with their respective segments, and mechanism connected with the other cam for returning the segments to normal position, whereby the computing wheels are turned to compute the values of the operated keys.

118. In a computing machine, a series of computing wheels that are mounted upon a common shaft, a swinging frame in which said shaft is mounted, a series of operating segments for said wheels, value keys for determining the movements of said segments in one direction, a constantly driven power shaft, a normally disconnected clutch on said shaft, means for connecting said clutch with the shaft, a sleeve connected with said clutch and surrounding the power shaft, two pairs of cams on said sleeve, means engaging one of said pairs of cams and operated positively in both directions thereby for swinging said frame so as to carry the computing wheels into and out of engagement with their respective segments, and means engaging the other pair of cams and operated thereby positively in both directions for returning the segments to their normal position after the computing wheels are in engagement therewith, whereby the values of the operated keys are computed on said wheels.

119. In a computing machine, a series of computing wheels, a series of operating segments for said wheels, a locking plate carried by each of said segments, a series of selecting devices for each of said segments, means under control of said selecting devices for normally holding said segments against operation, said selecting devices when operated releasing the segment and determining the extent of movement of the latter in one direction, the locking plates preventing the operation of any of the selecting devices of less value than the one operated, and means for returning the segments to normal position.

120. In a computing machine, a series of computing wheels, a series of pivoted operating segments for said wheels, curved locking plates carried by said segments, a series of selecting devices for each of said segments, said devices extending substantially radial with respect to the pivot of the segments and, when operated, extending into position for engaging with the rear of said plates for arresting the movement of their respective segments, the selecting devices of lower value being held from operation by the said plates, and means for returning the segments to normal position.

121. In a computing machine, a computing wheel, a pivoted segment for operating said wheel, means for normally locking said segment against movement, selecting devices which, when operated, simultaneously release their coöperating segment and determine the extent of movement thereof, and means on said segment for locking against operation all of the selecting devices that are of lower value than the one operated.

122. In a computing machine, a series of computing wheels, a series of pivoted operating segments for said wheels, a bank of value keys arranged in order rows, there being one order row for each segment, means controlled by said keys for determining the extent of movement of said segments in one direction, a locking frame for holding the keys in their operated positions, said frame being moved when a key is depressed, means under control of said frame for normally holding the corresponding segments against operation, said means being operated to release the segments upon the depression of a key corresponding therewith, a drive shaft, means connected with said drive shaft for returning the segments to normal position, and means also connected with said shaft for releasing the operated keys.

123. In a computing machine, a series of computing wheels, a series of operating segments for said wheels, a bank of value keys arranged in order rows, there being one order row for each segment, plungers coöperating with said keys and projecting, when operated, into position to intercept the corresponding segment as it moves in one direction, a locking frame for each order row of keys, a plunger under control of each of said locking frames for holding the corresponding segment in its normal position, a bell-crank connected with the latter plunger, the construction being such that, upon the operation of a key, the corresponding segment is released and is again arrested in a position to correspond with the value of the operated key, a drive shaft, means operated by said drive shaft for returning the segments to normal position, and means also operated by the drive shaft for simultaneously moving the locking frame to release the operated keys.

124. In a computing machine, a series of computing wheels, pivoted operating segments for said wheels, a bank of value keys arranged in order rows, plungers operated by the keys and projecting, when operated, into position to intercept their respective segment as the latter is moved in one direction, a locking frame for each of the order rows of keys for locking the keys in their operated position, a bell-crank for each of said frames, means connected with each of said bell-cranks for holding the respective segments in normal position, said means being operated to release the segments upon the depression of the keys in their respective order rows, means for returning the segments to normal position, and means for releasing the depressed keys.

125. In a computing machine, a series of computing wheels, a series of pivoted operating segments for said wheels, a bank of value keys arranged in order rows, a series of selecting devices for each of said order rows of keys, said devices projecting, when operated, into position for intercepting the movement of the segments in one direction, a locking frame for each of the order rows of keys, a lug on each of said locking frames, a rock shaft having means engaging said lug, and mechanism for returning the segments to normal position and for rocking the rock shaft whereby the depressed keys are released.

126. In a computing machine, a series of computing wheels, a series of operating segments for said wheels, a bank of value keys arranged in order rows, said keys, when depressed, determining the extent of movement of said segments in one direction, separate locking frames for each of the order rows, a lug on each of said locking frames, a rock shaft extending transversely of said frame and having means for engaging with said lugs, a constantly driven power shaft, a normally disconnected clutch on said power shaft, means for connecting said clutch with the power shaft, and mechanism operated by said clutch for returning the segments to normal position and for rocking said shaft for releasing the depressed keys.

127. In a computing machine, a rocking rod, swinging arms pivoted on said rod, a shaft journaled in the free ends of said swinging arms, a series of computing wheels journaled on said shaft, operating segments for said computing wheels, an arm secured rigidly to the pivot rod and having a loose connection with one of said swinging arms, detent pawls for the computing wheels rigidly secured to the pivot rod, and means for rocking the pivot rod so as to move the rigid arms thereon toward the operating segment whereby the computing wheels are thrown into engagement with said segments, the loose connection between the swinging arm and the rigid arm permitting the rocking rod an excess of movement to carry the detent pawls out of engagement with the computing wheels, and means for turning said segments.

128. In a computing machine, a series of computing wheels, a series of operating members for said wheels, a lug on each of said members except the one of lowest order, a bell crank for each of the members having a lug, a stop plate for each of said bell-cranks upon which the respective lugs normally rest, means on the computing wheels adapted to engage with the bell-cranks and remove the stop plates from the lugs whereby the members may move beyond the stop plates for a unit distance.

129. In a computing machine, a series of computing wheels, a series of operating segments for said wheels, a lug on each of said segments except the one of lowest order, a bell crank for each of the segments having a lug, a stop plate for each of said bell-cranks upon which the respective lugs normally rest, a transfer pin on the computing wheels, said pins being adapted to engage with the bell-cranks and remove the stop plates from the lugs whereby the segments may move beyond the stop plates for the distance of one tooth.

130. In a computing machine, a series of computing wheels, a series of operating segments therefor, a lug projecting from each of said segments with the exception of the one of lowest order, stop plates normally extending into the path of said lugs, transfer pins on the computing wheels, means operated by the transfer pins for removing the stop plates from the path of the lugs whereby the latter may move beyond their normal positions, and means for temporarily holding the stop plates in their removed position.

131. In a computing machine, a series of computing wheels, a series of operating segments therefor, a lug projecting from each of said segments except the segment of lowest order, a stop plate normally projecting into the path of movement of each of said lugs, a bell-crank lever pivoted to each of said stop plates and having an arm projecting toward the computing wheels, means on the computing wheels for moving the bell-crank levers for withdrawing the stop plates from the path of the said lugs whereby the segments may be permitted an excess of movement, and means for temporarily holding the stop plates out of the path of said lugs.

132. In a computing machine, a series of computing wheels, a series of operating members therefor, lugs projecting from certain of said members, stop-plates normally projecting into the path of the respective lugs, bell-crank levers pivoted to said stop-plates, said levers having arms projecting toward the computing wheels, means on said wheels for moving said arms for withdrawing the stop-plates from the path of said lugs, spring-operated devices for engaging said stop-plates when thus withdrawn for holding them in their withdrawn positions, said devices extending into the path of the respective lugs whereby the excess of movement imparted to the members will cause the lugs to remove said devices from the stop-plates.

133. In a computing machine, a series of computing wheels, a series of operating segments therefor, lugs projecting from certain of said segments, stop-plates normally projecting into the path of the respective lugs, bell-crank levers pivoted to said stop-plates, said levers having arms projecting toward the computing wheels, means on said wheels for moving said arms for withdrawing the stop-plates from the path of said lugs, spring-operated devices for engaging said stop-plates when thus withdrawn for holding them in their withdrawn positions, said devices extending into the path of the respective lugs whereby the excess of movement imparted to the segments will cause the lugs to remove said devices from the stop-plates.

134. In a computing machine, a series of computing wheels, a series of operating segments therefor, lugs projecting from certain of said segments, stop-devices normally in position for arresting the movements of said segments, means on said computing wheels for withdrawing the stop-devices from the path of said lugs, means for temporarily holding the stop-devices in their withdrawn position, a series of selecting devices for controlling the movements of the segments in one direction, means for returning the segments to normal position, spring members carried by said segments and engaging with the returning means, said spring members giving the segments an excess of movement when their stop devices have been withdrawn, for the purpose specified.

135. The combination with a printing device having numeral keys, of a computer, a series of computing wheels in the computer, selecting mechanism in said computer for determining the computation to be made on said wheels, connections between the numeral keys of the printing device and the selecting mechanism of the computer whereby the operation of one of the numeral keys sets the selecting mechanism for computing an amount having the co-digit value of the numeral key operated, transfer mechanisms for the computing wheels, and means for throwing out of operation certain of the transfer mechanisms when the co-digit values are to be computed.

136. The combination with a typewriter having numeral keys, of a computer, a series of computing wheels in the computer, selecting mechanism in said computer for determining the computation to be made on said wheels, connections between the numeral keys of the typewriter and the selecting mechanism of the computer whereby the operation of one of the numeral keys sets the selecting mechanism for computing an amount having the co-digit value of the numeral key operated, transfer mechanisms for the computing wheels, and means for throwing out of operation certain of the transfer mechanisms when the co-digit values are to be computed.

137. The combination with a typewriter having numeral keys and a computing machine having value keys, of connections between the numeral keys and the value keys whereby the operation of one of said numeral keys depresses the value key having the co-digit value of the numeral key depressed, a series of computing wheels in the computing machine, transfer devices for said wheels, and means for rendering certain of the transfer devices inoperative when co-digit values are to be computed.

138. The combination with a typewriter having numeral keys, of a computing machine, a series of computing wheels in said machine, selecting mechanism in said computing machine for determining the computation to be made on said wheels, a series of rock shafts operated by said numeral keys, means coöperating with said rock shafts for setting the selecting mechanism for computing an amount having the co-digit values of the numeral keys operated, transfer devices for the computing wheels, and means for rendering certain of said transfer devices inoperative when the co-digit values are to be computed.

139. The combination with a typewriter having numeral keys, of a computing machine having a bank of value keys arranged in order rows, means operated by the numeral keys for depressing the keys of co-digit value in the value key-bank, an escapement mechanism controlled by the typewriter keys for shifting the position of the depressing means from one order row of keys to another, computing wheels in said machine, transfer devices for said computing wheels, and means connected with each of said transfer devices for rendering the same inoperative.

140. In a combined printing and computing machine, the combination with means for printing digits of means for adding values, said means including a series of computing wheels, transfer devices for said wheels, mechanism for causing the computing machine to add the co-digit values of the digits printed, and means for rendering inoperative the transfer devices.

141. In a combined printing and computing machine, the combination with means for printing digits of means for adding values, said latter means including a series of computing wheels, transfer devices for said wheels, mechanism for causing the computing machine to add the co-digit values of the digits printed, a series of transfer-preventing keys, and means operated by said keys for throwing out of operation the respective transfer devices.

142. The combination with a typewriter and a computing machine, of numeral keys on the typewriter, a series of computing wheels on the computing machine, transfer devices for said computing wheels, mechanism for causing the computing machine to add the co-digit values of the digits printed by the numeral keys, a series of transfer-preventing keys, and connections between each of said keys and its respective transfer device for throwing the latter out of operation.

143. The combination with a typewriter and a computing machine, of numeral keys on the typewriter for printing digits, a series of computing wheels in the computing machine for adding values, transfer devices for said computing wheels, connections between the value keys and the computing machine for causing the latter to add the values of the digits printed by the numeral keys, means for altering said connections so as to cause the computing machine to add the co-digit values of the digits printed by the numeral keys, and means for throwing out of operation certain of the transfer devices when the co-digit values are to be added.

144. In a computing machine, a series of computing wheels, a series of operating members for said wheels, a lug on each of said members except the one of lowest order, arresting devices normally in the path of said lugs, means controlled by the computing wheels for temporarily removing the arresting devices from the path of the lugs to permit the respective members to have an excess of movement, and means for holding said members against such excess of movement when desired.

145. In a computing machine, a series of computing wheels, a series of operating segments for said wheels, a lug on each of said segments except the one of lowest order, arresting devices normally in the path of said lugs, means controlled by the computing wheels for temporarily removing the arresting devices from the path of the lugs to permit the respective segments to have an excess of movement, and means for holding said segments against such excess of movement when desired.

146. In a computing machine, a series of computing wheels, a series of operating segments for said wheels, a lug on each of said segments, except the one of lowest order, a bell-crank for each of the segments having a lug, a stop plate for each of said bell-cranks upon which the respective lug normally rests, means on the computing wheels adapted to engage with the bell-cranks and remove the stop plates from the lugs whereby the segments may move beyond the stop-plates for the distance of one tooth, transfer preventing keys, and means connected with said keys for engaging with the segments and preventing their movement beyond the stop-plates.

147. In a computing machine, a series of computing wheels, a series of operating devices for said wheels, means for permitting said devices to have an excess of movement for transferring from one wheel to the wheel next adjacent, and means movable into the path of said operating devices for preventing such excess of movement.

148. In a computing machine, a series of computing wheels, a series of operating devices therefor, means for permitting said devices to have an excess of movement for transferring from one wheel to the next adjacent wheel, depressible keys, and connections between said keys and their corresponding operating devices for preventing the excess movement of the latter.

149. In a computing machine, a series of computing wheels, a series of operating devices for said wheels, means controlled by the wheels for permitting said operating devices an excess of movement for transferring from one wheel to the next adjacent wheel, a series of transfer-preventing keys, and connections between each of said keys and its corresponding operating device for preventing the excess of movement of the latter.

150. In a computing machine, a series of computing wheels, a series of operating devices for said wheels, means controlled by the wheels for permitting said operating devices an excess of movement for transferring from one wheel to the next adjacent wheel, a series of transfer-preventing keys, connections between each of said keys and its corresponding operating device for preventing the excess of movement of the latter, and means for locking the keys in their operated positions.

151. In a computing machine, a series of computing wheels, a series of operating segments therefor, means controlled by said wheels for permitting an excess of movement of said segments for transferring from wheels of lower to wheels of higher order, a series of transfer-preventing keys, and a plate movable by each of said keys into engagement with its corresponding segment for preventing the excess of movement of the latter.

152. In a computing machine, a series of computing wheels, a series of operating segments therefor, means controlled by said wheels for permitting an excess of movement of said segments for transferring from wheels of lower to wheels of higher order, a series of transfer-preventing keys, a plate movable by each of said keys into engagement with its corresponding segment for preventing the excess of movement of the latter, and means for locking the keys in their operated positions.

153. The combination with a typewriter having numeral keys and a computing machine having a bank of value keys arranged in order rows, of connections between the value keys and the numeral keys whereby the depression of a numeral key results in depressing a value key having the same value, a tabulating mechanism for determining the position at which the numeral keys shall print and for determining the order row in the value keybank in which the value key shall be depressed, operating mechanism for causing the value of the depressed value key to be computed, and connections between said operating mechanism and the tabulating mechanism for spacing the typewriter for printing another item in the same transverse row and for setting the computing machine for the depression of the value key therein in the proper order row for computing the next item to be printed and for adding its value to the item previously computed.

154. The combination with a typewriter having numeral keys and a computing machine having a bank of value keys arranged in order rows, of connections between the value keys and the numeral keys whereby the depression of a numeral key results in depressing a value key having the co-digit value of the key depressed, a tabulating mechanism for determining the position at which the numeral keys shall print and for determining the order row in the value keybank in which the value key shall be depressed, operating mechanism for causing the value of the depressed value key to be computed, and connections between said operating mechanism and the tabulating mechanism for spacing the typewriter for printing another item in the same transverse row and for setting the computing machine for the depression of the value key therein in the proper order row for computing the next item to be printed and for adding its co-digit value to the item previously computed.

155. The combination with a typewriter having numeral keys and a computing machine, of a carriage for the typewriter, a tabulating bar having pins therein, said bar being connected with the typewriter carriage, an escapement coöperating with said pins, connections between the numeral keys and the computing machine for setting the latter for computing items printed by the numeral keys, means for operating the computing machine for computing said items and mechanism operated by the operating means for moving said escapement whereby the typewriter carriage is spaced for printing another item in the same transverse line.

156. The combination with a typewriter having numeral keys and a computing machine, of a carriage for the typewriter, a tabulating bar connected with said carriage, said bar having a series of tabulating pins, an escapement having pawls engaging with said pins, connections between the numeral keys and the computing machine for setting the latter for adding the values of the items printed by the numeral keys, operating mechanism for the computing machine, a rocking member operated by said operating mechanism, and connections between said rocking member and the escapement mechanism whereby, upon the operation of said operating mechanism, the escapement will be operated to permit the typewriter carriage to escape and move in position for printing the next succeeding item in the same transverse line with the item previously printed.

157. The combination with a typewriter having numeral keys and a computing machine, of a carriage for the typewriter, a tabulating bar connected with said carriage, said bar having a series of tabulating pins, an escapement having pawls engaging with said pins, connections between the numeral keys and the computing machine for setting the latter for adding the co-digit values of the items printed by the numeral keys, operating mechanism for the computing machine, a rocking member operated by said operating mechanism, and connections between said rocking member and the escapement mechanism whereby, upon the operation of said operating mechanism, the escapement will be operated to permit the typewriter carriage to escape and move in position for printing the next succeeding item in the same transverse line with the item previously printed.

158. The combination with a typewriter having numeral keys and a computing machine, of connections between the numeral keys and the computing machine for setting the latter for computing items printed by the typewriter, operating mechanism for the computing machine, connections between the operating mechanism and the typewriter for spacing the items printed either in transverse lines or vertical columns, and means under control of the operator for varying the latter connections so as to cause the typewriter to print its items in a transverse line or in a vertical column, as desired.

159. The combination with a typewriter having numeral keys and a computing machine, of a carriage on the typewriter, a roller platen on the carriage, connections between the numeral keys and the computing mechanism for setting the latter for computing items that are printed by the numeral keys, means for operating the computing machine, spacing mechanism for permitting the carriage to shift, after each item has been computed, into position for printing the next succeeding item in the same transverse row on the typewriter paper, mechanism for turning the said platen roller after each item has been computed, and mechanism under control of the operator for causing the operating means to shift the typewriter carriage or to turn the platen roller as desired.

160. The combination with a typewriter having numeral keys and a computing machine, of a carriage on the typewriter, a roller platen on the carriage, connections between the numeral keys and the computing machine for setting the latter for computing items that are printed by the numeral keys, means for operating the computing machine, a tabulating-bar connected with the carriage, an escapement coöperating with said bar, said escapement when operated permitting the bar and the carriage to shift into position for printing another item in the same transverse row, connections between the said escapement and the operating means whereby the said escapement is operated, connections between the operating means and the roller platen for turning the latter, and mechanism under control of the operator for throwing into operation the connections for operating the escapement and for simultaneously throwing out of operation the connections for turning the roller platen.

161. The combination with a typewriter having numeral keys and a computing machine, of a carriage on the typewriter, a roller platen on the carriage, connections between the numeral keys and the computing machine for setting the latter for computing items that are printed by the numeral keys, means for operating the computing machine, a tabulating bar connected with the carriage, an escapement for the tabulating-bar, a rock shaft and connections for turning the roller platen, mechanism connected with the operating means for operating the said escapement and the said rock shaft, and a selecting device for causing said mechanism to operate either the escapement mechanism for printing items in a transverse line or for operating the rock shaft to print the items in a vertical column.

162. The combination with a typewriter having numeral keys and a computing machine, of a carriage on the typewriter, a roller platen on the carriage, connections between the numeral keys and the computing machine for setting the latter for computing items that are printed by the numeral keys, a power shaft for operating the computing machine, a tabulating bar connected with the carriage, an escapement for the tabulating bar, a rock shaft and connections for turning the roller platen, a rocking member operated by the power shaft, connections between said rocking member and the escapement, separate connections between said rocking member and the power shaft, and means for moving said rocking member into position for operating either the escapement mechanism or the rock shaft whereby the typewriter is caused to print its items respectively in a transverse line or in a vertical column.

163. The combination with a typewriter having numeral keys and a computing machine, of a carriage on the typewriter, a roller platen on the carriage, connections between the numeral keys and the computing machine for setting the latter for computing items that are printed by the numeral keys, a power shaft for operating the computing machine, a tabulating-bar connected with the carriage, an escapement for the tabulating bar, a rock shaft and connections for turning the roller platen, a rocking member, means connected with the power shaft for rocking said member, an arm on the said member for operating the escapement mechanism, another arm on said member for operating the rock shaft, and means for shifting said member, whereby operative connection is established between the power shaft and the escapement mechanism for permitting the carriage to shift so as to print the items in a transverse line, or is established between the power shaft and the rock shaft for causing the typewriter to print the items in a vertical column.

164. The combination with a typewriter having numeral keys and a computing machine, of a carriage on the typewriter, a roller platen on the carriage, connections between the numeral keys and the computing machine for setting the latter for computing the co-digits of items that are printed by the numeral keys, means for operating the computing machine, a rock shaft and connections for turning the roller platen, and connections between the operating means and the rock shaft whereby, when the computing machine is operated to compute the co-digits of one item the roller platen will be turned for printing the next item in the next line on the typewriter.

165. The combination with a typewriter having numeral keys and a computing machine, of a carriage on the typewriter, a roller platen on the carriage, connections between the numeral keys and the computing machine for setting the latter for computing the co-digits of items that are printed by the numeral keys, means for operating the computing machine, mechanism operated by said means for turning the roller platen so that after the co-digits of one item have been computed the platen will be turned for printing the next item in the next line on the typewriter paper, and means connected with the operating means for automatically shifting the typewriter carriage so as to print the second item in the same vertical column with the first item printed.

166. The combination with a typewriter having numeral keys and a computing machine, of a carriage on the typewriter, a roller platen on the carriage, connections between the numeral keys and computing machine for setting the latter for computing items that are printed by the numeral keys, a power shaft for operating the computing machine, a tabulating bar connected with the carriage, an escapement for the tabulating bar, a rock shaft and connections for turning the roller platen, a rocking member, a cam driven by the power shaft for rocking said member, an arm on said member that is adapted to operate the escapement, a second arm on said member that is adapted to operate the rock shaft, and means for shifting said member so as to bring either arm desired into operative position whereby, upon the operation of the computing machine for computing one item, the escapement may be operated for shifting the carriage in position for printing the next item in the same transverse line, or for turning the roller platen for printing the next item in the next succeeding line.

167. The combination with a typewriter having numeral keys and a computing machine, of a carriage on the typewriter, a roller platen on the carriage, connections between the numeral keys and the computing machine for setting the latter for computing items that are printed by said keys, a shaft for operating the computing machine, gearing connected with said shaft for shifting the typewriter carriage, a rock shaft and connections for turning the roller platen, connections between the rock shaft and the operating shaft, and means for causing the computing machine when operated for computing one item to turn the roller platen for printing the next item in the next line and for simultaneously shifting the carriage into position for causing the second item to be printed in the same vertical column with the first item.

168. The combination with a typewriter having numeral keys and a computing machine, of a carriage on the typewriter, a roller platen on the carriage, connections between the numeral keys and the computing machine for setting the latter for computing items that are printed by the numeral keys, a constantly driven power shaft, a clutch on said power shaft that is adapted to be driven thereby, an eccentric operated by said clutch, a shaft having an arm engaging with said eccentric so as to be rocked thereby, a sleeve on said shaft, connections between the shaft and sleeve for rocking the latter with the shaft, a tabulating-bar connected with the carriage, an escapement for the tabulating-bar, a rock shaft and connections for turning the roller platen, an arm on said sleeve that is adapted to operate the escapement mechanism, an arm on said sleeve that is adapted to rock the shaft for turning the roller platen, and means under control of the operator for shifting said sleeve on its shaft so as to bring one of said arms into position for operating the escapement whereby, when the computing machine is operated for computing one item the carriage will be shifted into position for printing the next item in the same transverse line, and when said sleeve is shifted so as to bring the other arm into position for turning the roller platen, the second item will be printed in the next line.

169. In a machine for mutiplying numbers and for making similar mathematical computations, a traveling carriage, a series of computing wheels mounted in said carriage, a series of operating members for said wheels, means for controlling the extent of movement of said members, and means for shifting the carriage the distance between two adjacent members after the completion of the multiplication by one digit in the multiplier.

170. In a machine for multiplying numbers and for making similar mathematical computations, a traveling carriage, a series of computing wheels mounted in said carriage, a series of operating segments for said wheels, value keys for controlling the extent of movement of said segments, and means for shifting the carriage the distance between two adjacent segments after the completion of the multiplication by one digit in the multiplier.

171. In a machine for multiplying numbers and for making similar mathematical computations, a series of computing wheels, a series of operating members for said wheels, means for determining the movement of said members, and means for producing a relative transverse shifting movement between the wheels and said members after the multiplication by one digit of the multiplier has been completed.

172. In a machine for multiplying numbers and for making similar mathematical computations, a series of computing wheels, a series of operating segments for said wheels, value keys for determining the movement of said segments, and means for producing a relative transverse shifting movement between the wheels and said segments after the multiplication by one digit of the multiplier has been completed.

173. In a machine for multiplying numbers and for making similar mathematical computations, a traveling carriage, a series of computing wheels mounted in said carriage, a series of operating segments for said wheels, a value keyboard having its keys arranged in order rows, there being an order row for each segment, said rows controlling the extent of movement of their corresponding segments, an escapement on said carriage, and means for operating said escapement whereby, after the multiplication by one digit of the multiplier has been completed, the carriage will be moved to bring other computing wheels into operating engagement with the segments.

174. In a machine for multiplying numbers and for making similar mathematical computations, a traveling carriage, a series of computing wheels mounted in said carriage, a series of operating members for said wheels, there being a greater number of wheels than there are operating members therefor, keys for controlling the extent of movement of said members, means for shifting the carriage the distance between two adjacent members after the completion of the multiplication by each digit in the multiplier, and means coöperating with the computing wheels for counting and indicating successively the several digits in the multiplier.

175. In a machine for multiplying numbers and for making similar mathematical computations, computing wheels, mechanism for turning said computing wheels for showing the product of the numbers multiplied, and an indicator for successively exhibiting the digits of the multiplier as said digits are employed in the multiplication process.

176. In a computing machine for multiplying numbers and for making similar mathematical computations, a traveling carriage, a series of computing wheels in said carriage, a series of operating segments for turning said wheels, there being a greater number of wheels than there are segments, a keyboard having value keys arranged in order rows, there being an order row for each of the operating segments in which keyboard the keys representing the multiplicand may be depressed, means for locking said keys in their depressed position, mechanism for normally releasing the depressed keys after each operation of the machine, operating mechanism for turning said segments for computing on the wheels the values of the depressed keys, a repeat-key for preventing the release of the depressed value-keys, whereby the machine may be caused to repeat a computation as often as there are units in the digit of the multiplier in a particular order, means for indicating the number of repetitions of the machine whereby, at the end of the multiplication by one digit, the indicator will exhibit that digit, and means for shifting the carriage after the multiplication by each digit the distance between the two successive computing wheels.

177. In a computing machine for multiplying numbers and for making similar mathematical computations, a traveling carriage, a series of computing wheels in said carriage, a series of operating segments for turning said wheels, a keyboard having value keys arranged in order rows, there being an order row for each of the operating segments in which keyboard the keys representing the multiplicand may be depressed, means for locking said keys in their depressed position, mechanism for normally releasing the depressed keys after each operation of the machine, operating mechanism for turning said segments for computing on the wheels the values of the depressed keys, a repeat-key for preventing the release of the depressed value-keys, whereby the machine may be caused to repeat a computation as often as there are units in the digit of the multiplier in a particular order, means for indicating on the computing wheels the number of repetitions of the machine whereby, at the end of the multiplication by one digit, the indicator will exhibit that digit, and means for shifting the carriage after the multiplication by each digit the distance between two successive computing wheels.

178. In a machine for multiplying numbers and for making similar mathematical computations, a traveling carriage, a series of computing wheels mounted in said carriage, a series of operating segments for said wheels, an escapement for said carriage, a spring for moving the carriage in one direction when it is permitted to escape, a spacing key for operating the escapement for permitting the carriage to move one space, and a release key for permitting the carriage to move to its extreme position.

179. In a computing machine, a carriage, a series of computing wheels mounted in said carriage, a rack bar on said carriage, a spring for moving the carriage in one direction, a rock shaft, an escapement on said rock shaft, a spacing key for rocking said shaft a distance to permit the carriage to move one space, a release key, and connections between said release key and the shaft for rocking the latter a distance sufficient to carry the escapement entirely out of operative position, whereby the spring may return the carriage to the limit of its movement.

180. In a computing machine for multiplying numbers and for making similar mathematical computations, a traveling carriage, a series of computing wheels in said carriage, a series of operating segments for turning said wheels, there being a greater number of wheels than there are segments, a keyboard having value keys arranged in order rows, there being an order row for each of the operating segments, in which keyboard the keys representing the multiplicand may be depressed, means for locking said keys in their depressed position, mechanism for normally releasing the depressed keys after each operation of the machine, operating mechanism for turning said segments for computing on the wheels the values of the depressed keys, a repeat-key for preventing the release of the depressed value keys whereby the machine may be caused to repeat a computation as often as there are units in the digit of the multiplier in a particular order, a special operating segment, means connected with the repeat key for limiting the movement of the special segment to a distance for adding a single unit, said special segment coöperating with one of the computing wheels in the carriage and causing said wheel to indicate the number of repetitions of the computing machine for any digit, an escapement mechanism connected with the carriage, and a shift key for operating the escapement and permitting the carriage to move the distance between successive computing wheels whereby, after the machine has been caused to multiply one digit in the multiplier and the special segment has caused that digit to be indicated, the carriage is brought in position for multiplying by the next digit and for causing that digit to be indicated.

181. In a machine for multiplying numbers and for making similar mathematical computations, a series of computing wheels, a series of operating members for said wheels, there being a greater number of wheels than there are members, means for determining the movement of said members, means for producing a relative transverse shifting movement between the wheels and said members after the multiplication by one digit of the multiplier has been completed, a repeat-key, means operated by said repeat-key for causing the operations of said members to be repeated while said key remains in its operated position, a series of adding wheels, a special operating member for said adding wheels, means controlled by said repeat-key for limiting the movement of said special member so that, upon each operation of the machine while the release-key is operated, said special member will count 1 on the adding wheel in engagement therewith, said adding wheels being shifted after the multiplication by each digit in the multiplier so as to bring a new adding wheel into engagement with the special operating member whereby, after the completion of the multiplication, said adding wheels will exhibit the multiplier.

182. In a machine for multiplying numbers and for making similar mathematical computations, a series of computating wheels, a series of operating members for said wheels, a bank of value keys arranged in order rows for determining the operations of said members, means for locking the value keys when depressed, a shaft, means operated from said shaft for moving said members and for turning the computing wheels, a cam driven from said shaft, a rock shaft, a lever operated by said cam for rocking said shaft, means on said rock shaft for unlocking the value keys when said lever is operated and the shaft is rocked, a repeat-key, and means connected with said key for breaking connections between the lever and the rock shaft whereby the value keys remain in their depressed position and the operations of the machine may be repeated.

183. In a machine for multiplying numbers and for making similar mathematical computations, a series of computing wheels, a series of operating segments for said wheels, a bank of value keys arranged in order rows for determining the operations of said segments, means for locking the value keys when depressed, a shaft, means operated from said shaft for moving said segments and for turning the computing wheels, a cam driven from said shaft, a rock shaft, a lever operated by said cam for rocking said shaft, means on said rock shaft for unlocking the value keys when said lever is operated and the shaft is rocked, a repeat-key, and means connected with said key for breaking connections between the lever and the rock shaft whereby the value keys remain in their depressed position and the operations of the machine may be repeated.

184. In a machine for multiplying numbers and for making similar mathematical computations, a series of computing wheels, a series of operating segments therefor, a bank of value keys for controlling the movements of said segments, means for locking the value keys in their operated positions, a power shaft, means connected with said shaft for moving the segments in a direction for turning the computing wheels, a cam operated by said power shaft, a lever coöperating with said cam, a rock shaft, means on said rock shaft for unlocking the depressed value keys, a pin on the rock shaft normally in position to be engaged by said lever whereby the rotation of said cam rocks the rock shaft and releases the depressed keys, a repeat-key, and means operated by said repeat-key for shifting the rock shaft so as to move the pin thereon away from said lever whereby the value keys remain locked and the operations of the machine may be repeated.

185. In a machine for multiplying numbers and for making similar mathematical computations, a series of computing wheels, a series of operating segments therefor, a bank of value keys for controlling the movements of said segments, means for locking the value keys in their operated position, a power shaft, means connected with said shaft for moving the segments in a direction for turning the computing wheels, a cam operated by said power shaft, a lever coöperating with said cam, a rock shaft, means on said rock shaft for unlocking the depressed value keys, a pin on the rock shaft, means for normally holding said shaft in such position that the said lever will engage with the pin for rocking the shaft, a repeat-key, a lever connected with said key, a cam plate operated by said lever, and connections between the cam plate and the rock shaft for moving the latter so as to carry the pin on the shaft away from its operating lever whereby the operations of the machine may be repeated.

186. In a machine for multiplying numbers and for making similar mathematical computations, a series of computing wheels, a series of operating segments therefor, a bank of value keys for controlling the movements of said segments, means for locking the value keys in their operative position, a constantly driven power shaft, means connected with said shaft for moving the segments in a direction for turning the computing wheels, a cam operated by said power shaft, a lever coöperating with said cam, a rock shaft, means on said rock shaft for unlocking the depressed value keys, a pin on the rock shaft, means for normally holding said shaft in such position that the said lever will engage with the pin for rocking the shaft, a repeat-key, a lever connected with said key, a cam plate operated by said lever, and connections between the cam plate and the rock shaft for moving the latter so as to carry the pin on the shaft away from its operating lever whereby the operations of the machine may be repeated.

187. In a machine for multiplying numbers and for making similar mathematical computations, a series of computing wheels, a series of operating segments therefor, a bank of value keys for controlling the movements of said segments, means for locking the value keys in their operated positions, a power shaft, means connected with said shaft for moving the segments in a direction for turning the computing wheels, a cam operated by said power shaft, a lever coöperating with said cam, a rock shaft, means on said rock shaft for unlocking the depressed value keys, a pin on the rock shaft, means for normally holding said shaft in such position that the said lever will engage with the pin for rocking the shaft, a repeat-key, a lever connected with said key, a cam plate connected with said lever, means on the rock shaft and engaging with the cam plate for shifting the shaft longitudinally as the repeat-key is depressed for moving the shaft so as to carry the pin thereon away from its actuating lever whereby the operations of the machine may be repeated, means for holding said shaft in its shifted position, and a release key and connections for permitting said shaft to return to its normal position.

188. In a machine for multiplying numbers and for making similar mathematical computations, a series of computing wheels, a series of operating segments therefor, a bank of value keys for controlling the movements of said segments, means for locking the value keys in their operated positions, a constantly driven power shaft, means connected with said shaft for moving the segments in a direction for turning the computing wheels, a cam operated by said power shaft, a lever coöperating with said cam, a rock shaft, means on said rock shaft for unlocking the depressed value keys, a pin on the rock shaft, means for normally holding said shaft in such position that the said lever will engage with the pin for rocking the shaft, a repeat-key, a lever connected with said key, a cam plate connected with said lever, means on the rock shaft and engaging with the cam plate for shifting the shaft longitudinally as the repeat-key is depressed for moving the shaft so as to carry the pin thereon away from its actuating lever whereby the operations of the machine may be repeated, means for holding said shaft in its shifted position, and a release-key and connections for permitting said shaft to return to its normal position.

In testimony whereof, I hereunto affix my signature in the presence of two witnesses.

ADOLPHUS S. DENNIS.

Witnesses:
S. E. FOUTS,
BRENNAN B. WEST.